US010807998B2

(12) United States Patent
Yang et al.

(10) Patent No.: US 10,807,998 B2
(45) Date of Patent: Oct. 20, 2020

(54) BRIDGED BIS(INDENYL) TRANSITIONAL METAL COMPLEXES, PRODUCTION, AND USE THEREOF

(71) Applicant: ExxonMobil Chemical Patents Inc., Baytown, TX (US)

(72) Inventors: Jian Yang, Houston, TX (US); Xiongdong Lian, Shanghai (CN)

(73) Assignee: ExxonMobil Chemical Patents Inc., Baytown, TX (US)

(*) Notice: Subject to any disclaimer, the term of this patent is extended or adjusted under 35 U.S.C. 154(b) by 186 days.

(21) Appl. No.: 15/852,410

(22) Filed: Dec. 22, 2017

(65) Prior Publication Data
US 2018/0201630 A1 Jul. 19, 2018

Related U.S. Application Data

(60) Provisional application No. 62/446,007, filed on Jan. 13, 2017.

(51) Int. Cl.
C08F 10/06 (2006.01)
C07F 17/00 (2006.01)
C07F 7/00 (2006.01)
B01J 31/22 (2006.01)
C08F 110/06 (2006.01)
C08F 210/16 (2006.01)
C08F 4/76 (2006.01)
C08F 4/659 (2006.01)

(52) U.S. Cl.
CPC ........... C07F 7/003 (2013.01); B01J 31/2295 (2013.01); C07F 7/00 (2013.01); C07F 17/00 (2013.01); C08F 4/76 (2013.01); C08F 110/06 (2013.01); C08F 210/16 (2013.01); B01J 2531/48 (2013.01); C08F 4/65912 (2013.01); C08F 4/65916 (2013.01)

(58) Field of Classification Search
None
See application file for complete search history.

(56) References Cited

U.S. PATENT DOCUMENTS

| | | | |
|---|---|---|---|
| 5,576,260 A | 11/1996 | Winter et al. | |
| 5,889,134 A | 3/1999 | Pu et al. | |
| 6,020,452 A | 2/2000 | Pu et al. | |
| 6,420,507 B1 | 7/2002 | Kale et al. | |
| 6,613,713 B2 | 9/2003 | Becke et al. | |
| 6,869,904 B2 | 3/2005 | Boussie et al. | |
| 7,060,848 B2 | 6/2006 | Boussie et al. | |
| 8,420,847 B2 | 4/2013 | Terada et al. | |
| 9,029,487 B2 | 5/2015 | Klosin et al. | |
| 9,163,046 B2 | 10/2015 | Voskoboynikov et al. | |
| 9,249,239 B2 | 2/2016 | Jian et al. | |
| 9,260,552 B2 | 2/2016 | Hagadorn et al. | |
| 9,464,145 B2 | 10/2016 | Yang et al. | |
| 9,644,047 B2 | 5/2017 | Yang et al. | |
| 9,725,569 B2 | 8/2017 | Holtcamp et al. | |
| 9,745,390 B2 | 8/2017 | Yang et al. | |
| 9,796,795 B2 | 10/2017 | Canich et al. | |
| 9,803,037 B1 | 10/2017 | Canich et al. | |
| 9,834,628 B2 | 12/2017 | Canich et al. | |
| 2015/0183893 A1* | 7/2015 | Yang | C08F 4/65927 526/127 |
| 2015/0329653 A1 | 11/2015 | Resconi et al. | |
| 2016/0355656 A1 | 12/2016 | Luo et al. | |
| 2017/0342175 A1* | 11/2017 | Hagadorn | C08F 110/06 |
| 2018/0162964 A1* | 6/2018 | Yang | C08F 110/06 |

FOREIGN PATENT DOCUMENTS

| | | | |
|---|---|---|---|
| WO | 98/27103 | 6/1998 | |
| WO | 01/042315 | 6/2001 | |
| WO | 03/002583 | 1/2003 | |
| WO | 2004/013149 | 2/2004 | |
| WO | 2009/054832 | 4/2009 | |
| WO | 2014/070655 | 5/2014 | |
| WO | 2015/009471 | 1/2015 | |
| WO | 2016/196331 | 12/2016 | |
| WO | 2016/196334 | 12/2016 | |
| WO | 2016/196339 | 12/2016 | |
| WO | 2017/011073 | 1/2017 | |
| WO | 2017/204830 | 11/2017 | |
| WO | WO 2017204830 | * 11/2017 | ............. C08F 4/659 |

OTHER PUBLICATIONS

U.S. Appl. No. 15/798,945, filed Oct. 31, 2017 Canich et al.
Kayal et al., "Ortho-Linked Polyaryloxide LIgands and Their Titanium Complexes," Inorganic Chemistry, 2000, vol. 39, No. 16, pp. 3696-3704.
Vogl et al., Linking BINOL: C2-symmetric ligands for investigations on asymmetric catalysis, Tetrahedron Letters, 1998, vol. 39, No. 43, pp. 7917-7920.
Ihori et al., "Chiral zirconuim catalysts using multidentate BINOL derivatives for catalytic enantioselective Mannich-type reactions; ligand optimization and approaches to elucidation of the catalyst structure," Journal of the American Chemical Society, 2005, vol. 127, No. 44, pp. 15528-15535.
Huang et al., "From Highly Enantioselective Monomeric Catalysts to Highly Enantioselective Polymeric Catalysts: Application of Rigid and Sterically Regular Chiral Binaphthyl Polymers to the Asymmetric Synthesis of Chiral Secondary Alcohols," Journal of Organic Chemistry, 1999, vol. 64, No. 21, pp. 7940-7956.
Matsunaga et al., "Catalytic Enantioselective meso-Epoxide Right Opening Reaction with Phenolic Oxygen Nucleophile Promoted by Gallium Heterobimetallic Multifunctional Complexes," Journal of the American Chemical Society, 2000, vol. 122, No. 10, pp. 2252-2260.

(Continued)

Primary Examiner — Yun Qian
(74) Attorney, Agent, or Firm — Catherine L. Bell

(57) ABSTRACT

The present disclosure relates to bridged metallocene catalysts that include at least one indenyl ligand substituted at the 2-position with a $C_3$-$C_{10}$ branched alkyl, such as isopropyl. Catalyst systems including the catalysts, polymerization processes using the catalysts, and polymers made using the catalysts are also described.

42 Claims, 4 Drawing Sheets

(56) References Cited

OTHER PUBLICATIONS

Huang et al., "The first highly enantioselective catalytic diphenyizinc additions to aldehydes: synthesis of chiral diarylcarbionols by asymmetric catalysts," Journal of Organic Chemistry, 1999, vol. 64, vol. 12, pp. 4222-4223.

Turlington et al., "Catalytic Asymmetric Synthesis of the Chiral Propargylic Alcohols for the Intramolecular Pauson-Khand Cycloaddition," Journal of Organic Chemistry, 2010, vol. 75, No. 20, pp. 6941-6952.

Brzezinkski et al., "A cyclic hydrogen-bonded system with collective proton motion in bis(2,2'-dihydroxy-3-biphenylyl)methane," Journal of Physical Chemistry, 1993, vol. 97, No. 25, pp. 6590-6591.

Amaya et al., "Sumanenyl Metallocenes: Synthesis and Structure of Mono- and Trinuclear Zirconocene Complexes," Journal of the American Chemical Society, 2014, vol. 136, No. 36, pp. 12794-12798.

Kociolek et al., "Intramolecular thermal cyclotrimerization of an acyclic triyne: An uncatalyzed process," Tetrahedron Letters, 1999, vol. 40, No. 22, pp. 4141-4144.

* cited by examiner

BRIDGED BIS(INDENYL) TRANSITIONAL METAL COMPLEXES, PRODUCTION, AND USE THEREOF

PRIORITY CLAIM

This application claims priority to and benefit of U.S. Ser. No. 62/446,007, filed Jan. 13, 2007, which is incorporated by reference in its entirety.

FIELD

The present disclosure relates to catalyst compounds comprising bridged bis(indenyl) transition metal complexes and uses thereof.

BACKGROUND

Polyolefins are widely used commercially because of their robust physical properties. For example, various types of polyethylenes, including high density, low density, and linear low density polyethylenes, are some of the most commercially useful. Polyolefins are typically prepared with a catalyst that polymerizes olefin monomers. Therefore, there is interest in finding new catalysts and catalyst systems that provide polymers having improved properties.

Catalysts for olefin polymerization typically have transition metals, e.g., the catalysts are metallocenes and can be activated by alumoxane or an activator containing a non-coordinating anion. Using these catalysts and catalyst systems, polymerization conditions can be adjusted to provide polyolefins having desired properties. For example, increasing polymerization reactor temperature from 70° C. to 110° C. typically decreases the molecular weight of polyolefin products, which may be desirable for certain polyolefins. However, the difference in melting temperature (Tm) values of the polyolefins formed at 70° C. and at 110° C. (known as ΔTm) is typically 10° C. or greater. For example, the melting temperature of a polyolefin formed at 110° C. is typically 10° C. (or more) less than the melting temperature of a polyolefin formed at 70° C., all other polymerization conditions being equal. Such a large decrease in melting temperature may negate any advantage brought by the lower molecular weights of the polymers formed at higher temperatures.

Furthermore, multifunctional catalysts are catalysts capable of forming a variety of polyolefins having different structures and properties. For example, isotactic polypropylene (iPP) having a Tm above about 145° C. and average molecular weight (Mw) above about 50,000 g/mol is valuable in the polyolefin industry. In addition, ethylene-propylene (EP) copolymers having Mw values above about 250,000 g/mol are also valuable in the polyolefin industry. A catalyst capable of forming both of these types of polymers would be valuable because the polymer formed in a reactor could be adjusted by, for example, adjusting ethylene/propylene flow parameters into the reactor.

Some metallocenes, for example, $C_2$ symmetrical 2-methyl-4-aryl ansa-metallocenes, have been shown to be active for producing iPP having a Tm value above about 145° C. and average molecular weight (Mw) above about 50,000 g/mol. However, these metallocenes often produce EP copolymers having Mw values below 250,000 g/mol. Certain assymetric (C1 symmetry) metallocenes produce EP copolymers having higher Mw values than the symmetrical metallocenes, but the iPP Mw values remain low, and these metallocenes appear to have significantly reduced iPP Tm values at higher polymerization temperatures, for example, at temperatures above 70° C.

There exists a need for multifunctional catalysts capable of forming (1) EP having Mw values above 250,000 and (2) iPP having Tm values above about 145° C. and Mw values above 40,000, while maintaining or improving the iPP Tm at high polymerization temperatures, e.g., a ΔTm of less than about 10° C.

References of interest include: US 2015/0025208; WO 2016/196331; PCT/US2016/033583; PCT/US2016/034784; US 2015-0025208; US 2015-0025206; US 2015-0183893; US 2015-0141590; US 2016-0355653; US 2016-0355656; WO 2016/196331; WO 2016/196334; and WO 2016/196339.

SUMMARY

The present disclosure relates to bridged transition metal complexes represented by the formula (I):

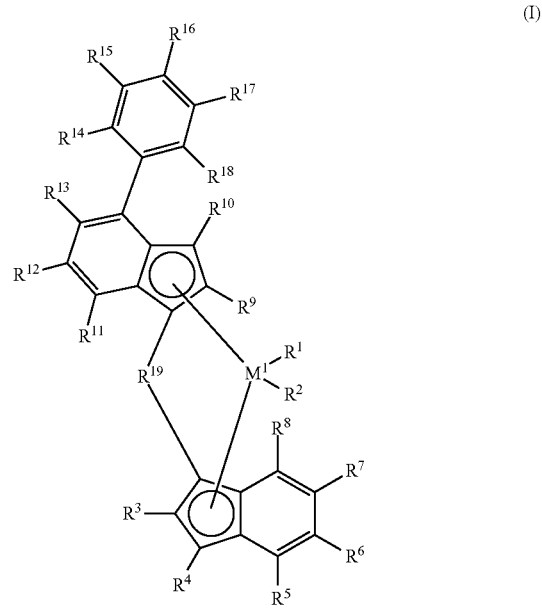

where $M^1$ is selected from titanium, zirconium, hafnium, vanadium, niobium, tantalum, chromium, molybdenum and tungsten;

$R^1$ and $R^2$ are independently hydrogen, halogen, hydroxyl, hydrocarbyl, or substituted hydrocarbyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, said diene having up to 30 atoms other than hydrogen);

$R^3$ is linear alkyl (such as methyl, ethyl, propyl, butyl, pentyl, hexyl, heptyl, octyl, nonyl, or decyl);

$R^9$ is $C_3$-$C_{10}$ branched alkyl;

each of $R^4$, $R^6$, $R^7$, $R^8$, $R^{10}$, $R^{11}$, $R^{12}$, and $R^{13}$ is independently hydrogen, halogen, $C_1$-$C_{40}$ hydrocarbyl or $C_1$-$C_{40}$ substituted hydrocarbyl (such as $C_1$-$C_{10}$ alkyl which may be substituted, $C_6$-$C_{40}$ aryl which may be substituted, $C_2$-$C_{10}$ alkenyl, $C_7$-$C_{40}$ arylalkyl, $C_7$-$C_{40}$ alkylaryl, $C_8$-$C_{40}$ arylalkenyl), —NR'$_2$, —SR', —OR, —OSiR'$_3$, —PR'$_2$, where each R' is hydrogen, halogen, C$_1$-C$_{10}$ alkyl, or C$_6$-C$_{10}$ aryl;

R$^5$ is hydrogen, halogen, C$_1$-C$_{40}$ hydrocarbyl or C$_1$-C$_{40}$ substituted hydrocarbyl (such as C$_1$-C$_{10}$ alkyl which may be substituted, C$_6$-C$_{40}$ aryl which may be substituted, C$_2$-C$_{10}$ alkenyl, C$_7$-C$_{40}$ arylalkyl, C$_7$-C$_{40}$ alkylaryl, C$_8$-C$_{40}$ arylalkenyl), —NR'$_2$, —SR', —OR, —OSiR'$_3$, —PR'$_2$, where each R' is hydrogen, halogen, C$_1$-C$_{10}$ alkyl, or C$_6$-C$_{10}$ aryl, or two or more adjacent radicals R$^5$ to R$^8$ together form one or more saturated or unsaturated rings;

R$^{19}$ is —B(R$^{20}$)—, —Al(R$^{20}$)—, —Ge—, —Sn—, —O—, —S—, —SO—, —SO$_2$—, —N(R$^{20}$)—, —CO—, —P(R$^{20}$)—, or —P(O)(R$^{20}$)—, an amidoborane radical or one of the following:

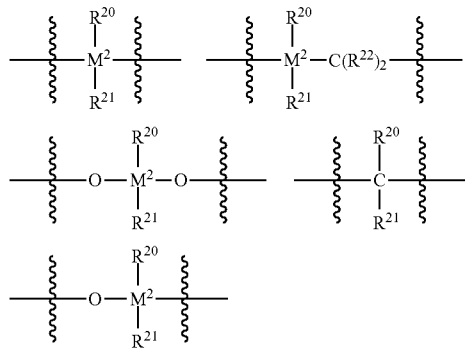

wherein each of R$^{20}$, R$^{21}$, R$^{22}$ is independently hydrogen, halogen, C$_1$-C$_{20}$ alkyl, C$_1$-C$_{20}$ fluoroalkyl or silaalkyl, C$_6$-C$_{30}$ aryl, C$_6$-C$_{30}$ fluoroaryl, C$_1$-C$_{20}$ alkoxy, C$_2$-C$_{20}$ alkenyl, C$_7$-C$_{40}$ arylalkyl, C$_8$-C$_{40}$ arylalkenyl, C$_7$-C$_{40}$ alkylaryl, or one R$^{20}$ and one R$^{21}$, together with the atoms in R$^{19}$ connecting them, form one or more rings; M$^2$ is one or more carbon, silicon, germanium or tin;

R$^{14}$ is substituted or unsubstituted C$_6$-C$_{10}$ aryl (such as phenyl or substituted phenyl);

R$^{18}$ is hydrogen, halogen, substituted or unsubstituted C$_3$-C$_{20}$ alkyl, substituted or unsubstituted C$_6$-C$_{40}$ aryl (such as C$_7$-C$_{40}$ arylalkyl, C$_7$-C$_{40}$ alkylaryl, C$_8$-C$_{40}$ arylalkenyl, biphenyl), C$_2$-C$_{10}$ alkenyl, —NR'$_2$, —SR', —OR, —OSiR'$_3$ or —PR'$_2$, wherein each R' is hydrogen, halogen, C$_1$-C$_{10}$ alkyl, or C$_6$-C$_{10}$ aryl;

R$^{15}$ and R$^{17}$ are independently hydrogen, C$_2$-C$_{20}$ alkyl which may be substituted (such as halogenated), C$_6$-C$_{40}$ aryl which may be substituted (such as halogenated aryl, C$_7$-C$_{20}$ arylalkyl, C$_7$-C$_{20}$ alkylaryl, C$_8$-C$_{20}$ arylalkenyl), or C$_2$-C$_{10}$ alkenyl; and R$^{16}$ is selected from hydrogen, halogen, C$_1$-C$_{10}$ alkyl which may be substituted (such as halogenated), C$_6$-C$_{20}$ aryl which may be substituted (such as halogenated aryl, C$_7$-C$_{40}$ arylalkyl, C$_7$-C$_{40}$ alkylaryl, C$_8$-C$_{40}$ arylalkenyl), C$_2$-C$_{10}$ alkenyl which may be substituted, or two or more adjacent radicals R$^{15}$ to R$^{18}$ together form one or more rings, and —XR'n, wherein X is a Group 14-17 heteroatom having an atomic weight of 13 to 79 and R' is one of hydrogen, halogen, C$_1$-C$_{10}$ alkyl, or C$_6$-C$_{10}$ aryl and n is 0, 1, 2, or 3.

The present disclosure further relates to bridged transition metal complexes represented by the formula (II):

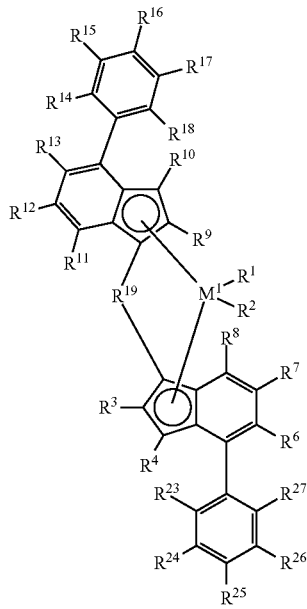

wherein each of R$^{18}$, R$^{23}$, and R$^{27}$ is independently hydrogen, halogen, substituted or unsubstituted C$_3$-C$_{20}$ alkyl, substituted or unsubstituted C$_6$-C$_{40}$ aryl (such as C$_7$-C$_{40}$ arylalkyl, C$_7$-C$_{40}$ alkylaryl, C$_8$-C$_{40}$ arylalkenyl, biphenyl), C$_2$-C$_{10}$ alkenyl, —NR'$_2$, —SR', —OR, —OSiR'$_3$ or —PR'$_2$, wherein each R' is hydrogen, halogen, C$_1$-C$_{10}$ alkyl, or C$_6$-C$_{10}$ aryl;

R$^{24}$ and R$^{26}$ are independently substituted or unsubstituted C$_2$-C$_{20}$ alkyl, substituted or unsubstituted C$_6$-C$_{40}$ aryl (such as C$_7$-C$_{20}$ arylalkyl, C$_7$-C$_{20}$ alkylaryl, or C$_8$-C$_{20}$ arylalkenyl), C$_2$-C$_{10}$ alkenyl; and wherein R$^{16}$ and R$^{25}$ are independently —(XR'n), wherein X is a Group 14-17 heteroatom having an atomic weight of 13 to 79 and R' is one of hydrogen, halogen, C$_1$-C$_{10}$ alkyl, or C$_6$-C$_{10}$ aryl and n is 0, 1 2, or 3, M$^1$, R$^1$, R$^2$, R$^3$, R$^4$, R$^6$, R$^7$, R$^8$, R$^9$, R$^{10}$, R$^{11}$, R$^{12}$, R$^{13}$, R$^{14}$, R$^{15}$, R$^{17}$, and R$^{19}$ are as defined above for formula (I).

In yet another aspect, embodiments of the present disclosure provide a catalyst system comprising an activator and a catalyst of the present disclosure.

In still another aspect, embodiments of the present disclosure provide a polymerization process comprising a) contacting one or more olefin monomers with a catalyst system comprising: i) an activator and ii) a catalyst of the present disclosure.

DETAILED DESCRIPTION

Figure 1:
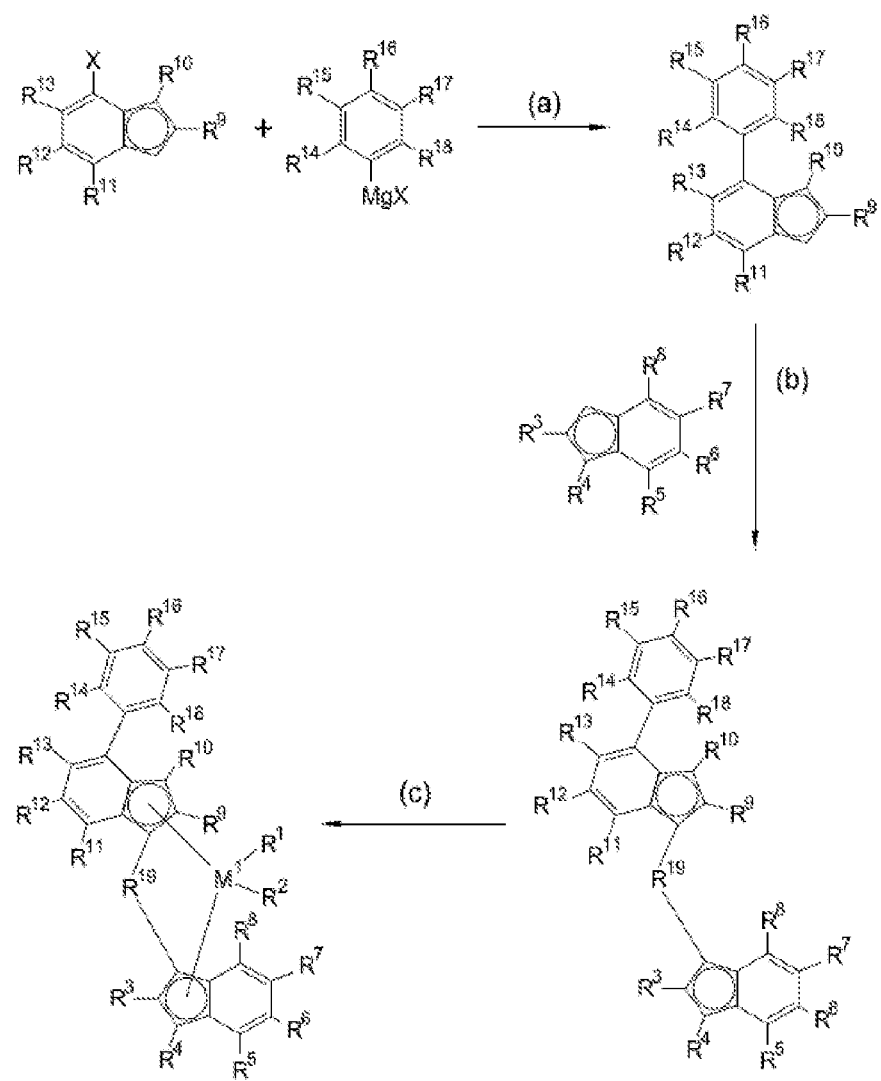
FIG. 1 is a scheme illustrating a general reaction pathway suitable for preparing catalysts of the present disclosure.

Catalysts of the present disclosure have a branched alkyl moiety located at a certain position on the catalysts which helps to provide ethylene-propylene copolymers having Mw values above 250,000 g/mol, isotactic polypropylene having Mw values above 40,000 g/mol, Tm values greater than 145° C., and ΔTm values less than 10° C. For example, catalysts of the present disclosure are represented by Formula (I) or (II) and have an isopropyl moiety at the $R^9$ position, as described in more detail below.

The specification describes catalysts that can be transition metal complexes. The term complex is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization or oligomerization function using an activator which is believed to create a cation as a result of the removal of an anionic group, often referred to as a leaving group, from the transition metal.

For the purposes of the present disclosure, the numbering scheme for the Periodic Table Groups is used as described in Chemical and Engineering News, 63(5), pg. 27 (1985). Therefore, a "Group 4 metal" is an element from Group 4 of the Periodic Table, e.g., Hf, Ti, or Zr.

The following abbreviations are used through this specification: o-biphenyl is an ortho-biphenyl moiety represented by the structure

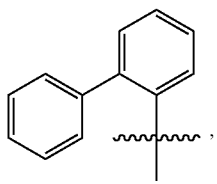 [SMILES: *c1ccccc1-c1ccccc1]

dme is 1,2-dimethoxyethane, Me is methyl, Ph is phenyl, Et is ethyl, Pr is propyl, iPr is isopropyl, n-Pr is normal propyl, cPr is cyclopropyl, Bu is butyl, iBu is isobutyl, tBu is tertiary butyl, p-tBu is para-tertiary butyl, nBu is normal butyl, sBu is sec-butyl, TMS is trimethylsilyl, TIBAL is triisobutylaluminum, TNOAL is tri(n-octyl)aluminum, MAO is methylalumoxane, p-Me is para-methyl, Ph is phenyl, Bn is benzyl (i.e., CH$_2$Ph), THF (also referred to as thf) is tetrahydrofuran, RT is room temperature (and is 23° C. unless otherwise indicated), tol is toluene, EtOAc is ethyl acetate, and Cy is cyclohexyl.

The term "substituted" means that at least one hydrogen atom has been replaced with at least a non-hydrogen group, such as a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, and the like, where each R* is independently a hydrocarbyl or halocarbyl radical, and two or more R* may join together to form a substituted or unsubstituted saturated, partially unsaturated or aromatic cyclic or polycyclic ring structure, or where at least one heteroatom has been inserted within a hydrocarbyl ring.

The terms "hydrocarbyl radical," "hydrocarbyl," "hydrocarbyl group," "alkyl radical," and "alkyl" are used interchangeably throughout this disclosure. Likewise, the terms "group," "radical," and "substituent" are also used interchangeably in this disclosure. For purposes of this disclosure, "hydrocarbyl radical" is defined to be C$_1$-C$_{100}$ radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted hydrocarbyl radicals are radicals in which at least one hydrogen atom of the hydrocarbyl radical has been substituted with at least a non-hydrogen group, such as a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, and the like, or where at least one heteroatom has been inserted within a hydrocarbyl ring.

The term "alkenyl" means a straight-chain, branched-chain, or cyclic hydrocarbon radical having one or more carbon-carbon double bonds. These alkenyl radicals may be substituted. Examples of suitable alkenyl radicals include, but are not limited to, ethenyl, propenyl, allyl, 1,4-butadienyl cyclopropenyl, cyclobutenyl, cyclopentenyl, cyclohexenyl, cyclooctenyl and the like including their substituted analogues.

The term "arylalkenyl" means an aryl group where a hydrogen has been replaced with an alkenyl or substituted alkenyl group. For example, styryl indenyl is an indene substituted with an arylalkenyl group (a styrene group).

The term "alkoxy" or "alkoxide" means an alkyl ether or aryl ether radical wherein the term alkyl is as defined above. Examples of suitable alkyl ether radicals include, but are not limited to, methoxy, ethoxy, n-propoxy, iso-propoxy, n-butoxy, iso-butoxy, sec-butoxy, tert-butoxy, phenoxy, and the like.

The term "aryl" or "aryl group" means a carbon-containing aromatic ring and the substituted variants thereof, including but not limited to, phenyl, 2-methyl-phenyl, xylyl, 4-bromo-xylyl. Likewise, heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise, the term aromatic also refers to substituted aromatics.

The term "arylalkyl" means an aryl group where a hydrogen has been replaced with an alkyl or substituted alkyl group. For example, 3,5'-di-tert-butyl-phenyl indenyl is an indene substituted with an arylalkyl group.

The term "alkylaryl" means an alkyl group where a hydrogen has been replaced with an aryl or substituted arylgroup. For example, ethylbenzyl indenyl is an indene substituted with an ethyl group bound to a benzyl group.

Reference to an alkyl, alkenyl, alkoxide, or aryl group without specifying a particular isomer (e.g., butyl) expressly discloses all isomers (e.g., n-butyl, iso-butyl, sec-butyl, and tert-butyl), unless otherwise indicated.

The term "ring atom" means an atom that is part of a cyclic ring structure. By this definition, a benzyl group has six ring atoms and tetrahydrofuran has 5 ring atoms. A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

The term "catalyst system" is defined to mean a complex/activator pair. When "catalyst system" is used to describe such a pair before activation, it means the unactivated catalyst complex (precatalyst) together with an activator and, optionally, a co-activator. When it is used to describe such a pair after activation, it means the activated complex and the activator or other charge-balancing moiety. The transition metal compound may be neutral as in a precatalyst, or a charged species with a counter ion as in an activated catalyst system.

"Complex" as used herein, is also often referred to as catalyst precursor, precatalyst, catalyst, catalyst compound, transition metal compound, or transition metal complex. These words are used interchangeably. Activator and cocatalyst are also used interchangeably.

A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments a co-activator can be pre-mixed with the transition metal compound to form an alkylated transition metal compound.

Non-coordinating anion (NCA) means an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon. The term non-coordinating anion activator includes neutral activators, ionic activators, and Lewis acid activators.

In the description herein, a metallocene catalyst may be described as a catalyst precursor, a pre-catalyst compound, metallocene catalyst compound or a transition metal compound, and these terms are used interchangeably. A polymerization catalyst system is a catalyst system that can polymerize monomers into polymer. An "anionic ligand" is a negatively charged ligand which donates one or more pairs of electrons to a metal ion. A "neutral donor ligand" is a neutrally charged ligand which donates one or more pairs of electrons to a metal ion.

A metallocene catalyst is defined as an organometallic compound with at least one π-bound cyclopentadienyl moiety (or substituted cyclopentadienyl moiety) and more frequently two π-bound cyclopentadienyl moieties or substituted cyclopentadienyl moieties.

For purposes of the present disclosure and claims thereto in relation to metallocene catalyst compounds, the term "substituted" means that a hydrogen group has been replaced with a hydrocarbyl group, a heteroatom, or a heteroatom containing group. For example, methyl cyclopentadiene (Cp) is a Cp group substituted with a methyl group.

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of gPgcat$^{-1}$ hr$^{-1}$. "Conversion" is the amount of monomer that is converted to polymer product, and is reported as mol % and is calculated based on the polymer yield and the amount of monomer fed into the reactor. "Catalyst activity" is a measure of the level of activity of the catalyst and is reported as the mass of product polymer (P) produced per mole of catalyst (cat) used (kgP/molcat).

For purposes herein an "olefin," alternatively referred to as "alkene," is a linear, branched, or cyclic compound comprising carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have a "propylene" content of 35 wt % to 55 wt %, it is understood that the mer unit in the copolymer is derived from propylene in the polymerization reaction and the derived units are present at 35 wt % to 55 wt %, based upon the weight of the copolymer.

For purposes herein a "polymer" has two or more of the same or different monomer ("mer") units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically. Accordingly, the definition of copolymer, as used herein, includes terpolymers and the like. An oligomer is typically a polymer having a low molecular weight, such an Mn of less than 25,000 g/mol, or less than 2,500 g/mol, or a low number of mer units, such as 75 mer units or less or 50 mer units or less. An "ethylene polymer"

or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol.

The term "continuous" means a system that operates without interruption or cessation for a period of time, preferably where reactants are continually fed into a reaction zone and products are continually or regularly withdrawn without stopping the reaction in the reaction zone. For example, a continuous process to produce a polymer would be one where the reactants are continually introduced into one or more reactors and polymer product is continually withdrawn.

A "solution polymerization" means a polymerization process in which the polymerization is conducted in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, *Ind. Eng. Chem. Res.* (2000), 29, 4627.

A bulk polymerization means a polymerization process in which the monomers and/or comonomers being polymerized are used as a solvent or diluent using little or no inert solvent or diluent. A small fraction of inert solvent might be used as a carrier for catalyst and scavenger. A bulk polymerization system contains less than about 25 wt % of inert solvent or diluent, such as less than about 10 wt %, such as less than about 1 wt %, such as 0 wt %.

Catalysts

In at least one embodiment, the present disclosure relates to bridged metallocene catalysts, where the catalysts have at least one indenyl ligand substituted at the 2-position with an alkyl group, particularly a bulky alkyl group such as isopropyl, and at the 4-position with a phenyl group, the phenyl group being substituted at the 3', 4', and 5' positions with particular combinations of substituents. In at least one embodiment, the 3' and 5' positions of the phenyl ring are selected to be sterically hindering (e.g., branched hydrocarbyl groups) and the 4'-substituent is selected from $(XR'_n)$—, wherein X is a Group 14, 15, 16 or 17 heteroatom having an atomic weight of 13 to 79 (such as N, O, S, P, or Si) and R' is one of a hydrogen atom, halogen atom, a $C_1$-$C_{10}$ alkyl group (such as methyl, ethyl, propyl, butyl, pentyl, hexyl, octyl, nonyl, decyl or an isomer thereof), or a $C_6$-$C_{10}$ aryl group and n is 0, 1, 2, or 3; such as $(XR'_n)$— is —NR'$_2$, —SR', —OR', —OSiR'$_3$, —SiR'$_3$, or —PR'$_2$, such as $(XR')$— is —NR'$_2$, —SR', —OR', —OSiR'$_3$, or —PR'$_2$, such as $(XR')$— is —SR', —OR', or —OSiR'$_3$, such as $(XR')$— is —NR'$_2$ or —PR'$_2$, such as $(XR')$— is —OR'.

In at least one embodiment, the present disclosure relates to a catalyst compound, and catalyst systems comprising such compounds, represented by the formula (I):

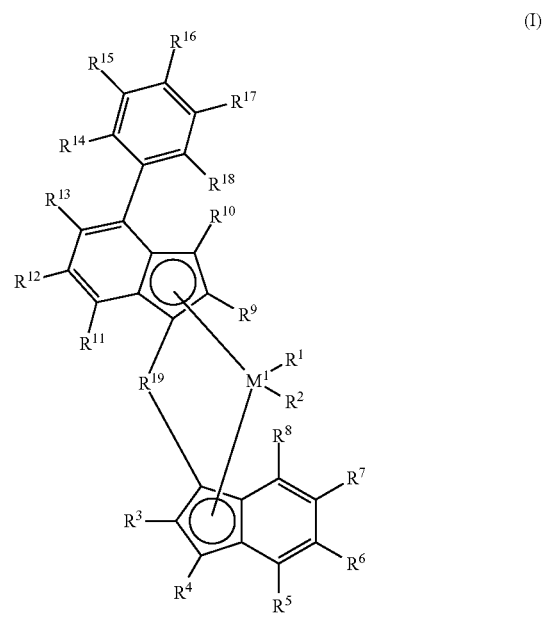

(I)

wherein $M^1$ is selected from the group consisting of titanium, zirconium, hafnium, vanadium, niobium, tantalum, chromium, molybdenum and tungsten;

$R^1$ and $R^2$ are independently hydrogen, halogen, hydroxyl, hydrocarbyl, or substituted hydrocarbyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, said diene having up to 30 atoms other than hydrogen);

$R^3$ is linear alkyl (such as methyl, ethyl, propyl, butyl, pentyl, hexyl, heptyl, octyl, nonyl, or decyl);

$R^9$ is $C_3$-$C_{10}$ branched alkyl;

each of $R^4$, $R^6$, $R^7$, $R^8$, $R^{10}$, $R^{11}$, $R^{12}$, and $R^{13}$ is independently hydrogen, halogen, $C_1$-$C_{40}$ hydrocarbyl or $C_1$-$C_{40}$ substituted hydrocarbyl (such as $C_1$-$C_{10}$ alkyl which may be substituted, $C_6$-$C_{40}$ aryl which may be substituted, $C_2$-$C_{10}$ alkenyl, $C_7$-$C_{40}$ arylalkyl, $C_7$-$C_{40}$ alkylaryl, $C_8$-$C_{40}$ arylalkenyl), —NR'$_2$, —SR', —OR, —OSiR'$_3$, —PR'$_2$, where each R' is hydrogen, halogen, $C_1$-$C_{10}$ alkyl, or $C_6$-$C_{10}$ aryl;

$R^5$ is hydrogen, halogen, $C_1$-$C_{40}$ hydrocarbyl or $C_1$-$C_{40}$ substituted hydrocarbyl (such as $C_1$-$C_{10}$ alkyl which may be substituted, $C_6$-$C_{40}$ aryl which may be substituted, $C_2$-$C_{10}$ alkenyl, $C_7$-$C_{40}$ arylalkyl, $C_7$-$C_{40}$ alkylaryl, $C_8$-$C_{40}$ arylalkenyl), —NR'$_2$, —SR', —OR, —OSiR'$_3$, —PR'$_2$, where each R' is hydrogen, halogen, $C_1$-$C_{10}$ alkyl, or $C_6$-$C_{10}$ aryl, or two or more adjacent radicals $R^5$ to $R^8$ together form one or more saturated or unsaturated rings;

$R^{19}$ is —B($R^{20}$)—, —Al($R^{20}$)—, —Ge—, —Sn—, —O—, —S—, —SO—, —SO$_2$—, —N($R^{20}$)—, —CO—, —P($R^{20}$)—, or —P(O)($R^{20}$)—, an amidoborane radical or one of the following:

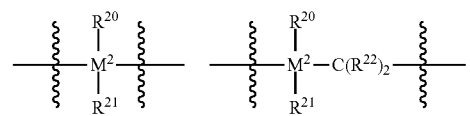

-continued

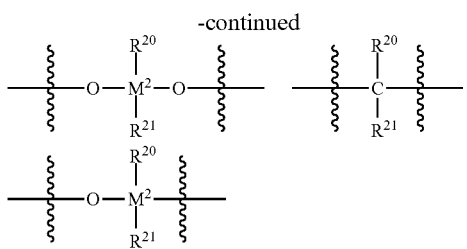

wherein each of $R^{20}$, $R^{21}$, $R^{22}$ is independently hydrogen, halogen, $C_1$-$C_{20}$ alkyl, $C_1$-$C_{20}$ fluoroalkyl or silaalkyl, $C_6$-$C_{30}$ aryl, $C_6$-$C_{30}$ fluoroaryl, $C_1$-$C_{20}$ alkoxy, $C_2$-$C_{20}$ alkenyl, $C_7$-$C_{40}$ arylalkyl, $C_8$-$C_{40}$ arylalkenyl, $C_7$-$C_{40}$ alkylaryl, or one $R^{20}$ and one $R^{21}$, together with the atoms in $R^{19}$ connecting them, form one or more rings; $M^2$ is one or more carbon, silicon, germanium or tin;

$R^{14}$ is substituted or unsubstituted $C_6$-$C_{10}$ aryl (such as phenyl or substituted phenyl). In at least one embodiment, $R^{14}$ is substituted with one or more of $C_1$-$C_{10}$ alkyl which may be substituted (such as halogenated), $C_6$-$C_{20}$ aryl which may be substituted (such as halogenated aryl, $C_7$-$C_{40}$ arylalkyl, $C_7$-$C_{40}$ alkylaryl, $C_8$-$C_{40}$ arylalkenyl), $C_2$-$C_{10}$ alkenyl which may be substituted, a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, and the like, where each R* is independently a hydrocarbyl or halocarbyl radical, and two or more R* may join together to form a substituted or unsubstituted saturated, partially unsaturated or aromatic cyclic or polycyclic ring structure, or where at least one heteroatom has been inserted within a hydrocarbyl ring;

$R^{18}$ is hydrogen, halogen, substituted or unsubstituted $C_3$-$C_{20}$ alkyl, substituted or unsubstituted $C_6$-$C_{40}$ aryl (such as $C_7$-$C_{40}$ arylalkyl, $C_7$-$C_{40}$ alkylaryl, $C_8$-$C_{40}$ arylalkenyl, biphenyl), $C_2$-$C_{10}$ alkenyl, —NR'$_2$, —SR', —OR, —OSiR'$_3$ or —PR'$_2$, wherein each R' is hydrogen, halogen, $C_1$-$C_{10}$ alkyl, or $C_6$-$C_{10}$ aryl;

$R^{15}$ and $R^{17}$ are independently hydrogen, $C_2$-$C_{20}$ alkyl which may be substituted (such as halogenated), $C_6$-$C_{40}$ aryl which may be substituted (such as halogenated aryl, $C_7$-$C_{20}$ arylalkyl, $C_7$-$C_{20}$ alkylaryl, $C_8$-$C_{20}$ arylalkenyl), or $C_2$-$C_{10}$ alkenyl; and $R^{16}$ is selected from hydrogen, halogen, $C_1$-$C_{10}$ alkyl which may be substituted (such as halogenated), $C_6$-$C_{20}$ aryl which may be substituted (such as halogenated aryl, $C_7$-$C_{40}$ arylalkyl, $C_7$-$C_{40}$ alkylaryl, $C_8$-$C_{40}$ arylalkenyl), $C_2$-$C_{10}$ alkenyl which may be substituted, or two or more adjacent radicals $R^{15}$ to $R^{18}$ together form one or more rings, and —XR'$_n$, wherein X is a Group 14-17 heteroatom having an atomic weight of 13 to 79 and R' is one of hydrogen, halogen, $C_1$-$C_{10}$ alkyl, or $C_6$-$C_{10}$ aryl and n is 0, 1, 2, or 3.

For $R^9$, $C_3$-$C_{10}$ branched alkyl includes an alkyl group branched at the α-position. For example, the carbon atom bonded to the indene (of the catalyst compound of formula (I)) is substituted with two alkyl moieties (such as a group represented by the formula:

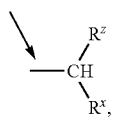

where $R^z$ and $R^x$ can be $C_1$ to $C_8$ alkyl groups). $C_3$-$C_{10}$ branched alkyl includes isopropyl, isobutyl, isopentyl, isohexyl, isoheptyl, isooctyl, isononyl, and isodecyl. Branched alkyl does not include cyclopropyl.

The present disclosure further relates to a catalyst compound, and catalyst systems comprising such compounds, represented by the formula (II):

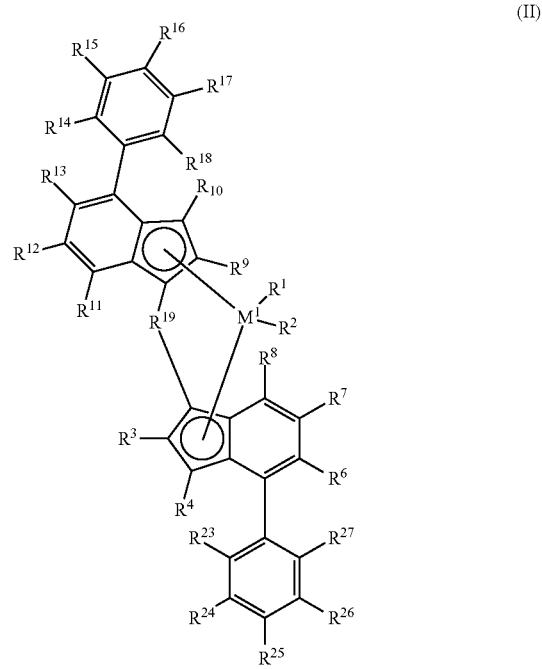

wherein $M^1$, $R^1$, $R^2$, $R^3$, $R^4$, $R^6$, $R^7$, $R^8$, $R^{10}$, $R^{11}$, $R^{12}$, $R^{13}$, $R^{14}$, $R^{15}$, $R^{17}$, and $R^{19}$ are as defined for formula (I);

each of $R^{18}$, $R^{23}$, and $R^{27}$ is independently hydrogen, halogen, substituted or unsubstituted $C_3$-$C_{20}$ alkyl, substituted or unsubstituted $C_6$-$C_{40}$ aryl (such as $C_7$-$C_{40}$ arylalkyl, $C_7$-$C_{40}$ alkylaryl, $C_8$-$C_{40}$ arylalkenyl, biphenyl), $C_2$-$C_{10}$ alkenyl, —NR'$_2$, —SR', —OR, —OSiR'$_3$ or —PR'$_2$, wherein each R' is hydrogen, halogen, $C_1$-$C_{10}$ alkyl, or $C_6$-$C_{10}$ aryl;

$R^{24}$ and $R^{26}$ are independently substituted or unsubstituted $C_2$-$C_{20}$ alkyl, substituted or unsubstituted $C_6$-$C_{40}$ aryl (such as $C_7$-$C_{20}$ arylalkyl, $C_7$-$C_{20}$ alkylaryl, or $C_8$-$C_{20}$ arylalkenyl), $C_2$-$C_{10}$ alkenyl; and wherein $R^{16}$ and $R^{25}$ are independently —(XR'$_n$), wherein X is a Group 14-17 heteroatom having an atomic weight of 13 to 79 and R' is one of hydrogen, halogen, $C_1$-$C_{10}$ alkyl, or $C_6$-$C_{10}$ aryl and n is 0, 1 2, or 3.

The present disclosure further relates to a catalyst compound, and catalyst systems comprising such compounds, represented by the formula (III):

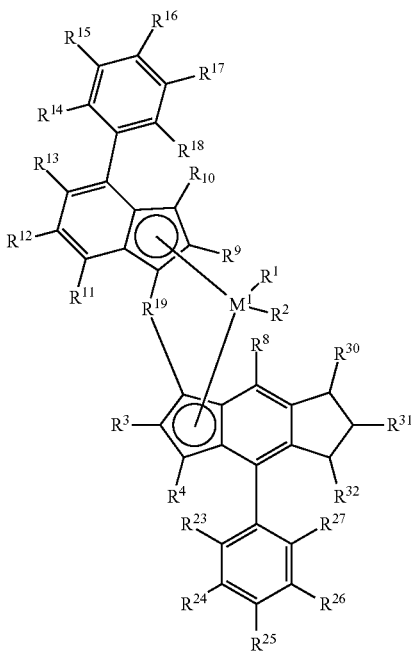

(III)

wherein $M^1$, $R^1$, $R^2$, $R^3$, $R^4$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{23}$, $R^{24}$, $R^{25}$, $R^{26}$, and $R^{27}$, are as defined for formulas (I) and (II), and each $R^{30}$, $R^{31}$, and $R^{32}$ is independently selected from hydrogen, halogen, $C_1$-$C_{10}$ alkyl which may be halogenated, $C_6$-$C_{10}$ aryl which may be halogenated, $C_2$-$C_{10}$ alkenyl, $C_7$-$C_{40}$ arylalkyl, $C_7$-$C_{40}$ alkylaryl, $C_8$-$C_{40}$ arylalkenyl, —NR′$_2$, —SR′, —OR, —OSiR′$_3$, —PR′$_2$, wherein R′ is one of hydrogen, halogen, $C_1$-$C_{10}$ alkyl, or $C_6$-$C_{10}$ aryl or two or more adjacent radicals $R^{30}$ to $R^{32}$ together form one or more saturated or unsaturated rings.

In at least one embodiment, $R^{14}$ is phenyl. In at least one embodiment, $R^5$ is

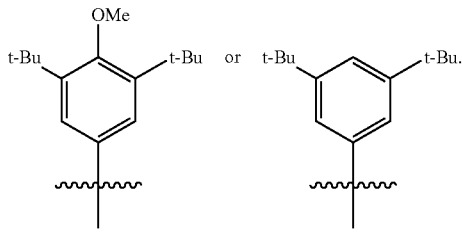 [SMILES: *c1cc(C(C)(C)C)c(OC)c(C(C)(C)C)c1 ; *c1cc(C(C)(C)C)cc(C(C)(C)C)c1]

$R^6$ and $R^7$ or $R^7$ and $R^8$ can combine to form a cyclobutyl ring, a cyclopentyl ring or cyclohexyl ring. It has been discovered that a cyclic ring fused to the indenyl ring (that does not contain the branched alkyl moiety at the 2-position ($R^9$)) provides an electron-rich indenyl ring that stabilizes the catalyst and can be used to yield high molecular weight EP copolymers. $R^6$ and $R^7$ can combine to form a cyclopentyl ring. $R^3$ is linear alkyl (such as methyl, ethyl, propyl, butyl, pentyl, hexyl, heptyl, octyl, nonyl, or decyl). In at least one embodiment, $R^3$ is methyl.

In at least one embodiment, $M^1$ is Hf, Zr or Ti, such as Hf or Zr, such as Zr.

In at least one embodiment, $M^2$ is Si, C or Ge, such as C or Si, such as Si.

$R^{15}$, $R^{16}$, and $R^{17}$ can be hydrogen, methyl, ethyl, propyl, butyl, pentyl, hexyl, heptyl, octyl, nonyl, decyl, undecyl, or dodecyl.

In at least one embodiment, $R^{19}$ is represented by the formula $R^a{}_2J$, where J is C, Si, or Ge, and each $R^a$ is, independently, hydrogen, halogen, $C_1$ to $C_{20}$ hydrocarbyl (such as methyl, ethyl, propyl, butyl, pentyl, hexyl, heptyl, octyl, nonyl, decyl, undecyl, or dodecyl) or a $C_1$ to $C_{20}$ substituted hydrocarbyl, and two $R^a$ can form a cyclic structure including aromatic, partially saturated, or saturated cyclic or fused ring system. $R^{19}$ can be a bridging group comprising carbon or silica, such as dialkylsilyl, such as $R^{19}$ is selected from $CH_2$, $CH_2CH_2$, $C(CH_3)_2$, $SiMe_2$, $SiPh_2$, SiMePh, silylcyclobutyl ($Si(CH_2)_3$), $(Ph)_2C$, $(p-(Et)_3SiPh)_2$C, and cyclopentasilylene ($Si(CH_2)_4$).

In at least one embodiment, each $R^1$ and $R^2$ is independently hydrocarbyl having from 1 to 20 carbon atoms, hydride, amide, alkoxide, sulfide, phosphide, halide, dienyl, amine, phosphine, ether, or a combination thereof. $R^1$ and $R^2$ may form a part of a fused ring or a ring system. In at least one embodiment, each $R^1$ and $R^2$ is independently halide or $C_1$ to $C_5$ alkyl (such as methyl). $R^1$ and $R^2$ can be independently chloro, bromo, methyl, ethyl, propyl, butyl, pentyl, hexyl, heptyl, octyl, nonyl, decyl, undecyl, and dodecyl.

Alternatively, $R^1$ and $R^2$ may also be joined together to form an alkanediyl group or a conjugated $C_4$-$C_{40}$ diene ligand which is coordinated to $M^1$ in a metallocyclopentene fashion. $R^1$ and $R^2$ may also be identical or different conjugated dienes, optionally substituted with one or more hydrocarbyl, tri(hydrocarbyl) silyl or tri(hydrocarbyl) silylhydrocarbyl, said dienes having up to 30 atoms not counting hydrogen and/or forming a π-complex with $M^1$.

Exemplary groups suitable for $R^1$ and or $R^2$ include 1,4-diphenyl, 1,3-butadiene, 1,3-pentadiene, 2-methyl 1,3-pentadiene, 2,4-hexadiene, 1-phenyl, 1,3-pentadiene, 1,4-dibenzyl, 1,3-butadiene, 1,4-ditolyl-1,3-butadiene, 1,4-bis(trimethylsilyl)-1,3-butadiene, and 1,4-dinaphthyl-1,3-butadiene. $R^1$ and $R^2$ can be identical and are $C_1$-$C_3$ alkyl or alkoxy, $C_6$-$C_{10}$ aryl or aryloxy, $C_2$-$C_4$ alkenyl, $C_7$-$C_{10}$ arylalkyl, $C_7$-$C_{12}$ alkylaryl, or halogen, such as chlorine.

In at least one embodiment, $R^3$ may be selected from substituted or unsubstituted methyl, ethyl, n-propyl, n-butyl, pentyl, hexyl, heptyl, or octyl. In at least one embodiment, $R^3$ in formula I or II is a hydrocarbyl radical having from 1 to 20 carbon atoms that is not substituted with a heteroatom.

In at least one embodiment, each of $R^4$, $R^6$, $R^7$, $R^8$, $R^{10}$, $R^{11}$, $R^{12}$, $R^{13}$ is independently hydrogen, halogen, $C_1$-$C_{10}$ alkyl which may be halogenated (such as $C_2$ to $C_{10}$, such as $C_3$ to $C_{10}$, such as methyl, ethyl, propyl, butyl, pentyl, hexyl, heptyl, octyl, nonyl, decyl, undecyl, dodecyl or an isomer thereof), $C_6$-$C_{10}$ aryl which may be halogenated, $C_2$-$C_{10}$ alkenyl, $C_7$-$C_{40}$ arylalkyl, $C_7$-$C_{40}$ alkylaryl, $C_8$-$C_{40}$ arylalkenyl, —NR′$_2$, —SR′, —OR, —OSiR′$_3$, —PR′$_2$, wherein R′ is one of hydrogen, halogen, $C_1$-$C_{10}$ alkyl, or $C_6$-$C_{10}$ aryl.

In at least one embodiment, each of $R^4$, $R^6$, $R^7$, $R^8$, $R^{10}$, $R^{11}$, $R^{12}$, $R^{13}$ is independently hydrogen, halogen, $C_1$-$C_{40}$ hydrocarbyl or $C_1$-$C_{40}$ substituted hydrocarbyl (such as $C_1$-$C_{10}$ alkyl which may be substituted, $C_6$-$C_{40}$ aryl which may be substituted, $C_2$-$C_{10}$ alkenyl, $C_7$-$C_{40}$ arylalkyl, $C_7$-$C_{40}$ alkylaryl, $C_8$-$C_{40}$ arylalkenyl).

In at least one embodiment, $R^5$ is hydrogen, halogen, $C_1$-$C_{40}$ hydrocarbyl or $C_1$-$C_{40}$ substituted hydrocarbyl (such as $C_1$-$C_{10}$ alkyl which may be substituted, $C_6$-$C_{40}$ aryl which may be substituted, $C_2$-$C_{10}$ alkenyl, $C_7$-$C_{40}$ arylalkyl, $C_7$-$C_{40}$ alkylaryl, $C_8$-$C_{40}$ arylalkenyl), —NR′$_2$, —SR′, —OR, —OSiR′$_3$, —PR′$_2$, where each R′ is hydrogen, halogen, $C_1$-$C_{10}$ alkyl, or $C_6$-$C_{10}$ aryl, or two or more adjacent radicals $R^5$ to $R^8$ together form one or more saturated or unsaturated rings.

In at least one embodiment, $R^{18}$ is hydrogen, halogen, $C_1$-$C_{10}$ alkyl (such as $C_2$ to $C_{10}$, such as $C_3$ to $C_{10}$, such as methyl, ethyl, propyl, butyl, pentyl, hexyl, heptyl, octyl, nonyl, decyl, undecyl, dodecyl or an isomer thereof) which may be halogenated, $C_6$-$C_{10}$ aryl (such as phenyl), which may be halogenated, preferably $R^{18}$ is hydrogen, methyl, ethyl, propyl, butyl, pentyl, hexyl, phenyl, octyl, nonyl, decyl, undecyl, dodecyl, preferably methyl, ethyl, or phenyl.

In at least one embodiment, $R^{15}$ and $R^{17}$ are independently hydrogen, $C_2$-$C_{20}$ alkyl (such as $C_3$ to $C_{16}$, such as $C_4$ to $C_{12}$, such as butyl, pentyl, hexyl, heptyl, octyl, nonyl, decyl, undecyl, dodecyl and isomers thereof) which may be halogenated, $C_6$-$C_{10}$ aryl which may be halogenated. $R^{15}$ and $R^{17}$ may be independently hydrogen, butyl, aryl, isopropyl, fluoroalkyl, n-propyl, n-butyl, iso-butyl, or tert-butyl. In at least one embodiment, $R^{15}$ and $R^{17}$ are independently hydrogen, $C_4$ to $C_{20}$, such as $C_4$ to $C_{12}$ alkyl, and $R^3$ is a hydrocarbyl radical having from 1 to 20 carbon atoms that is not substituted with a heteroatom.

In at least one embodiment, $R^{16}$ is selected from —NR'$_2$, —SR', —OR', —OSiR'$_3$ and PR'$_2$ radical, wherein R' is one of a hydrogen atom, halogen atom, a $C_1$-$C_{10}$ alkyl group, or a $C_6$-$C_{10}$ aryl group, such as wherein $R^{16}$ is —OR' wherein R' is a $C_1$-$C_{10}$ alkyl group, such as a methoxy, ethoxy, n-propoxy, isopropoxy, n-butoxy, iso-butoxy, sec-butoxy, or t-butoxy group, such as methoxy.

In at least one embodiment, $R^5$ is a substituted or unsubstituted $C_6$-$C_{10}$ aryl group (such as phenyl, naphthyl, indenyl, such as phenyl) which may be substituted (such as halogenated), e.g., a substituted or unsubstituted phenyl, napthyl, or indenyl. $R^5$ can be phenyl, such as 3'- and/or 5'-substituted phenyl, such as wherein the 3' and/or 5' substituents are selected from $C_2$-$C_{20}$ alkyl group which may be halogenated, a $C_6$-$C_{10}$ aryl group which may be halogenated, a $C_2$-$C_{10}$ alkenyl group, a $C_7$-$C_{20}$ arylalkyl group, a $C_7$-$C_{20}$ alkylaryl group, a $C_8$-$C_{20}$ arylalkenyl group. In at least one embodiment, where $R^5$ is phenyl, the 3' and 5' (i.e., $R^{24}$ and $R^{26}$) positions are independently butyl, aryl, isopropyl, or fluoroalkyl, such as wherein each is independently n-butyl, iso-butyl, or tert-butyl, such as wherein each is tert-butyl. In at least one embodiment, where $R^5$ is phenyl, the 3' and 5' positions are independently butyl, aryl, isopropyl, or fluoroalkyl (such as wherein each is selected from n-butyl-, iso-butyl-, and tert-butyl, such as wherein each is tert-butyl), and the phenyl is also substituted at the 4' position (i.e., $R^{25}$) with a —NR'$_2$, —SR', —OR', —OSiR'$_3$ or —PR'$_2$ radical, wherein R' is one of hydrogen, halogen, $C_1$-$C_{10}$ alkyl, or $C_6$-$C_{10}$ aryl, such as alkyloxy, such as methoxy, ethoxy, n-propoxy, isopropoxy, n-butoxy, iso-butoxy, sec-butoxy, or t-butoxy.

In at least one embodiment, $R^3$ is methyl, each of $R^{15}$ and $R^{17}$ is independently hydrogen, n-butyl, iso-butyl, or tert-butyl groups, and $R^{16}$ is hydrogen, methoxy, ethoxy, n-propoxy, isopropoxy, n-butoxy, iso-butoxy, sec-butoxy, or t-butoxy group, such as a methoxy group.

In at least one embodiment, $R^3$ is methyl, each of $R^{15}$, $R^{17}$, $R^{24}$ and $R^{26}$ is independently hydrogen, n-butyl-, iso-butyl-, or tert-butyl. $R^{16}$ and $R^{25}$ may be independently methoxy, ethoxy, n-propoxy, isopropoxy, n-butoxy, iso-butoxy, sec-butoxy, or t-butoxy group, such as a methoxy group.

In at least one embodiment, $R^6$ and $R^7$ form a saturated or unsaturated, single or multi-ring structure, preferably $R^6$ and $R^7$ form a saturated ring having 5 or 6 ring atoms, preferably $R^6$ and $R^7$ form a saturated ring having 5 ring atoms, such that the indenyl fragment is a substituted indacenyl group.

Some catalysts useful herein may be described as bridged bis(4-phenyl-indenyl) transition metal complexes wherein: at least one of the phenyl rings is substituted at the 3' and 5' positions (i.e., $R^{15}$, $R^{17}$, $R^{24}$ and $R^{26}$) by radicals which may be independently $C_2$-$C_{20}$ alkyl which may be halogenated, $C_6$-$C_{10}$ aryl which may be halogenated, $C_2$-$C_{10}$ alkenyl, $C_7$-$C_{20}$ arylalkyl, $C_7$-$C_{20}$ alkylaryl, $C_8$-$C_{20}$ arylalkenyl, wherein at least one of the phenyl rings substituted at the 3' and 5' positions is also substituted at the 4' position with —NR'$_2$, —SR', —OR', —OSiR'$_3$ or —PR'$_2$, wherein R' is one of hydrogen, halogen, $C_1$-$C_{10}$ alkyl, or $C_6$-$C_{10}$ aryl, and one or more of the remaining positions on the phenyl and/or indenyl ring(s) of the transition metal complex may be substituted. In at least one embodiment, each of the phenyl rings is substituted at the 3' and 5' positions by $C_2$-$C_{20}$ alkyl which may be halogenated, $C_6$-$C_{10}$ aryl which may be halogenated, $C_2$-$C_{10}$ alkenyl, $C_7$-$C_{20}$ arylalkyl, $C_7$-$C_{20}$ alkylaryl, $C_8$-$C_{20}$ arylalkenyl. $R^3$ may be linear $C_1$-$C_{10}$ alkyl which may be halogenated. In at least one embodiment, when either $R^3$ is methyl or ethyl, then one or both phenyl rings are substituted at the 3' and 5' positions by n-butyl, sec-butyl, or t-butyl. In at least one aspect, at least one 4-phenyl group is substituted at the 3' and 5' position with a tert-butyl group and at the 4' position with —OR', wherein R' is hydrogen, halogen, $C_1$-$C_{10}$ alkyl, such as methyl, or a $C_6$-$C_{10}$ aryl group.

In at least one embodiment, catalysts of the present disclosure are Zr— or Hf-based complexes. Additionally, some such catalysts are bridged by a dialkylsiladiyl group or a diisopropylamidoborane group.

In at least one embodiment, catalysts of the present disclosure are represented by formula (II) above where: $M^1$ is selected from titanium, zirconium, and hafnium, such as zirconium or hafnium, such as zirconium; $R^1$ and $R^2$ are independently hydrogen, $C_1$-$C_{10}$ alkyl (such as methyl, ethyl, butyl, pentyl, hexyl, heptyl, octyl, nonyl, decyl, undecyl, dodecyl and isomers thereof), or halogen (such as Cl, Br, F, or I).

In at least one embodiment, for catalysts represented by formula (II), $R^3$ is linear $C_1$-$C_{10}$ alkyl (such as $C_2$ to $C_{10}$, such as $C_3$ to $C_8$, such as methyl, ethyl, butyl, pentyl, hexyl, heptyl, octyl, nonyl, decyl, undecyl, or dodecyl) which may be halogenated.

In at least one embodiment, for catalysts represented by formula (II), $R^4$, $R^6$, $R^7$, $R^8$, $R^{10}$, $R^{11}$, $R^{12}$ and $R^{13}$ are independently hydrogen, halogen, $C_1$-$C_{10}$ alkyl (such as methyl, ethyl, butyl, pentyl, hexyl, heptyl, octyl, nonyl, decyl, undecyl, dodecyl or an isomer thereof) which may be halogenated, or $C_6$-$C_{10}$ aryl which may be halogenated. Two or more of $R^4$, $R^6$, $R^7$, $R^8$, $R^{10}$, $R^{11}$, $R^{12}$ and $R^{13}$ adjacent to each other together form one or more rings, such as 4-8 membered ring, such as a five membered ring, preferably $R^6$ and $R^7$ form a saturated ring having 5 ring carbon atoms.

In at least one embodiment, for catalysts represented by formula (II), $R^{19}$ is —SiR"$_2$— wherein each R" is independently hydrogen or $C_1$-$C_{10}$ alkyl, such as $C_1$-$C_2$ alkyl (e.g., methyl or ethyl) or $R^{19}$ is a $C_1$-$C_{10}$ dialkylamidoborane.

In at least one embodiment, for catalysts represented by formula (II), $R^{18}$ is independently hydrogen, halogen, $C_3$-$C_{10}$ alkyl which may be halogenated, $C_6$-$C_{10}$ aryl which may be halogenated.

In at least one embodiment, for catalysts represented by formula (II), each $R^{15}$ and $R^{17}$ is independently hydrogen, $C_1$-$C_{20}$ alkyl which may be halogenated, $C_6$-$C_{10}$ aryl group which may be halogenated, $C_2$-$C_{10}$ alkenyl, $C_7$-$C_{20}$ arylalkyl, $C_7$-$C_{20}$ alkylaryl, or $C_8$-$C_{20}$ arylalkenyl. In at least one embodiment, $R^{15}$ and $R^{17}$ are independently hydrogen, n-butyl, sec-butyl, or tertiary butyl, aryl, isopropyl, fluoroalkyl, trialkyl silyl, or other groups of similar size, such as butyl, such as n-butyl-, iso-butyl-, and tert-butyl.

In at least one embodiment, for catalysts represented by formula (I), (II) or (III), $R^{16}$ and/or $R^{25}$ is selected from $(XR'_n)$—, wherein X is a Group 14-17 heteroatom having an atomic weight of 13 to 79 and R' is one of a hydrogen atom, halogen atom, a $C_1$-$C_{10}$ alkyl group, or a $C_6$-$C_{10}$ aryl group and n is 0, 1, 2, or 3. $R^{16}$ and/or $R^{25}$ may be —NR'$_2$, —SR', —OR', —OSiR'$_3$, —SiR'$_3$, or —PR'$_2$, such as $R^{16}$ and/or $R^{25}$ is —NR'$_2$, —SR', —OR', —OSiR'$_3$, or —PR'$_2$, wherein R' is one of hydrogen, halogen, $C_1$-$C_{10}$ alkyl or $C_6$-$C_{10}$ aryl. $R^{16}$ and/or $R^{25}$ can be —NR'$_2$ or —PR'$_2$, or $R^{16}$ and/or $R^{25}$ is —OR'. In at least one embodiment, $R^{16}$ and/or $R^{25}$ is —NH$_2$, —NH(methyl), —NH(ethyl), —NH(n-propyl), —NH(iso-propyl), —NH(phenyl), —N(methyl)$_2$, —N(methyl) (ethyl), —N(n-propyl)(phenyl), —N(iso-propyl)(phenyl), —N(methyl)(phenyl), N(ethyl)(ethyl), —N(ethyl)(n-propyl), —N(ethyl)(iso-propyl), —N(n-propyl)(phenyl), —N(phenyl)(phenyl), —SH, —S(methyl), —S(ethyl), —S(n-propyl), —S(iso-propyl), —S(n-butyl), —S(iso-butyl), —S(sec-butyl), —S(tert-butyl), —S(phenyl), —OH, —O(methyl), —O(ethyl), —O(n-propyl), —O(iso-propyl), —O(n-butyl), —O(iso-butyl), —O(sec-butyl), —O(tert-butyl), —O(phenyl), —OSiH$_3$, —OSiH$_2$(methyl), —OSiH(methyl)$_2$, —OSi(methyl)$_3$, —OSiH$_2$(ethyl), —OSiH(ethyl)$_2$, —OSi(ethyl)$_3$, —OSiH$_2$(propyl), —OSiH(propyl)$_2$, —OSi(propyl)$_3$, —OSiH$_2$(butyl), —OSiH(butyl)$_2$, —OSi(butyl)$_3$, —OSiH(methyl)(ethyl), —OSi(methyl)(ethyl)$_2$, —OSiH(methyl)(propyl), —OSi(methyl)(propyl)$_2$, —OSiH(methyl)(butyl), —OSi(methyl)(butyl)$_2$, —OSiH(ethyl)(propyl), —OSi(ethyl)(propyl)$_2$, —OSiH(ethyl)(butyl), —OSi(ethyl)(butyl)$_2$, —PH$_2$, —PH(methyl), —PH(ethyl), —PH(n-propyl), —PH(iso-propyl), —PH(phenyl), —P(methyl)$_2$, —P(methyl)(ethyl), —P(n-propyl)(phenyl), —P(iso-propyl)(phenyl), —P(methyl)(phenyl), P(ethyl)(ethyl), —P(ethyl)(n-propyl), —P(ethyl)(iso-propyl), —P(n-propyl)(phenyl), —P(phenyl)(phenyl), —SiH$_3$, —SiH$_2$(methyl), —SiH(methyl)$_2$, —Si(methyl)$_3$, —SiH$_2$(ethyl), —SiH(ethyl)$_2$, —OSi(ethyl)$_3$, —SiH$_2$(propyl), —SiH(propyl)$_2$, —Si(propyl)$_3$, —SiH$_2$(butyl), —SiH(butyl)$_2$, —Si(butyl)$_3$, —SiH(methyl)(ethyl), —Si(methyl)(ethyl)$_2$, —SiH(methyl)(propyl), —Si(methyl)(propyl)$_2$, —SiH(methyl)(butyl), —Si(methyl)(butyl)$_2$, —OSiH(ethyl)(propyl), —OSi(ethyl)(propyl)$_2$, —OSiH(ethyl)(butyl), or —OSi(ethyl)(butyl)$_2$.

In at least one embodiment, for catalysts represented by formula (I), (II) or (III), $R^{15}$, $R^{17}$, $R^{24}$, and $R^{26}$ are independently hydrogen, n-butyl, sec-butyl, tertiary butyl, aryl, isopropyl, such as tert-butyl; and at least one of $R^{16}$ and $R^{25}$ is —OH, —O(methyl), —O(ethyl), —O(n-propyl), —O(iso-propyl), —O(n-butyl), —O(iso-butyl), —O(sec-butyl), —O(tert-butyl), —O(phenyl), such as —O(methyl). In at least one embodiment, $R^{16}$ and $R^{25}$ may be hydrogen, —OH, —O(methyl), —O(ethyl), —O(n-propyl), —O(iso-propyl), —O(n-butyl), —O(iso-butyl), —O(sec-butyl), —O(tert-butyl), —O(phenyl), such as $R^{25}$ is —O(methyl).

In at least one embodiment, each $R^1$ and $R^2$ is independently halogen, such as $C_1$; $R^3$ is a $C_1$-$C_{10}$ alkyl group, such as methyl; each of $R^4$, $R^6$, $R^7$, $R^8$, $R^{10}$, $R^{11}$, $R^{12}$, and $R^{13}$ is independently hydrogen or $C_1$-$C_{10}$ alkyl, such as each is hydrogen; each $R^{24}$ and $R^{26}$ is a $C_1$-$C_{10}$ alkyl group, such as n-butyl, iso-butyl, and tert-butyl, such as tert-butyl; and wherein each $R^{25}$ is —OH, —O(methyl), —O(ethyl), —O(n-propyl), —O(iso-propyl), —O(n-butyl), —O(iso-butyl), —O(sec-butyl), —O(tert-butyl), —O(phenyl), such as —O(methyl).

In at least one embodiment, catalysts represented by formula (II) include those wherein each $R^1$ and $R^2$ are chlorine; $R^3$ is methyl; each $R^4$, $R^6$, $R^7$, $R^8$, $R^{10}$, $R^{11}$ and $R^{12}$ are hydrogen; $R^{19}$ is —Si(CH$_3$)$_2$—; $R^9$ is isopropyl; $R^{15}$, $R^{16}$, $R^{17}$ are hydrogen, and $R^{24}$ and $R^{26}$ are both a tert-butyl group.

In at least one embodiment, catalysts represented by formula (II) include those wherein each $R^1$ and $R^2$ are chlorine or methyl; $R^3$ is methyl; each $R^4$, $R^8$, $R^{10}$, $R^{11}$ and $R^{12}$ are hydrogen; $R^{19}$ is —Si(CH$_3$)$_2$—; $R^9$ is isopropyl; $R^{15}$, $R^{16}$, $R^{17}$ are hydrogen, and $R^{24}$ and $R^{26}$ are both a tert-butyl group; $R^{25}$ is methoxy and $R^6$ and $R^7$ form a saturated ring having 5 carbon ring atoms.

In at least one embodiment, catalysts represented by formula (I), formula (II), or formula (III) include: dimethylsiladiyl (2-methyl, 4-[3',5'-di-tert-butyl-4'-methoxyphenyl]indenyl)(2-isopropyl, 4-[o-biphenyl] indenyl)ZrCl$_2$; dimethylsiladiyl (2-methyl, 4-[3',5'-di-tert-butyl-4'-methoxyphenyl], 1,5,6,7-tetrahydro-s-indacenyl)(2-isopropyl, 4-[o-biphenyl]indenyl)ZrCl$_2$; dimethylsiladiyl (2-ethyl, 4-[3',5'-di-tert-butyl-4'-methoxyphenyl] indenyl)(2-isopropyl, 4-[o-biphenyl] indenyl)ZrCl$_2$; dimethylsiladiyl (2-propyl, 4-[3',5'-di-tert-butyl-4'-methoxyphenyl] indenyl)(2-isopropyl, 4-[o-biphenyl] indenyl)ZrCl$_2$; dimethylsiladiyl (2-butyl, 4-[3',5'-di-tert-butyl-4'-methoxyphenyl] indenyl)(2-isopropyl, 4-[o-biphenyl]indenyl)ZrCl$_2$; dimethylsiladiyl (2-methyl, 4-[3',5'-bistrifluoromethyl-4'-methoxyphenyl]indenyl)(2-isopropyl, 4-[o-biphenyl] indenyl)ZrCl$_2$; dimethylsiladiyl (2-methyl, 4-[3',5'-bistrifluoromethyl-4'-methoxyphenyl] indenyl)(2-isopropyl, 4-[o-biphenyl] indenyl)Zr(CH$_3$)$_2$; dimethylsiladiyl (2-ethyl, 4-[3',5'-bistrifluoromethyl-4'-methoxyphenyl] indenyl)(2-isopropyl, 4-[o-biphenyl] indenyl)ZrCl$_2$; dimethylsiladiyl (2-propyl, 4-[3',5'-bistrifluoromethyl-4'-methoxyphenyl] indenyl)(2-isopropyl, 4-[o-biphenyl] indenyl)ZrCl$_2$; dimethylsiladiyl (2-butyl, 4-[3',5'-bistrifluoromethyl-4'-methoxyphenyl] indenyl)(2-isopropyl, 4-[o-biphenyl] indenyl)ZrCl$_2$; dimethylsiladiyl (2-methyl, 4-[3',5'-di-iso-propyl-4'-methoxyphenyl] indenyl)(2-isopropyl, 4-[o-biphenyl] indenyl)ZrCl$_2$; dimethylsiladiyl (2-ethyl, 4-[3',5'-di-iso-propyl-4'-methoxyphenyl] indenyl)(2-isopropyl, 4-[o-biphenyl] indenyl)ZrCl$_2$; dimethylsiladiyl (2-propyl, 4-[3',5'-di-iso-propyl-4'-methoxyphenyl] indenyl) (2-isopropyl, 4-[o-biphenyl] indenyl)ZrCl$_2$; dimethylsiladiyl (2-butyl, 4-[3',5'-di-iso-propyl-4'-methoxyphenyl] indenyl)(2-isopropyl, 4-[o-biphenyl] indenyl)ZrCl$_2$; dimethylsiladiyl (2-methyl, 4-[3',5'-di-phenyl-4'-methoxyphenyl] indenyl)(2-isopropyl, 4-[o-biphenyl]indenyl)ZrCl$_2$; dimethylsiladiyl (2-ethyl, 4-[3',5'-di-phenyl-4'-methoxyphenyl] indenyl)(2-isopropyl, 4-[o-biphenyl] indenyl)ZrCl$_2$; dimethylsiladiyl (2-propyl, 4-[3',5'-di-phenyl-4'-methoxyphenyl] indenyl)(2-isopropyl, 4-[o-biphenyl] indenyl)ZrCl$_2$; dimethylsiladiyl (2-butyl, 4-[3',5'-di-phenyl-4'-methoxyphenyl] indenyl)(2-isopropyl, 4-[o-biphenyl]indenyl)ZrCl$_2$; dimethylamidoborane (2-methyl, 4-[3',5'-di-tert-butyl-4'-methoxyphenyl]indenyl) (2-isopropyl, 4-[o-biphenyl] indenyl)ZrCl$_2$; dimethylamidoborane (2-ethyl, 4-[3',5'-di-tert-butyl-4'-methoxyphenyl] indenyl)(2-isopropyl, 4-[o-biphenyl] indenyl)ZrCl$_2$; dimethylamidoborane (2-propyl, 4-[3',5'-di-tert-butyl-4'-methoxyphenyl] indenyl)(2-isopropyl, 4-[o-biphenyl] indenyl)ZrCl$_2$; dimethylamidoborane (2-butyl, 4-[3',5'-di-tert-butyl-4'-methoxyphenyl] indenyl)(2-isopropyl, 4-[o-biphenyl] indenyl)ZrCl$_2$; dimethylamidoborane (2-methyl, 4-[3',5'-bistrifluoromethyl-4'-methoxyphenyl] indenyl)(2-isopropyl, 4-[o- biphenyl]indenyl)ZrCl$_2$; dimethylamidoborane (2-ethyl, 4-[3',5'-bistrifluoromethyl-4'-methoxyphenyl]indenyl)(2-isopropyl, 4-[o-biphenyl] indenyl)ZrCl$_2$; dimethylamidoborane (2-propyl, 4-[3',5'-bistrifluoromethyl-4'-methoxyphenyl] indenyl)(2-isopropyl, 4-[o-biphenyl] indenyl)ZrCl$_2$; dimethylamidoborane (2-butyl, 4-[3',5'-bistrifluoromethyl-4'-methoxyphenyl] indenyl)(2-isopropyl, 4-[o-biphenyl] indenyl)ZrCl$_2$; dimethylamidoborane (2-methyl, 4-[3',5'-di-iso-propyl-4'-methoxyphenyl] indenyl)(2-isopropyl, 4-[o-biphenyl] indenyl)ZrCl$_2$; dimethylamidoborane (2-ethyl, 4-[3',5'-di-iso-propyl-4'-methoxyphenyl] indenyl)(2-isopropyl, 4-[o-biphenyl] indenyl)ZrCl$_2$; dimethylamidoborane (2-propyl, 4-[3',5'-di-iso-propyl-4'-methoxyphenyl] indenyl)(2-isopropyl, 4-[o-biphenyl] indenyl)ZrCl$_2$; dimethylamidoborane (2-tert-butyl, 4-[3',5'-di-iso-propyl-4'-methoxyphenyl] indenyl)(2-isopropyl, 4-[o-biphenyl]indenyl)ZrCl$_2$; dimethylamidoborane (2-methyl, 4-[3', 5'-di-phenyl-4'-methoxyphenyl]indenyl)(2-isopropyl, 4-[o-biphenyl] indenyl)ZrCl$_2$; dimethylamidoborane (2-ethyl, 4-[3',5'-di-phenyl-4'-methoxyphenyl] indenyl)(2-isopropyl, 4-[o-biphenyl] indenyl)ZrCl$_2$; dimethylamidoborane (2-propyl, 4-[3',5'-di-phenyl-4'-methoxyphenyl] indenyl)(2-isopropyl, 4-[o-biphenyl] indenyl)ZrCl$_2$; dimethylamidoborane (2-butyl, 4-[3',5'-diphenyl-4'-methoxyphenyl] indenyl)(2-isopropyl, 4-[o-biphenyl] indenyl)ZrCl$_2$; di-iso-propylamidoborane (2-methyl, 4-[3',5'-di-tert-butyl-4'-methoxyphenyl] indenyl)(2-isopropyl, 4-[o-biphenyl] indenyl)ZrCl$_2$; di-iso-propylamidoborane (2-ethyl, 4-[3',5'-di-tert-butyl-4'-methoxyphenyl] indenyl)(2-isopropyl, 4-[o-biphenyl] indenyl)ZrCl$_2$; di-iso-propylamidoborane (2-propyl, 4-[3',5'-di-tert-butyl-4'-methoxyphenyl] indenyl)(2-isopropyl, 4-[o-biphenyl] indenyl)ZrCl$_2$; di-iso-propylamidoborane (2-butyl, 4-[3',5'-di-tert-butyl-4'-methoxyphenyl] indenyl)(2-isopropyl, 4-[o-biphenyl] indenyl)ZrCl$_2$; di-iso-propylamidoborane (2-methyl, 4-[3',5'-bistrifluoromethyl-4'-methoxyphenyl] indenyl)(2-isopropyl, 4-[o-biphenyl] indenyl)ZrCl$_2$; di-iso-propylamidoborane (2-ethyl, 4-[3',5'-bistrifluoromethyl-4'-methoxyphenyl] indenyl)(2-isopropyl, 4-[o-biphenyl] indenyl)ZrCl$_2$; di-iso-propylamidoborane (2-propyl, 4-[3',5'-bistrifluoromethyl-4'-methoxyphenyl] indenyl)(2-isopropyl, 4-[o-biphenyl] indenyl)ZrCl$_2$; di-iso-propylamidoborane (2-butyl, 4-[3',5'-bistrifluoromethyl-4'-methoxyphenyl] indenyl)(2-isopropyl, 4-[o-biphenyl] indenyl)ZrCl$_2$; di-iso-propylamidoborane (2-methyl, 4-[3',5'-di-iso-propyl-4'-methoxyphenyl] indenyl)(2-isopropyl, 4-[o-biphenyl] indenyl)ZrCl$_2$; di-iso-propylamidoborane (2-ethyl, 4-[3',5'-di-iso-propyl-4'-methoxyphenyl] indenyl)(2-isopropyl, 4-[o-biphenyl] indenyl)ZrCl$_2$; di-iso-propylamidoborane (2-propyl, 4-[3',5'-di-iso-propyl-4'-methoxyphenyl] indenyl)(2-isopropyl, 4-[o-biphenyl] indenyl)ZrCl$_2$; di-iso-propylamidoborane (2-tert-butyl, 4-[3',5'-di-iso-propyl-4'-methoxyphenyl] indenyl)(2-isopropyl, 4-[o-biphenyl] indenyl)ZrCl$_2$; di-iso-propylamidoborane (2-methyl, 4-[3',5'-diphenyl-4'-methoxyphenyl] indenyl)(2-isopropyl, 4-[o-biphenyl] indenyl)ZrCl$_2$; di-iso-propylamidoborane (2-ethyl, 4-[3',5'-di-phenyl-4'-methoxyphenyl] indenyl)(2-isopropyl, 4-[o-biphenyl] indenyl)ZrCl$_2$; di-iso-propylamidoborane (2-propyl, 4-[3',5'-diphenyl-4'-methoxyphenyl] indenyl)(2-isopropyl, 4-[o-biphenyl] indenyl)ZrCl$_2$; di-iso-propylamidoborane (2-butyl, 4-[3',5'-diphenyl-4'-methoxyphenyl] indenyl)(2-isopropyl, 4-[o-biphenyl] indenyl)ZrCl$_2$; bis(trimethylsilyl) amidoborane (2-methyl, 4-[3',5'-di-tert-butyl-4'-methoxyphenyl] indenyl)(2-isopropyl, 4-[o-biphenyl] indenyl)ZrCl$_2$; bis(trimethylsilyl)amidoborane (2-ethyl, 4-[3',5'-di-tert-butyl-4'-methoxyphenyl] indenyl)(2-isopropyl, 4-[o-biphenyl] indenyl)ZrCl$_2$; bis(trimethylsilyl) amidoborane (2-propyl, 4-[3',5'-di t-butyl-4'-methoxyphenyl] indenyl)(2-isopropyl, 4-[o-biphenyl] indenyl)ZrCl$_2$; bis(t-rimethylsilyl)amidoborane (2-butyl, 4-[3',5'-di-tert-butyl-4'-methoxyphenyl] indenyl)(2-isopropyl, 4-[o-biphenyl] indenyl)ZrCl$_2$; bis(trimethylsilyl) amidoborane (2-methyl, 4-[3', 5'-bis trifluoromethyl-4'-methoxyphenyl] indenyl)(2-isopropyl, 4-[o-biphenyl] indenyl)ZrCl$_2$; bis(trimethylsilyl) amidoborane (2-ethyl, 4-[3',5'-bis trifluoromethyl-4'-methoxyphenyl] indenyl)(2-isopropyl, 4-[o-biphenyl] indenyl)ZrCl$_2$; bis (trimethylsilyl) amidoborane (2-propyl, 4-[3', 5'-bis trifluoromethyl-4'-methoxyphenyl]indenyl)(2-isopropyl, 4-[o-biphenyl] indenyl)ZrCl$_2$; bis(trimethylsilyl) amidoborane (2-butyl, 4-[3',5'-bis-trifluorometllyl-4'-methoxyphenyl] indenyl)(2-isopropyl, 4-[o-biphenyl] indenyl)ZrCl$_2$; bis(trimethylsilyl) amidoborane (2-methyl, 4-[3',5'-di-iso-propyl-4'-methoxyphenyl] indenyl)(2-isopropyl, 4-[o-biphenyl] indenyl)ZrCl$_2$; bis(trimethylsilyl)amidoborane (2-ethyl, 4-[3',5'-di-iso-propyl-4'-methoxyphenyl] indenyl)(2-isopropyl, 4-[o-biphenyl] indenyl)ZrCl$_2$; bis(t-rimethylsilyl)amidoborane (2-propyl, 4-[3',5'-di-iso-propyl-4'-methoxyphenyl] indenyl)(2-isopropyl, 4-[o-biphenyl] indenyl)ZrCl$_2$; bis(trimethylsilyl)amidoborane (2-butyl, 4-[3',5'-di-iso-propyl-4'-methoxyphenyl] indenyl)(2-isopropyl, 4-[o-biphenyl] indenyl)ZrCl$_2$; bis(trimethylsilyl)amidoborane (2-methyl, 4-[3',5'-diphenyl-4'-methoxyphenyl] indenyl)(2-isopropyl, 4-[o-biphenyl] indenyl)ZrCl$_2$; bis(t-rimethylsilyl)amidoborane (2-ethyl, 4-[3',5'-diphenyl-4'-methoxyphenyl] indenyl)(2-isopropyl, 4-[o-biphenyl] indenyl)ZrCl$_2$; bis(trimethylsilyl)amidoborane (2-propyl, 4-[3', 5'-diphenyl-4'-methoxyphenyl] indenyl) (2-isopropyl, 4-[o-biphenyl] indenyl)ZrCl$_2$; bis(trimethylsilyl)amidoborane (2-butyl, 4-[3',5'-diphenyl-4'-methoxyphenyl] indenyl)(2-isopropyl, 4-[o-biphenyl] indenyl)ZrCl$_2$.

In at least one embodiment, catalysts represented by formula (I), formula (II), or formula (III) include: dimethylsiladiyl (2-methyl, 4-[3',5'-di-tert-butyl-4'-methoxyphenyl]indenyl)(2-isopropyl, 4-[o-biphenyl] indenyl)Zr(CH$_3$)$_2$; dimethylsiladiyl (2-methyl, 4-[3',5'-di-tert-butyl-4'-methoxyphenyl], 1,5,6,7-tetrahydro-s-indacenyl)(2-isopropyl, 4-[o-biphenyl]indenyl)Zr(CH$_3$)$_2$; dimethylsiladiyl (2-ethyl, 4-[3',5'-di-tert-butyl-4'-methoxyphenyl]indenyl)(2-isopropyl, 4-[o-biphenyl] indenyl)Zr(CH$_3$)$_2$; dimethylsiladiyl (2-propyl, 4-[3',5'-di-tert-butyl-4'-methoxyphenyl] indenyl)(2-isopropyl, 4-[o-biphenyl] indenyl)Zr(CH$_3$)$_2$; dimethylsiladiyl (2-butyl, 4-[3',5'-di-tert-butyl-4'-methoxyphenyl] indenyl)(2-isopropyl, 4-[o-biphenyl] indenyl)Zr(CH$_3$)$_2$; dimethylsiladiyl (2-methyl, 4-[3',5'-bistrifluoromethyl-4'-methoxyphenyl] indenyl)(2-isopropyl, 4-[o-biphenyl] indenyl)Zr(CH$_3$)$_2$; dimethylsiladiyl (2-ethyl, 4-[3',5'-bistrifluoromethyl-4'-methoxyphenyl] indenyl) (2-isopropyl, 4-[o-biphenyl]indenyl)Zr(CH$_3$)$_2$; dimethylsiladiyl (2-propyl, 4-[3',5'-bistrifluoromethyl-4'-methoxyphenyl]indenyl)(2-isopropyl, 4-[o-biphenyl] indenyl)Zr(CH$_3$)$_2$; dimethylsiladiyl (2-butyl, 4-[3',5'-bistrifluoromethyl-4'-methoxyphenyl] indenyl)(2-isopropyl, 4-[o-biphenyl] indenyl)Zr(CH$_3$)$_2$; dimethylsiladiyl (2-methyl, 4-[3',5'-di-iso-propyl-4'-methoxyphenyl] indenyl)(2-isopropyl, 4-[o-biphenyl] indenyl)Zr(CH$_3$)$_2$; dimethylsiladiyl (2-ethyl, 4-[3',5'-di-iso-propyl-4'-methoxyphenyl] indenyl)(2-isopropyl, 4-[o-biphenyl] indenyl)Zr(CH$_3$)$_2$; dimethylsiladiyl (2-propyl, 4-[3',5'-di-iso-propyl-4'-methoxyphenyl] indenyl) (2-isopropyl, 4-[o-biphenyl]indenyl)Zr(CH$_3$)$_2$; dimethylsiladiyl (2-butyl, 4-[3',5'-di-iso-propyl-4'-methoxyphenyl]indenyl)(2-isopropyl, 4-[o-biphenyl] indenyl)Zr(CH$_3$)$_2$; dimethylsiladiyl (2-methyl, 4-[3',5'-di-phenyl-4'-methoxyphenyl] indenyl)(2-isopropyl, 4-[o-biphenyl] indenyl)Zr(CH$_3$)$_2$; dimethylsiladiyl (2-ethyl, 4-[3',5'-di-phenyl-4'-methoxyphenyl] indenyl)(2-isopropyl, 4-[o-biphenyl]

indenyl)Zr(CH$_3$)$_2$; dimethylsiladiyl (2-propyl, 4-[3',5'-diphenyl-4'-methoxyphenyl]indenyl)(2-isopropyl, 4-[o-biphenyl] indenyl)Zr(CH$_3$)$_2$; dimethylsiladiyl (2-butyl, 4-[3',5'-diphenyl-4'-methoxyphenyl] indenyl)(2-isopropyl, 4-[o-biphenyl] indenyl)Zr(CH$_3$)$_2$; dimethylamidoborane (2-methyl, 4-[3',5'-di-tert-butyl-4'-methoxyphenyl] indenyl)(2-isopropyl, 4-[o-biphenyl] indenyl)Zr(CH$_3$)$_2$; dimethylamidoborane (2-ethyl, 4-[3',5'-di-tert-butyl-4'-methoxyphenyl] indenyl)(2-isopropyl, 4-[o-biphenyl] indenyl)Zr(CH$_3$)$_2$; dimethylamidoborane (2-propyl, 4-[3',5'-di-tert-butyl-4'-methoxyphenyl] indenyl)(2-isopropyl, 4-[o-biphenyl] indenyl)Zr(CH$_3$)$_2$; dimethylamidoborane (2-butyl, 4-[3',5'-di-tert-butyl-4'-methoxyphenyl] indenyl)(2-isopropyl, 4-[o-biphenyl] indenyl)Zr(CH$_3$)$_2$; dimethylamidoborane (2-methyl, 4-[3',5'-bistrifluoromethyl-4'-methoxyphenyl] indenyl)(2-isopropyl, 4-[o-biphenyl] indenyl)Zr(CH$_3$)$_2$; dimethylamidoborane (2-ethyl, 4-[3',5'-bistrifluoromethyl-4'-methoxyphenyl] indenyl)(2-isopropyl, 4-[o-biphenyl] indenyl)Zr(CH$_3$)$_2$; dimethylamidoborane (2-propyl, 4-[3',5'-bistrifluoromethyl-4'-methoxyphenyl] indenyl)(2-isopropyl, 4-[o-biphenyl] indenyl)Zr(CH$_3$)$_2$; dimethylamidoborane (2-butyl, 4-[3', 5'-bistrifluoromethyl-4'-methoxyphenyl] indenyl)(2-isopropyl, 4-[o-biphenyl] indenyl)Zr(CH$_3$)$_2$; dimethylamidoborane (2-methyl, 4-[3',5'-di-iso-propyl-4'-methoxyphenyl] indenyl)(2-isopropyl, 4-[o-biphenyl] indenyl)Zr(CH$_3$)$_2$; dimethylamidoborane (2-ethyl, 4-[3', 5'-di-iso-propyl-4'-methoxyphenyl] indenyl)(2-isopropyl, 4-[o-biphenyl] indenyl)Zr(CH$_3$)$_2$; dimethylamidoborane (2-propyl, 4-[3',5'-di-iso-propyl-4'-methoxyphenyl] indenyl)(2-isopropyl, 4-[o-biphenyl] indenyl)Zr(CH$_3$)$_2$; dimethylamidoborane (2-tert-butyl, 4-[3', 5'-di-iso-propyl-4'-methoxyphenyl] indenyl)(2-isopropyl, 4-[o-biphenyl] indenyl)Zr(CH$_3$)$_2$; dimethylamidoborane (2-methyl, 4-[3', 5'-di-phenyl-4'-methoxyphenyl] indenyl)(2-isopropyl, 4-[o-biphenyl] indenyl)Zr(CH$_3$)$_2$; dimethylamidoborane (2-ethyl, 4-[3',5'-di-phenyl-4'-methoxyphenyl] indenyl)(2-isopropyl, 4-[o-biphenyl] indenyl)Zr(CH$_3$)$_2$; dimethylamidoborane (2-propyl, 4-[3', 5'-diphenyl-4'-methoxyphenyl] indenyl)(2-isopropyl, 4-[o-biphenyl] indenyl)Zr(CH$_3$)$_2$; dimethylamidoborane (2-butyl, 4-[3',5'-diphenyl-4'-methoxyphenyl] indenyl)(2-isopropyl, 4-[o-biphenyl] indenyl)Zr(CH$_3$)$_2$; di-iso-propylamidoborane (2-methyl, 4-[3', 5'-di-tert-butyl-4'-methoxyphenyl] indenyl)(2-isopropyl, 4-[o-biphenyl] indenyl)Zr(CH$_3$)$_2$; di-iso-propylamidoborane (2-ethyl, 4-[3',5'-di-tert-butyl-4'-methoxyphenyl] indenyl)(2-isopropyl, 4-[o-biphenyl] indenyl)Zr(CH$_3$)$_2$; di-iso-propylamidoborane (2-propyl, 4-[3',5'-di-tert-butyl-4'-methoxyphenyl] indenyl)(2-isopropyl, 4-[o-biphenyl] indenyl)Zr(CH$_3$)$_2$; di-iso-propylamidoborane (2-butyl, 4-[3', 5'-di-tert-butyl-4'-methoxyphenyl] indenyl)(2-isopropyl, 4-[o-biphenyl] indenyl)Zr(CH$_3$)$_2$; di-iso-propylamidoborane (2-methyl, 4-[3',5'-bistrifluoromethyl-4'-methoxyphenyl] indenyl)(2-isopropyl, 4-[o-biphenyl] indenyl)Zr(CH$_3$)$_2$; di-iso-propylamidoborane (2-ethyl, 4-[3',5'-bistrifluoromethyl-4'-methoxyphenyl] indenyl)(2-isopropyl, 4-[o-biphenyl] indenyl)Zr(CH$_3$)$_2$; di-iso-propylamidoborane (2-propyl, 4-[3',5'-bistrifluoromethyl-4'-methoxyphenyl]indenyl)(2-isopropyl, 4-[o-biphenyl] indenyl)Zr(CH$_3$)$_2$; di-iso-propylamidoborane (2-butyl, 4-[3',5'-bistrifluoromethyl-4'-methoxyphenyl] indenyl)(2-isopropyl, 4-[o-biphenyl] indenyl)Zr(CH$_3$)$_2$; di-iso-propylamidoborane (2-methyl, 4-[3',5'-di-iso-propyl-4'-methoxyphenyl] indenyl)(2-isopropyl, 4-[o-biphenyl] indenyl)Zr(CH$_3$)$_2$; di-iso-propylamidoborane (2-ethyl, 4-[3',5'-di-iso-propyl-4'-methoxyphenyl] indenyl)(2-isopropyl, 4-[o-biphenyl] indenyl)Zr(CH$_3$)$_2$; di-iso-propylamidoborane (2-propyl, 4-[3',5'-di-iso-propyl-4'-methoxyphenyl] indenyl)(2-isopropyl, 4-[o-biphenyl] indenyl)Zr(CH$_3$)$_2$; di-iso-propylamidoborane (2-tert-butyl, 4-[3',5'-di-iso-propyl-4'-methoxyphenyl] indenyl)(2-isopropyl, 4-[o-biphenyl] indenyl)Zr(CH$_3$)$_2$; di-iso-propylamidoborane (2-methyl, 4-[3',5'-diphenyl-4'-methoxyphenyl] indenyl)(2-isopropyl, 4-[o-biphenyl] indenyl)Zr(CH$_3$)$_2$; di-iso-propylamidoborane (2-ethyl, 4-[3',5'-di-phenyl-4'-methoxyphenyl] indenyl)(2-isopropyl, 4-[o-biphenyl] indenyl)Zr(CH$_3$)$_2$; di-iso-propylamidoborane (2-propyl, 4-[3',5'-diphenyl-4'-methoxyphenyl] indenyl)(2-isopropyl, 4-[o-biphenyl] indenyl)Zr(CH$_3$)$_2$; di-iso-propylamidoborane (2-butyl, 4-[3',5'-diphenyl-4'-methoxyphenyl] indenyl)(2-isopropyl, 4-[o-biphenyl] indenyl)Zr(CH$_3$)$_2$; bis(trimethylsilyl) amidoborane (2-methyl, 4-[3',5'-di-tert-butyl-4'-methoxyphenyl] indenyl)(2-isopropyl, 4-[o-biphenyl] indenyl)Zr(CH$_3$)$_2$; bis(trimethylsilyl)amidoborane (2-ethyl, 4-[3',5'-di-tert-butyl-4'-methoxyphenyl] indenyl)(2-isopropyl, 4-[o-biphenyl] indenyl)Zr(CH$_3$)$_2$; bis(trimethylsilyl) amidoborane (2-propyl, 4-[3',5'-di t-butyl-4'-methoxyphenyl] indenyl)(2-isopropyl, 4-[o-biphenyl] indenyl)Zr(CH$_3$)$_2$; bis(trimethylsilyl)amidoborane (2-butyl, 4-[3',5'-di-tert-butyl-4'-methoxyphenyl] indenyl)(2-isopropyl, 4-[o-biphenyl] indenyl)Zr(CH$_3$)$_2$; bis(trimethylsilyl) amidoborane (2-methyl, 4-[3',5'-bis trifluoromethyl-4'-methoxyphenyl] indenyl)(2-isopropyl, 4-[o-biphenyl]indenyl)Zr(CH$_3$)$_2$; bis (trimethylsilyl) amidoborane (2-ethyl, 4-[3',5'-bis trifluoromethyl-4'-methoxyphenyl] indenyl)(2-isopropyl, 4-[o-biphenyl] indenyl)Zr(CH$_3$)$_2$; bis (trimethylsilyl) amidoborane (2-propyl, 4-[3',5'-bis trifluoromethyl-4'-methoxyphenyl] indenyl)(2-isopropyl, 4-[o-biphenyl] indenyl)Zr(CH$_3$)$_2$; bis (trimethylsilyl)amidoborane (2-butyl, 4-[3',5'-bis-trifluorometllyl-4'-methoxyphenyl] indenyl)(2-isopropyl, 4-[o-biphenyl] indenyl)Zr(CH$_3$)$_2$; bis(trimethylsilyl) amidoborane (2-methyl, 4-[3',5'-di-iso-propyl-4'-methoxyphenyl]indenyl) (2-isopropyl, 4-[o-biphenyl] indenyl)Zr(CH$_3$)$_2$; bis(trimethylsilyl)amidoborane (2-ethyl, 4-[3',5'-di-iso-propyl-4'-methoxyphenyl] indenyl)(2-isopropyl, 4-[o-biphenyl] indenyl)Zr(CH$_3$)$_2$; bis(trimethylsilyl)amidoborane (2-propyl, 4-[3',5'-di-iso-propyl-4'-methoxyphenyl] indenyl) (2-isopropyl, 4-[o-biphenyl] indenyl)Zr(CH$_3$)$_2$; bis(trimethylsilyl)amidoborane (2-butyl, 4-[3',5'-di-iso-propyl-4'-methoxyphenyl] indenyl)(2-isopropyl, 4-[o-biphenyl] indenyl)Zr(CH$_3$)$_2$; bis(trimethylsilyl)amidoborane (2-methyl, 4-[3',5'-diphenyl-4'-methoxyphenyl] indenyl)(2-isopropyl, 4-[o-biphenyl] indenyl)Zr(CH$_3$)$_2$; bis(trimethylsilyl)amidoborane (2-ethyl, 4-[3',5'-diphenyl-4'-methoxyphenyl] indenyl)(2-isopropyl, 4-[o-biphenyl] indenyl)Zr(CH$_3$)$_2$; bis (trimethylsilyl)amidoborane (2-propyl, 4-[3',5'-diphenyl-4'-methoxyphenyl] indenyl)(2-isopropyl, 4-[o-biphenyl] indenyl)Zr(CH$_3$)$_2$; bis(trimethylsilyl)amidoborane (2-butyl, 4-[3',5'-diphenyl-4'-methoxyphenyl] indenyl)(2-isopropyl, 4-[o-biphenyl] indenyl)Zr(CH$_3$)$_2$.

In at least one embodiment, catalysts represented by formula (I), formula (II), or formula (III) include: dimethylsiladiyl (2-methyl, 4-[3',5'-di-tert-butyl-4'-methoxyphenyl], 1,5,6,7-tetrahydro-s-indacenyl)(2-isopropyl, 4-[o-biphenyl] indenyl)Zr(CH$_3$)$_2$; dimethylsiladiyl (2-ethyl, 4-[3', 5'-di-tert-butyl-4'-methoxyphenyl], 1,5,6,7-tetrahydro-s-indacenyl)(2-isopropyl, 4-[o-biphenyl] indenyl)Zr(CH$_3$)$_2$; dimethylsiladiyl (2-propyl, 4-[3',5'-di-tert-butyl-4'-methoxyphenyl], 1,5,6,7-tetrahydro-s-indacenyl)(2-isopropyl, 4-[o-biphenyl]indenyl)Zr(CH$_3$)$_2$; dimethylsiladiyl (2-butyl, 4-[3',5'-di-tert-butyl-4'-methoxyphenyl], 1,5,6,7-tetrahydro-s-indacenyl)(2-isopropyl, 4-[o-biphenyl] indenyl)Zr(CH$_3$)$_2$; dimethylsiladiyl (2-methyl, 4-[3',5'-bistrifluoromethyl-4'-methoxyphenyl], 1,5,6,7-tetrahydro-s-indacenyl)(2-isopropyl, 4-[o-biphenyl] indenyl)Zr(CH$_3$)$_2$; dimethylsiladiyl (2-ethyl, 4-[3',5'-bistrifluoromethyl-4'- methoxyphenyl], 1,5,6,7-tetrahydro-s-indacenyl)(2-isopropyl, 4-[o-biphenyl] indenyl)Zr(CH₃)₂; dimethylsiladiyl (2-propyl, 4-[3',5'-bistrifluoromethyl-4'-methoxyphenyl], 1,5,6,7-tetrahydro-s-indacenyl)(2-isopropyl, 4-[o-biphenyl]indenyl)Zr(CH₃)₂; dimethylsiladiyl (2-butyl, 4-[3',5'-bistrifluoromethyl-4'-methoxyphenyl], 1,5,6,7-tetrahydro-s-indacenyl)(2-isopropyl, 4-[o-biphenyl] indenyl)Zr(CH₃)₂; dimethylsiladiyl (2-methyl, 4-[3',5'-di-iso-propyl-4'-methoxyphenyl], 1,5,6,7-tetrahydro-s-indacenyl)(2-isopropyl, 4-[o-biphenyl] indenyl)Zr(CH₃)₂; dimethylsiladiyl (2-ethyl, 4-[3',5'-di-iso-propyl-4'-methoxyphenyl], 1,5,6,7-tetrahydro-s-indacenyl)(2-isopropyl, 4-[o-biphenyl]indenyl)Zr(CH₃)₂; dimethylsiladiyl (2-propyl, 4-[3',5'-di-iso-propyl-4'-methoxyphenyl], 1,5,6,7-tetrahydro-s-indacenyl)(2-isopropyl, 4-[o-biphenyl] indenyl)Zr(CH₃)₂; dimethylsiladiyl (2-butyl, 4-[3',5'-di-iso-propyl-4'-methoxyphenyl], 1,5,6,7-tetrahydro-s-indacenyl)(2-isopropyl, 4-[o-biphenyl] indenyl)Zr(CH₃)₂; dimethylsiladiyl (2-methyl, 4-[3',5'-di-phenyl-4'-methoxyphenyl], 1,5,6,7-tetrahydro-s-indacenyl)(2-isopropyl, 4-[o-biphenyl]indenyl)Zr(CH₃)₂; dimethylsiladiyl (2-ethyl, 4-[3',5'-di-phenyl-4'-methoxyphenyl], 1,5,6,7-tetrahydro-s-indacenyl)(2-isopropyl, 4-[o-biphenyl] indenyl)Zr(CH₃)₂; dimethylsiladiyl (2-propyl, 4-[3',5'-di-phenyl-4'-methoxyphenyl], 1,5,6,7-tetrahydro-s-indacenyl)(2-isopropyl, 4-[o-biphenyl] indenyl)Zr(CH₃)₂; dimethylsiladiyl (2-butyl, 4-[3',5'-di-phenyl-4'-methoxyphenyl], 1,5,6,7-tetrahydro-s-indacenyl)(2-isopropyl, 4-[o-biphenyl]indenyl)Zr(CH₃)₂; dimethylamidoborane (2-methyl, 4-[3',5'-di-tert-butyl-4'-methoxyphenyl], 1,5,6,7-tetrahydro-s-indacenyl)(2-isopropyl, 4-[o-biphenyl] indenyl)Zr(CH₃)₂; dimethylamidoborane (2-ethyl, 4-[3',5'-di-tert-butyl-4'-methoxyphenyl], 1,5,6,7-tetrahydro-s-indacenyl)(2-isopropyl, 4-[o-biphenyl] indenyl)Zr(CH₃)₂; dimethylamidoborane (2-propyl, 4-[3',5'-di-tert-butyl-4'-methoxyphenyl], 1,5,6,7-tetrahydro-s-indacenyl)(2-isopropyl, 4-[o-biphenyl] indenyl)Zr(CH₃)₂; dimethylamidoborane (2-butyl, 4-[3',5'-di-tert-butyl-4'-methoxyphenyl], 1,5,6,7-tetrahydro-s-indacenyl)(2-isopropyl, 4-[o-biphenyl]indenyl)Zr(CH₃)₂; dimethylamidoborane (2-methyl, 4-[3',5'-bistrifluoromethyl-4'-methoxyphenyl], 1,5,6,7-tetrahydro-s-indacenyl)(2-isopropyl, 4-[o-biphenyl]indenyl)Zr(CH₃)₂; dimethylamidoborane (2-ethyl, 4-[3',5'-bistrifluoromethyl-4'-methoxyphenyl], 1,5,6,7-tetrahydro-s-indacenyl)(2-isopropyl, 4-[o-biphenyl]indenyl)Zr(CH₃)₂; dimethylamidoborane (2-propyl, 4-[3',5'-bistrifluoromethyl-4'-methoxyphenyl], 1,5,6,7-tetrahydro-s-indacenyl)(2-isopropyl, 4-[o-biphenyl]indenyl)Zr(CH₃)₂; dimethylamidoborane (2-butyl, 4-[3', 5'-bistrifluoromethyl-4'-methoxyphenyl], 1,5,6,7-tetrahydro-s-indacenyl)(2-isopropyl, 4-[o-biphenyl]indenyl)Zr(CH₃)₂; dimethylamidoborane (2-methyl, 4-[3',5'-di-iso-propyl-4'-methoxyphenyl], 1,5,6,7-tetrahydro-s-indacenyl)(2-isopropyl, 4-[o-biphenyl] indenyl)Zr(CH₃)₂; dimethylamidoborane (2-ethyl, 4-[3', 5'-di-iso-propyl-4'-methoxyphenyl], 1,5,6,7-tetrahydro-s-indacenyl)(2-isopropyl, 4-[o-biphenyl] indenyl)Zr(CH₃)₂; dimethylamidoborane (2-propyl, 4-[3',5'-di-iso-propyl-4'-methoxyphenyl], 1,5,6,7-tetrahydro-s-indacenyl)(2-isopropyl, 4-[o-biphenyl] indenyl)Zr(CH₃)₂; dimethylamidoborane (2-tert-butyl, 4-[3', 5'-di-iso-propyl-4'-methoxyphenyl], 1,5,6,7-tetrahydro-s-indacenyl)(2-isopropyl, 4-[o-biphenyl]indenyl)Zr(CH₃)₂; dimethylamidoborane (2-methyl, 4-[3',5'-di-phenyl-4'-methoxyphenyl], 1,5,6,7-tetrahydro-s-indacenyl)(2-isopropyl, 4-[o-biphenyl] indenyl)Zr(CH₃)₂; dimethylamidoborane (2-ethyl, 4-[3',5'-di-phenyl-4'-methoxyphenyl], 1,5,6,7-tetrahydro-s-indacenyl)(2-isopropyl, 4-[o-biphenyl] indenyl)Zr(CH₃)₂; dimethylamidoborane (2-propyl, 4-[3', 5'-diphenyl-4'-methoxyphenyl], 1,5,6,7-tetrahydro-s-indacenyl)(2-isopropyl, 4-[o-biphenyl] indenyl)Zr(CH₃)₂; dimethylamidoborane (2-butyl, 4-[3',5'-diphenyl-4'-methoxyphenyl], 1,5,6,7-tetrahydro-s-indacenyl)(2-isopropyl, 4-[o-biphenyl]indenyl)Zr(CH₃)₂; di-iso-propylamidoborane (2-methyl, 4-[3',5'-di-tert-butyl-4'-methoxyphenyl], 1,5,6,7-tetrahydro-s-indacenyl)(2-isopropyl, 4-[o-biphenyl]indenyl)Zr(CH₃)₂; di-iso-propylamidoborane (2-ethyl, 4-[3',5'-di-tert-butyl-4'-methoxyphenyl], 1,5,6,7-tetrahydro-s-indacenyl)(2-isopropyl, 4-[o-biphenyl]indenyl)Zr(CH₃)₂; di-iso-propylamidoborane (2-propyl, 4-[3',5'-di-tert-butyl-4'-methoxyphenyl], 1,5,6,7-tetrahydro-s-indacenyl)(2-isopropyl, 4-[o-biphenyl]indenyl)Zr(CH₃)₂; di-iso-propylamidoborane (2-butyl, 4-[3',5'-di-tert-butyl-4'-methoxyphenyl], 1,5,6,7-tetrahydro-s-indacenyl)(2-isopropyl, 4-[o-biphenyl]indenyl)Zr(CH₃)₂; di-iso-propylamidoborane (2-methyl, 4-[3',5'-bistrifluoromethyl-4'-methoxyphenyl], 1,5,6,7-tetrahydro-s-indacenyl)(2-isopropyl, 4-[o-biphenyl]indenyl)Zr(CH₃)₂; di-iso-propylamidoborane (2-ethyl, 4-[3',5'-bistrifluoromethyl-4'-methoxyphenyl], 1,5,6,7-tetrahydro-s-indacenyl)(2-isopropyl, 4-[o-biphenyl]indenyl)Zr(CH₃)₂; di-iso-propylamidoborane (2-propyl, 4-[3',5'-bistrifluoromethyl-4'-methoxyphenyl], 1,5,6,7-tetrahydro-s-indacenyl)(2-isopropyl, 4-[o-biphenyl]indenyl)Zr(CH₃)₂; di-iso-propylamidoborane (2-butyl, 4-[3',5'-bistrifluoromethyl-4'-methoxyphenyl], 1,5,6,7-tetrahydro-s-indacenyl)(2-isopropyl, 4-[o-biphenyl]indenyl)Zr(CH₃)₂; di-iso-propylamidoborane (2-methyl, 4-[3',5'-di-iso-propyl-4'-methoxyphenyl], 1,5,6,7-tetrahydro-s-indacenyl)(2-isopropyl, 4-[o-biphenyl]indenyl)Zr(CH₃)₂; di-iso-propylamidoborane (2-ethyl, 4-[3',5'-di-iso-propyl-4'-methoxyphenyl], 1,5,6,7-tetrahydro-s-indacenyl)(2-isopropyl, 4-[o-biphenyl]indenyl)Zr(CH₃)₂; di-iso-propylamidoborane (2-propyl, 4-[3',5'-di-iso-propyl-4'-methoxyphenyl], 1,5,6,7-tetrahydro-s-indacenyl)(2-isopropyl, 4-[o-biphenyl]indenyl)Zr(CH₃)₂; di-iso-propylamidoborane (2-tert-butyl, 4-[3',5'-di-iso-propyl-4'-methoxyphenyl], 5,6-[cyclopentyl] indenyl)(2-isopropyl, 4-[o-biphenyl] indenyl)Zr(CH₃)₂; di-iso-propylamidoborane (2-methyl, 4-[3',5'-diphenyl-4'-methoxyphenyl], 1,5,6,7-tetrahydro-s-indacenyl)(2-isopropyl, 4-[o-biphenyl] indenyl)Zr(CH₃)₂; di-iso-propylamidoborane (2-ethyl, 4-[3',5'-di-phenyl-4'-methoxyphenyl], 1,5,6,7-tetrahydro-s-indacenyl)(2-isopropyl, 4-[o-biphenyl] indenyl)Zr(CH₃)₂; di-iso-propylamidoborane (2-propyl, 4-[3',5'-diphenyl-4'-methoxyphenyl], 1,5,6,7-tetrahydro-s-indacenyl)(2-isopropyl, 4-[o-biphenyl]indenyl)Zr(CH₃)₂; di-iso-propylamidoborane (2-butyl, 4-[3',5'-diphenyl-4'-methoxyphenyl], 1,5,6,7-tetrahydro-s-indacenyl)(2-isopropyl, 4-[o-biphenyl] indenyl)Zr(CH₃)₂; bis(trimethylsilyl) amidoborane (2-methyl, 4-[3',5'-di-tert-butyl-4'-methoxyphenyl], 1,5,6,7-tetrahydro-s-indacenyl)(2-isopropyl, 4-[o-biphenyl] indenyl)Zr(CH₃)₂; bis(trimethylsilyl)amidoborane (2-ethyl, 4-[3',5'-di-tert-butyl-4'-methoxyphenyl], 1,5,6,7-tetrahydro-s-indacenyl)(2-isopropyl, 4-[o-biphenyl] indenyl)Zr(CH₃)₂; bis(trimethylsilyl) amidoborane (2-propyl, 4-[3',5'-di t-butyl-4'-methoxyphenyl], 1,5,6,7-tetrahydro-s-indacenyl)(2-isopropyl, 4-[o-biphenyl] indenyl)Zr(CH₃)₂; bis(trimethylsilyl)amidoborane (2-butyl, 4-[3',5'-di-tert-butyl-4'-methoxyphenyl], 1,5,6,7-tetrahydro-s-indacenyl)(2-isopropyl, 4-[o-biphenyl] indenyl)Zr(CH₃)₂; bis (trimethylsilyl) amidoborane (2-methyl, 4-[3',5'-bis trifluoromethyl-4'-methoxyphenyl], 1,5,6,7-tetrahydro-s-indacenyl)(2-isopropyl, 4-[o-biphenyl] indenyl)Zr(CH₃)₂; bis (trimethylsilyl) amidoborane (2-ethyl, 4-[3',5'-bis trifluoromethyl-4'-methoxyphenyl], 1,5,6,7-tetrahydro-s-indacenyl)(2-isopropyl, 4-[o-biphenyl] indenyl)Zr(CH$_3$)$_2$; bis (trimethylsilyl) amidoborane (2-propyl, 4-[3',5'-bis trifluoromethyl-4'-methoxyphenyl], 1,5,6,7-tetrahydro-s-indacenyl)(2-isopropyl, 4-[o-biphenyl] indenyl)Zr(CH$_3$)$_2$; bis (trimethylsilyl)amidoborane (2-butyl, 4-[3',5'-bis-trifluorometllyl-4'-methoxyphenyl], 1,5,6,7-tetrahydro-s-indacenyl)(2-isopropyl, 4-[o-biphenyl] indenyl)Zr(CH$_3$)$_2$; bis(trimethylsilyl) amidoborane (2-methyl, 4-[3',5'-di-isopropyl-4'-methoxyphenyl], 1,5,6,7-tetrahydro-s-indacenyl)(2-isopropyl, 4-[o-biphenyl]indenyl)Zr(CH$_3$)$_2$; bis(trimethylsilyl)amidoborane (2-ethyl, 4-[3',5'-di-iso-propyl-4'-methoxyphenyl], 1,5,6,7-tetrahydro-s-indacenyl)(2-isopropyl, 4-[o-biphenyl]indenyl)Zr(CH$_3$)$_2$; bis (trimethylsilyl)amidoborane (2-propyl, 4-[3',5'-di-iso-propyl-4'-methoxyphenyl], 1,5,6,7-tetrahydro-s-indacenyl)(2-isopropyl, 4-[o-biphenyl]indenyl)Zr(CH$_3$)$_2$; bis (trimethylsilyl)amidoborane (2-butyl, 4-[3',5'-di-iso-propyl-4'-methoxyphenyl], 1,5,6,7-tetrahydro-s-indacenyl)(2-isopropyl, 4-[o-biphenyl]indenyl)Zr(CH$_3$)$_2$; bis (trimethylsilyl)amidoborane (2-methyl, 4-[3',5'-diphenyl-4'-methoxyphenyl], 1,5,6,7-tetrahydro-s-indacenyl)(2-isopropyl, 4-[o-biphenyl]indenyl)Zr(CH$_3$)$_2$; bis (trimethylsilyl)amidoborane (2-ethyl, 4-[3',5'-diphenyl-4'-methoxyphenyl], 1,5,6,7-tetrahydro-s-indacenyl)(2-isopropyl, 4-[o-biphenyl]indenyl)Zr(CH$_3$)$_2$; bis (trimethylsilyl)amidoborane (2-propyl, 4-[3',5'-diphenyl-4'-methoxyphenyl], 1,5,6,7-tetrahydro-s-indacenyl)(2-isopropyl, 4-[o-biphenyl]indenyl)Zr(CH$_3$)$_2$; bis (trimethylsilyl)amidoborane (2-butyl, 4-[3',5'-diphenyl-4'-methoxyphenyl], 1,5,6,7-tetrahydro-s-indacenyl)(2-isopropyl, 4-[o-biphenyl]indenyl)Zr(CH$_3$)$_2$.

In at least one embodiment, catalysts represented by formula (I), formula (II), or formula (III) include: dimethylsiladiyl (2-methyl, 4-[3',5'-di-tert-butyl-4'-methoxyphenyl], 1,5,6,7-tetrahydro-s-indacenyl)(2-isopropyl, 4-[o-biphenyl] indenyl)ZrCl$_2$; dimethylsiladiyl (2-ethyl, 4-[3',5'-di-tert-butyl-4'-methoxyphenyl], 1,5,6,7-tetrahydro-s-indacenyl)(2-isopropyl, 4-[o-biphenyl] indenyl)ZrCl$_2$; dimethylsiladiyl (2-propyl, 4-[3',5'-di-tert-butyl-4'-methoxyphenyl], 1,5,6,7-tetrahydro-s-indacenyl)(2-isopropyl, 4-[o-biphenyl] indenyl)ZrCl$_2$; dimethylsiladiyl (2-butyl, 4-[3',5'-di-tert-butyl-4'-methoxyphenyl], 1,5,6,7-tetrahydro-s-indacenyl)(2-isopropyl, 4-[o-biphenyl] indenyl)ZrCl$_2$; dimethylsiladiyl (2-methyl, 4-[3',5'-bistrifluoromethyl-4'-methoxyphenyl], 1,5,6,7-tetrahydro-s-indacenyl)(2-isopropyl, 4-[o-biphenyl] indenyl)ZrCl$_2$; dimethylsiladiyl (2-ethyl, 4-[3',5'-bistrifluoromethyl-4'-methoxyphenyl], 1,5,6,7-tetrahydro-s-indacenyl)(2-isopropyl, 4-[o-biphenyl] indenyl)ZrCl$_2$; dimethylsiladiyl (2-propyl, 4-[3',5'-bistrifluoromethyl-4'-methoxyphenyl], 1,5,6,7-tetrahydro-s-indacenyl)(2-isopropyl, 4-[o-biphenyl] indenyl)ZrCl$_2$; dimethylsiladiyl (2-butyl, 4-[3',5'-bistrifluoromethyl-4'-methoxyphenyl], 1,5,6,7-tetrahydro-s-indacenyl)(2-isopropyl, 4-[o-biphenyl] indenyl)ZrCl$_2$; dimethylsiladiyl (2-methyl, 4-[3',5'-di-iso-propyl-4'-methoxyphenyl], 1,5,6,7-tetrahydro-s-indacenyl)(2-isopropyl, 4-[o-biphenyl] indenyl)ZrCl$_2$; dimethylsiladiyl (2-ethyl, 4-[3',5'-di-iso-propyl-4'-methoxyphenyl], 1,5,6,7-tetrahydro-s-indacenyl)(2-isopropyl, 4-[o-biphenyl] indenyl)ZrCl$_2$; dimethylsiladiyl (2-propyl, 4-[3',5'-di-iso-propyl-4'-methoxyphenyl], 1,5,6,7-tetrahydro-s-indacenyl)(2-isopropyl, 4-[o-biphenyl]indenyl)ZrCl$_2$; dimethylsiladiyl (2-butyl, 4-[3',5'-di-iso-propyl-4'-methoxyphenyl], 1,5,6,7-tetrahydro-s-indacenyl)(2-isopropyl, 4-[o-biphenyl] indenyl)ZrCl$_2$; dimethylsiladiyl (2-methyl, 4-[3',5'-di-phenyl-4'-methoxyphenyl], 1,5,6,7-tetrahydro-s-indacenyl)(2-isopropyl, 4-[o-biphenyl] indenyl)ZrCl$_2$; dimethylsiladiyl (2-ethyl, 4-[3',5'-di-phenyl-4'-methoxyphenyl], 1,5,6,7-tetrahydro-s-indacenyl)(2-isopropyl, 4-[o-biphenyl] indenyl)ZrCl$_2$; dimethylsiladiyl (2-propyl, 4-[3',5'-di-phenyl-4'-methoxyphenyl], 1,5,6,7-tetrahydro-s-indacenyl)(2-isopropyl, 4-[o-biphenyl] indenyl)ZrCl$_2$; dimethylsiladiyl (2-butyl, 4-[3',5'-di-phenyl-4'-methoxyphenyl], 1,5,6,7-tetrahydro-s-indacenyl)(2-isopropyl, 4-[o-biphenyl] indenyl)ZrCl$_2$; dimethylamidoborane (2-methyl, 4-[3',5'-di-tert-butyl-4'-methoxyphenyl], 1,5,6,7-tetrahydro-s-indacenyl)(2-isopropyl, 4-[o-biphenyl] indenyl)ZrCl$_2$; dimethylamidoborane (2-ethyl, 4-[3',5'-di-tert-butyl-4'-methoxyphenyl], 1,5,6,7-tetrahydro-s-indacenyl)(2-isopropyl, 4-[o-biphenyl] indenyl)ZrCl$_2$; dimethylamidoborane (2-propyl, 4-[3',5'-di-tert-butyl-4'-methoxyphenyl], 1,5,6,7-tetrahydro-s-indacenyl)(2-isopropyl, 4-[o-biphenyl] indenyl)ZrCl$_2$; dimethylamidoborane (2-butyl, 4-[3',5'-di-tert-butyl-4'-methoxyphenyl], 1,5,6,7-tetrahydro-s-indacenyl)(2-isopropyl, 4-[o-biphenyl] indenyl)ZrCl$_2$; dimethylamidoborane (2-methyl, 4-[3',5'-bistrifluoromethyl-4'-methoxyphenyl], 1,5,6,7-tetrahydro-s-indacenyl)(2-isopropyl, 4-[o-biphenyl] indenyl)ZrCl$_2$; dimethylamidoborane (2-ethyl, 4-[3',5'-bistrifluoromethyl-4'-methoxyphenyl], 1,5,6,7-tetrahydro-s-indacenyl)(2-isopropyl, 4-[o-biphenyl] indenyl)ZrCl$_2$; dimethylamidoborane (2-propyl, 4-[3',5'-bistrifluoromethyl-4'-methoxyphenyl], 1,5,6,7-tetrahydro-s-indacenyl)(2-isopropyl, 4-[o-biphenyl] indenyl)ZrCl$_2$; dimethylamidoborane (2-butyl, 4-[3', 5'-bistrifluoromethyl-4'-methoxyphenyl], 1,5,6,7-tetrahydro-s-indacenyl)(2-isopropyl, 4-[o-biphenyl] indenyl)ZrCl$_2$; dimethylamidoborane (2-methyl, 4-[3',5'-di-iso-propyl-4'-methoxyphenyl], 1,5,6,7-tetrahydro-s-indacenyl)(2-isopropyl, 4-[o-biphenyl]indenyl)ZrCl$_2$; dimethylamidoborane (2-ethyl, 4-[3', 5'-di-iso-propyl-4'-methoxyphenyl], 1,5,6,7-tetrahydro-s-indacenyl)(2-isopropyl, 4-[o-biphenyl] indenyl)ZrCl$_2$; dimethylamidoborane (2-propyl, 4-[3',5'-di-iso-propyl-4'-methoxyphenyl], 1,5,6,7-tetrahydro-s-indacenyl)(2-isopropyl, 4-[o-biphenyl] indenyl)ZrCl$_2$; dimethylamidoborane (2-tert-butyl, 4-[3', 5'-di-iso-propyl-4'-methoxyphenyl], 1,5,6,7-tetrahydro-s-indacenyl)(2-isopropyl, 4-[o-biphenyl] indenyl)ZrCl$_2$; dimethylamidoborane (2-methyl, 4-[3',5'-di-phenyl-4'-methoxyphenyl], 1,5,6,7-tetrahydro-s-indacenyl)(2-isopropyl, 4-[o-biphenyl] indenyl)ZrCl$_2$; dimethylamidoborane (2-ethyl, 4-[3',5'-di-phenyl-4'-methoxyphenyl], 1,5,6,7-tetrahydro-s-indacenyl)(2-isopropyl, 4-[o-biphenyl] indenyl)ZrCl$_2$; dimethylamidoborane (2-propyl, 4-[3', 5'-di-phenyl-4'-methoxyphenyl], 1,5,6,7-tetrahydro-s-indacenyl)(2-isopropyl, 4-[o-biphenyl]indenyl)ZrCl$_2$; dimethylamidoborane (2-butyl, 4-[3',5'-diphenyl-4'-methoxyphenyl], 1,5,6,7-tetrahydro-s-indacenyl)(2-isopropyl, 4-[o-biphenyl] indenyl)ZrCl$_2$; di-iso-propylamidoborane (2-methyl, 4-[3', 5'-di-tert-butyl-4'-methoxyphenyl], 1,5,6,7-tetrahydro-s-indacenyl)(2-isopropyl, 4-[o-biphenyl] indenyl)ZrCl$_2$; di-iso-propylamidoborane (2-ethyl, 4-[3',5'-di-tert-butyl-4'-methoxyphenyl], 1,5,6,7-tetrahydro-s-indacenyl)(2-isopropyl, 4-[o-biphenyl]indenyl)ZrCl$_2$; di-iso-propylamidoborane (2-propyl, 4-[3',5'-di-tert-butyl-4'-methoxyphenyl], 1,5,6,7-tetrahydro-s-indacenyl)(2-isopropyl, 4-[o-biphenyl] indenyl)ZrCl$_2$; di-iso-propylamidoborane (2-butyl, 4-[3',5'-di-tert-butyl-4'-methoxyphenyl], 1,5,6,7-tetrahydro-s-indacenyl)(2-isopropyl, 4-[o-biphenyl] indenyl)ZrCl$_2$; di-iso-propylamidoborane (2-methyl, 4-[3',5'-bistrifluoromethyl-4'-methoxyphenyl], 1,5,6,7-tetrahydro-s-indacenyl)(2-isopropyl, 4-[o-biphenyl] indenyl)ZrCl$_2$; di-iso-propylamidoborane (2-ethyl, 4-[3',5'-bistrifluoromethyl-4'-methoxyphenyl], 1,5,6,7-tetrahydro-s-indacenyl)(2- isopropyl, 4-[o-biphenyl] indenyl)ZrCl$_2$; di-iso-propylamidoborane (2-propyl, 4-[3',5'-bistrifluoromethyl-4'-methoxyphenyl], 1,5,6,7-tetrahydro-s-indacenyl)(2-isopropyl, 4-[o-biphenyl] indenyl)ZrCl$_2$; di-iso-propylamidoborane (2-butyl, 4-[3',5'-bistrifluoromethyl-4'-methoxyphenyl], 1,5,6,7-tetrahydro-s-indacenyl)(2-isopropyl, 4-[o-biphenyl] indenyl)ZrCl$_2$; di-iso-propylamidoborane (2-methyl, 4-[3',5'-di-iso-propyl-4'-methoxyphenyl], 1,5,6,7-tetrahydro-s-indacenyl)(2-isopropyl, 4-[o-biphenyl]indenyl)ZrCl$_2$; di-iso-propylamidoborane (2-ethyl, 4-[3',5'-di-iso-propyl-4'-methoxyphenyl], 1,5,6,7-tetrahydro-s-indacenyl)(2-isopropyl, 4-[o-biphenyl] indenyl)ZrCl$_2$; di-iso-propylamidoborane (2-propyl, 4-[3',5'-di-iso-propyl-4'-methoxyphenyl], 1,5,6,7-tetrahydro-s-indacenyl)(2-isopropyl, 4-[o-biphenyl] indenyl)ZrCl$_2$; di-iso-propylamidoborane (2-tert-butyl, 4-[3',5'-di-iso-propyl-4'-methoxyphenyl], 1,5,6,7-tetrahydro-s-indacenyl)(2-isopropyl, 4-[o-biphenyl] indenyl)ZrCl$_2$; di-iso-propylamidoborane (2-methyl, 4-[3',5'-diphenyl-4'-methoxyphenyl], 1,5,6,7-tetrahydro-s-indacenyl)(2-isopropyl, 4-[o-biphenyl] indenyl)ZrCl$_2$; di-iso-propylamidoborane (2-ethyl, 4-[3',5'-di-phenyl-4'-methoxyphenyl], 1,5,6,7-tetrahydro-s-indacenyl)(2-isopropyl, 4-[o-biphenyl] indenyl)ZrCl$_2$; di-iso-propylamidoborane (2-propyl, 4-[3',5'-diphenyl-4'-methoxyphenyl], 1,5,6,7-tetrahydro-s-indacenyl)(2-isopropyl, 4-[o-biphenyl] indenyl)ZrCl$_2$; di-iso-propylamidoborane (2-butyl, 4-[3',5'-diphenyl-4'-methoxyphenyl], 1,5,6,7-tetrahydro-s-indacenyl)(2-isopropyl, 4-[o-biphenyl] indenyl)ZrCl$_2$; bis(trimethylsilyl)amidoborane (2-methyl, 4-[3',5'-di-tert-butyl-4'-methoxyphenyl], 1,5,6,7-tetrahydro-s-indacenyl)(2-isopropyl, 4-[o-biphenyl] indenyl)ZrCl$_2$; bis(trimethylsilyl)amidoborane (2-ethyl, 4-[3',5'-di-tert-butyl-4'-methoxyphenyl], 1,5,6,7-tetrahydro-s-indacenyl)(2-isopropyl, 4-[o-biphenyl] indenyl)ZrCl$_2$; bis(trimethylsilyl) amidoborane (2-propyl, 4-[3', 5'-di t-butyl-4'-methoxyphenyl], 1,5,6,7-tetrahydro-s-indacenyl)(2-isopropyl, 4-[o-biphenyl] indenyl)ZrCl$_2$; bis (trimethylsilyl)amidoborane (2-butyl, 4-[3',5'-di-tert-butyl-4'-methoxyphenyl], 1,5,6,7-tetrahydro-s-indacenyl)(2-isopropyl, 4-[o-biphenyl] indenyl)ZrCl$_2$; bis(trimethylsilyl) amidoborane (2-methyl, 4-[3',5'-bis trifluoromethyl-4'-methoxyphenyl], 1,5,6,7-tetrahydro-s-indacenyl)(2-isopropyl, 4-[o-biphenyl] indenyl)ZrCl$_2$; bis(trimethylsilyl) amidoborane (2-ethyl, 4-[3',5'-bis trifluoromethyl-4'-methoxyphenyl], 1,5,6,7-tetrahydro-s-indacenyl)(2-isopropyl, 4-[o-biphenyl]indenyl)ZrCl$_2$; bis (trimethylsilyl) amidoborane (2-propyl, 4-[3',5'-bis trifluoromethyl-4'-methoxyphenyl], 1,5,6,7-tetrahydro-s-indacenyl)(2-isopropyl, 4-[o-biphenyl] indenyl)ZrCl$_2$; bis(trimethylsilyl)amidoborane (2-butyl, 4-[3',5'-bis-trifluorometllyl-4'-methoxyphenyl], 1,5,6,7-tetrahydro-s-indacenyl)(2-isopropyl, 4-[o-biphenyl] indenyl)ZrCl$_2$; bis(trimethylsilyl) amidoborane (2-methyl, 4-[3',5'-di-iso-propyl-4'-methoxyphenyl], 1,5,6,7-tetrahydro-s-indacenyl)(2-isopropyl, 4-[o-biphenyl] indenyl)ZrCl$_2$; bis(trimethylsilyl)amidoborane (2-ethyl, 4-[3',5'-di-iso-propyl-4'-methoxyphenyl], 1,5,6,7-tetrahydro-s-indacenyl)(2-isopropyl, 4-[o-biphenyl] indenyl)ZrCl$_2$; bis(trimethylsilyl)amidoborane (2-propyl, 4-[3', 5'-di-iso-propyl-4'-methoxyphenyl], 1,5,6,7-tetrahydro-s-indacenyl)(2-isopropyl, 4-[o-biphenyl]indenyl)ZrCl$_2$; bis (trimethylsilyl)amidoborane (2-butyl, 4-[3',5'-di-iso-propyl-4'-methoxyphenyl], 1,5,6,7-tetrahydro-s-indacenyl)(2-isopropyl, 4-[o-biphenyl] indenyl)ZrCl$_2$; bis(trimethylsilyl) amidoborane (2-methyl, 4-[3',5'-diphenyl-4'-methoxyphenyl], 1,5,6,7-tetrahydro-s-indacenyl)(2-isopropyl, 4-[o-biphenyl] indenyl)ZrCl$_2$; bis(trimethylsilyl)amidoborane (2-ethyl, 4-[3',5'-diphenyl-4'-methoxyphenyl], 1,5,6,7-tetrahydro-s-indacenyl)(2-isopropyl, 4-[o-biphenyl] indenyl)ZrCl$_2$; bis(trimethylsilyl)amidoborane (2-propyl, 4-[3',5'-diphenyl-4'-methoxyphenyl], 1,5,6,7-tetrahydro-s-indacenyl)(2-isopropyl, 4-[o-biphenyl] indenyl)ZrCl$_2$; bis (trimethylsilyl)amidoborane (2-butyl, 4-[3',5'-diphenyl-4'-methoxyphenyl], 1,5,6,7-tetrahydro-s-indacenyl)(2-isopropyl, 4-[o-biphenyl] indenyl)ZrCl$_2$.

While 4'-methoxy (i.e, O(methyl)) analogs are enumerated above, —O(ethyl), —O(n-propyl), —O(iso-propyl), —O(n-butyl), —O(iso-butyl), —O(sec-butyl), —O(tert-butyl), —O(phenyl), etc.; —OSiH$_3$, —OSiH$_2$(methyl), —OSiH(methyl)$_2$, —OSi(methyl)$_3$, —OSiH$_2$(ethyl), —OSiH(ethyl)$_2$, —OSi(ethyl)$_3$, —OSiH$_2$(propyl), —OSiH (propyl)$_2$, —OSi(propyl)$_3$, —OSiH$_2$(butyl), —OSiH (butyl)$_2$, —OSi(butyl)$_3$, —OSiH(methyl)(ethyl), —OSi (methyl)(ethyl)$_2$, —OSiH(methyl)(propyl), —OSi(methyl) (propyl)$_2$, —OSiH(methyl)(butyl), —OSi(methyl)(butyl)$_2$, —OSiH(ethyl)(propyl), —OSi(ethyl)(propyl)$_2$, —OSiH (ethyl)(butyl), —OSi(ethyl)(butyl)$_2$ analogs are also expressly disclosed. Likewise, while the dichloro-substituted compounds (—ZrCl$_2$ and —HfCl$_2$) are enumerated above, the compounds where each of the chloride are replaced with methyl groups (e.g., —Hf(CH$_3$)$_2$)) are also expressly disclosed.

In at least one embodiment, in any of the processes described herein one catalyst compound is used, e.g., the catalyst compounds are not different. For purposes of the present disclosure one metallocene catalyst compound is considered different from another if they differ by at least one atom. For example, "bisindenyl ZrCl$_2$" is different from "(indenyl)(2-methylindenyl) ZrCl$_2$" which is different from "(indenyl)(2-methylindenyl) HfCl$_2$." Catalyst compounds that differ only by isomer are considered the same for purposes if the present disclosure, e.g., rac-dimethylsilylbis (2-methyl 4-phenyl)Hf(Me)$_2$ is considered to be the same as meso-dimethylsilylbis(2-methyl 4-phenyl)Hf(Me)$_2$.

In at least one embodiment, two or more different catalysts are present in a catalyst system used herein. For example, two or more different catalyst compounds are present in the reaction zone where the process(es) of the present disclosure are performed. Two or more different catalyst compounds include a first catalyst represented by formula (I), (II) or (III) and a second catalyst represented by formula (I), (II) or (III). Two or more different catalyst compounds also includes a first catalyst represented by formula (I), (II), or (III) and a second catalyst that is a bridged or unbridged metallocene compound having one or more Cp, iPrCp, Cp(Me)$_5$ rings, or mixtures thereof. When two transition metal based catalysts are used in one reactor as a mixed catalyst system, the two transition metal catalysts are preferably chosen such that the two are compatible. A simple screening method such as by $^1$H or $^{13}$C NMR, known to those of ordinary skill in the art, can be used to determine which catalysts are compatible. It is preferable to use the same activator for each of the catalysts, however, two different activators, such as a non-coordinating anion activator and an alumoxane, can be used in combination. If one or more catalysts contain an R$^1$ or R$^2$ ligand which is not a hydride, hydrocarbyl, or substituted hydrocarbyl, then the alumoxane should be contacted with the transition metal compounds prior to addition of the non-coordinating anion activator.

The catalyst compound represented by formula (I), (II) or (III) and the second catalyst compound may be used in any ratio (A:B). The catalyst compound represented by formula (I) or (II) may be (A) if the second catalyst compound is (B). Alternatively, the catalyst compound represented by formula (I) or (II) may be (B) if the second catalyst compound is (A). Molar ratios of (A) to (B) can fall within the range of (A:B) about 1:1000 to about 1000:1, such as between about 1:100 and about 500:1, such as between about 1:10 and about 200:1, such as between about 1:1 and about 100:1, such as about 1:1 to about 75:1, such as about 5:1 to about 50:1. The ratio chosen will depend on the exact catalysts chosen, the method of activation, and the end product desired. In at least one embodiment, when using the two catalyst compounds, where both are activated with the same activator, useful mole percents, based upon the molecular weight of the catalyst compounds, are between about 10 to about 99.9% of (A) to about 0.1 and about 90% of (B), such as between about 25 and about 99% (A) to about 0.5 and about 50% (B), such as between about 50 and about 99% (A) to about 1 and about 25% (B), such as between about 75 and about 99% (A) to about 1 to about 10% (B).

Methods to Prepare the Catalyst Compounds

All air sensitive syntheses are carried out in nitrogen purged dry boxes. All solvents are available from commercial sources. 4-Bromo-2-methyl indene, 4-chloro-2-methyl-indene and tris (perfluorophenyl) borane in toluene are available from commercial sources. Aluminum alkyls are available as hydrocarbon solutions from commercial sources. Methylalumoxane ("MAO") is available from Albemarle as a 30 wt % solution in toluene.

Generally, metallocenes of this type may be synthesized according to the schematic reaction procedure described in FIG. 1 where (i) is a deprotonation via a metal salt of alkyl anion (e.g., n-BuLi) to form an indenide; (ii) is reaction of indenide with an appropriate bridging precursor (e.g., Me₂SiCl₂); (iii) is reaction of the above product with AgOTf; (iv) is reaction of the above triflate compound with another equivalent of indenide; (v) is deprotonation via an alkyl anion (e.g., n-BuLi) to form a dianion; (vi) is reaction of the dianion with a metal halide (e.g., ZrCl₄). The final products are obtained by recrystallization of the crude solids.

Activators

After the complexes have been synthesized, catalyst systems may be formed by combining them with activators in any suitable manner, including by supporting them for use in slurry or gas phase polymerization. The catalyst systems may also be added to or generated in solution polymerization or bulk polymerization (in the monomer, i.e., no solvent). The catalyst system typically comprises a transition metal complex as described above and an activator such as alumoxane or a non-coordinating anion activator. Activation may be performed using alumoxane solution including methyl alumoxane, referred to as MAO, as well as modified MAO, referred to herein as MMAO, which contains some higher alkyl groups to improve the solubility. MAO can be purchased from Albemarle Corporation, Baton Rouge, La., typically in a 10 wt % solution in toluene. The catalyst system employed in the present disclosure can use an activator selected from alumoxanes, such as methyl alumoxane, modified methyl alumoxane, ethyl alumoxane, iso-butyl alumoxane, and the like.

When an alumoxane or modified alumoxane is used, the catalyst-to-activator molar ratio is from about 1:3000 to about 10:1; such as about 1:2000 to about 10:1; such as about 1:1000 to about 10:1; such as about 1:500 to about 1:1; such as about 1:300 to about 1:1; such as about 1:200 to about 1:1; such as about 1:100 to about 1:1; such as about 1:50 to about 1:1; such as about 1:10 to about 1:1. When the activator is an alumoxane (modified or unmodified), some embodiments select the maximum amount of activator at a 5000-fold molar excess over the catalyst (per metal catalytic site). The minimum activator-to-catalyst ratio can be 1:1 molar ratio.

Activation may also be performed using non-coordinating anions, referred to as NCA's, of the type, for example, described in EP 277 003 A1 and EP 277 004 A1. NCA may be added in the form of an ion pair using, for example, [DMAH]+[NCA]− in which the N,N-dimethylanilinium (DMAH) cation reacts with a basic leaving group on the transition metal complex to form a transition metal complex cation and [NCA]−. The cation in the precursor may, alternatively, be trityl. Alternatively, the transition metal complex may be reacted with a neutral NCA precursor, such as B(C₆F₅)₃, which abstracts an anionic group from the complex to form an activated species. Useful activators include N,N-dimethylanilinium tetrakis (pentafluorophenyl)borate (i.e., [PhNMe₂H]B(C₆F₅)₄) and N,N-dimethylanilinium tetrakis (heptafluoronaphthyl)borate, where Ph is phenyl, and Me is methyl.

Additionally activators useful herein include those described in U.S. Pat. No. 7,247,687 at column 169, line 50 to column 174, line 43, particularly column 172, line 24 to column 173, line 53.

In an embodiment of the present disclosure described herein, the non-coordinating anion activator is represented by the following formula (1):

$$(Z)^{d+}(A^{d-}) \qquad (1)$$

wherein Z is (L-H) or a reducible Lewis acid, L is a neutral Lewis base, H is hydrogen and (L-H)⁺ is a Bronsted acid; $A^{d-}$ is a non-coordinating anion having the charge d−; and d is an integer from 1 to 3.

When Z is (L-H) such that the cation component is (L-H)$^{d+}$, the cation component may include Bronsted acids such as protonated Lewis bases capable of protonating a moiety, such as an alkyl or aryl, from the catalyst precursor, resulting in a cationic transition metal species, or the activating cation (L-H)$^{d+}$ is a Bronsted acid, capable of donating a proton to the catalyst precursor resulting in a transition metal cation, including ammoniums, oxoniums, phosphoniums, silyliums, and mixtures thereof, or ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid, it may be represented by the formula: (Ar₃C+), where Ar is aryl or aryl substituted with a heteroatom, or a C₁ to C₄₀ hydrocarbyl, the reducible Lewis acid may be represented by the formula: (Ph₃C+), where Ph is phenyl or phenyl substituted with a heteroatom, and/or a C₁ to C₄₀ hydrocarbyl. In an embodiment, the reducible Lewis acid is triphenyl carbenium.

Embodiments of the anion component $A^{d-}$ include those having the formula $[M^k+Q^n]^{d-}$ wherein k is 1, 2, or 3; n is 1, 2, 3, 4, 5, or 6, or 3, 4, 5, or 6; n−k=d; M is an element selected from Group 13 of the Periodic Table of the Elements, or boron or aluminum, and Q is independently a hydride, bridged or unbridged dialkylamido, halide, alkoxide, aryloxide, hydrocarbyl radicals, said Q having up to 20 carbon atoms with the proviso that in not more than one occurrence is Q a halide, and two Q groups may form a ring structure. Each Q may be a fluorinated hydrocarbyl radical having 1 to 20 carbon atoms, or each Q is a fluorinated aryl radical, or each Q is a pentafluoryl aryl radical. Examples of suitable Ad-components also include diboron compounds as disclosed in U.S. Pat. No. 5,447,895, which is fully incorporated herein by reference.

In an embodiment in any of the NCA's represented by Formula 1 described above, the anion component Ad– is represented by the formula [M*k*+Q*n*]d*– wherein k* is 1, 2, or 3; n* is 1, 2, 3, 4, 5, or 6 (or 1, 2, 3, or 4); n*–k*=d*; M* is boron; and Q* is independently selected from hydride, bridged or unbridged dialkylamido, halogen, alkoxide, aryloxide, hydrocarbyl radicals, said Q* having up to 20 carbon atoms with the proviso that in not more than 1 occurrence is Q* a halogen.

The present disclosure also relates to a method to polymerize olefins comprising contacting olefins (such as propylene) with a catalyst complex as described above and an NCA activator represented by the Formula (2):

$$R_n M^{**}(ArNHal)^{4-n} \quad (2)$$

where R is a monoanionic ligand; M** is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically the NCA comprising an anion of Formula 2 also comprises a suitable cation that is essentially non-interfering with the ionic catalyst complexes formed with the transition metal compounds, or the cation is Zd+ as described above.

In an embodiment in any of the NCA's comprising an anion represented by Formula 2 described above, R is selected from the group consisting of $C_1$ to $C_{30}$ hydrocarbyl radicals. In an embodiment, $C_1$ to $C_{30}$ hydrocarbyl radicals may be substituted with one or more $C_1$ to $C_{20}$ hydrocarbyl radicals, halide, hydrocarbyl substituted organometalloid, dialkylamido, alkoxy, aryloxy, alkysulfido, arylsulfido, alkylphosphido, arylphosphide, or other anionic substituent; fluoride; bulky alkoxides, where bulky means $C_4$ to $C_{20}$ hydrocarbyl radicals; —SRa, —NRa$_2$, and —PRa$_2$, where each Ra is independently a monovalent $C_4$ to $C_{20}$ hydrocarbyl radical comprising a molecular volume greater than or equal to the molecular volume of an isopropyl substitution or a $C_4$ to $C_{20}$ hydrocarbyl substituted organometalloid having a molecular volume greater than or equal to the molecular volume of an isopropyl substitution.

In an embodiment in any of the NCA's comprising an anion represented by Formula 2 described above, the NCA also comprises cation comprising a reducible Lewis acid represented by the formula: (Ar$_3$C+), where Ar is aryl or aryl substituted with a heteroatom, and/or a $C_1$ to $C_{40}$ hydrocarbyl, or the reducible Lewis acid represented by the formula: (Ph$_3$C+), where Ph is phenyl or phenyl substituted with one or more heteroatoms, and/or $C_1$ to $C_{40}$ hydrocarbyls.

In an embodiment in any of the NCA's comprising an anion represented by Formula 2 described above, the NCA may also comprise a cation represented by the formula, (L-H)$^{d+}$, wherein L is an neutral Lewis base; H is hydrogen; (L-H) is a Bronsted acid; and d is 1, 2, or 3, or (L-H)$^{d+}$ is a Bronsted acid selected from ammoniums, oxoniums, phosphoniums, silyliums, and mixtures thereof.

Further examples of useful activators include those disclosed in U.S. Pat. Nos. 7,297,653 and 7,799,879, which are fully incorporated by reference herein.

In an embodiment, an activator useful herein comprises a salt of a cationic oxidizing agent and a non-coordinating, compatible anion represented by the Formula (3):

$$(OX^{e+})_d(A^{d-})_e \quad (3)$$

wherein $OX^{e+}$ is a cationic oxidizing agent having a charge of e+; e is 1, 2 or 3; d is 1, 2 or 3; and $A^{d-}$ is a non-coordinating anion having the charge of d–(as further described above). Examples of cationic oxidizing agents include: ferrocenium, hydrocarbyl-substituted ferrocenium, $Ag^+$, or $Pb^{+2}$. Suitable embodiments of Ad– include tetrakis (pentafluorophenyl)borate.

Activators useful in catalyst systems herein include: trimethylammonium tetrakis(perfluoronaphthyl)borate, N,N-dimethylanilinium tetrakis(perfluoronaphthyl)borate, N,N-diethylanilinium tetrakis(perfluoronaphthyl)borate, triphenylcarbenium tetrakis(perfluoronaphthyl)borate, trimethylammonium tetrakis(perfluorobiphenyl)borate, N,N-dimethylanilinium tetrakis(perfluorobiphenyl)borate, triphenylcarbenium tetrakis(perfluorobiphenyl)borate, and the types disclosed in U.S. Pat. No. 7,297,653, which is fully incorporated by reference herein.

Suitable activators also include: N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Ph$_3$C$^+$][B(C$_6$F$_5$)$_4^-$], [Me$_3$NH$^+$][B(C$_6$F$_5$)$_4^-$], 1-(4-(tris(pentafluorophenyl)borate)-2,3,5,6-tetrafluorophenyl)pyrrolidinium, and tetrakis(pentafluorophenyl)borate, 4-(tris(pentafluorophenyl)borate)-2,3,5,6-tetrafluoropyridine.

In at least one embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In at least one embodiment, two NCA activators may be used in the polymerization and the molar ratio of the first NCA activator to the second NCA activator can be any ratio. In at least one embodiment, the molar ratio of the first NCA activator to the second NCA activator is 0.01:1 to 10,000:1, or 0.1:1 to 1000:1, or 1:1 to 100:1.

In at least one embodiment, the NCA activator-to-catalyst ratio is a 1:1 molar ratio, or 0.1:1 to 100:1, or 0.5:1 to 200:1, or 1:1 to 500:1 or 1:1 to 1000:1. In at least one embodiment, the NCA activator-to-catalyst ratio is 0.5:1 to 10:1, or 1:1 to 5:1.

In at least one embodiment, the catalyst compounds can be combined with combinations of alumoxanes and NCA's (see for example, U.S. Pat. Nos. 5,153,157, 5,453,410, EP 0 573 120 BI, WO 94/07928, and WO 95/14044 which discuss the use of an alumoxane in combination with an ionizing activator, all of which are incorporated by reference herein).

In at least one embodiment, when an NCA (such as an ionic or neutral stoichiometric activator) is used, the catalyst-to-activator molar ratio is typically from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1:2; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; 1:1 to 1:1.2.

Likewise, a co-activator, such as a group 1, 2, or 13 organometallic species (e.g., an alkyl aluminum compound such as tri-n-octyl aluminum), may be used in the catalyst system herein. The catalyst-to-co-activator molar ratio is from 1:100 to 100:1; 1:75 to 75:1; 1:50 to 50:1; 1:25 to 25:1; 1:15 to 15:1; 1:10 to 10:1; 1:5 to 5:1; 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

Optional Support Materials

In embodiments herein, the catalyst system may comprise an inert support material. In at least one embodiment, the supported material is a porous support material, for example, talc, or inorganic oxides. Other support materials include zeolites, clays, organoclays, or any other suitable organic or inorganic support material and the like, or mixtures thereof.

In at least one embodiment, the support material is an inorganic oxide. Suitable inorganic oxide materials for use in metallocene catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, functionalized polyolefins, such as polyethylene. Supports include magnesia, titania, zirconia, montmorillonite, phyllosilicate, zeolites, talc, clays, and the like. Also, combinations of these support materials may be used, for example, silica-chromium, silica-alumina, silica-titania, and the like. Support materials include $SiO_2$, $Al_2O_3$, $ZrO_2$, $SiO_2$, and combinations thereof.

The support material, such as an inorganic oxide, can have a surface area in the range of from about 10 to about 700 $m^2/g$, pore volume in the range of from about 0.1 to about 4.0 cc/g and average particle size in the range of from about 5 to about 500 m. In at least one embodiment, the surface area of the support material is in the range of from about 50 to about 500 $m^2/g$, pore volume of from about 0.5 to about 3.5 cc/g and average particle size of from about 10 to about 200 m. In at least one embodiment, the surface area of the support material is in the range is from about 100 to about 400 $m^2/g$, pore volume from about 0.8 to about 3.0 cc/g and average particle size is from about 5 to about 100 m. The average pore size of the support material useful in the present disclosure is in the range of from 10 to 1000 Å, such as 50 to about 500 Å, such as 75 to about 350 Å. In some embodiments, the support material is a high surface area, amorphous silica (surface area=300 $m^2/gm$; pore volume of 1.65 $cm^3/gm$). Silicas are marketed under the tradenames of Davison 952 or Davison 955 by the Davison Chemical Division of W.R. Grace and Company. In other embodiments DAVISON 948 is used.

The support material should be dry, that is, substantially free of absorbed water. Drying of the support material can be effected by heating or calcining at about 100° C. to about 1000° C., such as at least about 600° C. When the support material is silica, it is heated to at least 200° C., such as about 200° C. to about 850° C., such as at about 600° C.; and for a time of about 1 minute to about 100 hours, from about 12 hours to about 72 hours, or from about 24 hours to about 60 hours. The calcined support material should have at least some reactive hydroxyl (OH) groups to produce supported catalyst systems of the present disclosure. The calcined support material is then contacted with at least one polymerization catalyst comprising at least one metallocene compound and an activator.

The support material, having reactive surface groups, typically hydroxyl groups, is slurried in a non-polar solvent and the resulting slurry is contacted with a solution of a metallocene compound and an activator. In some embodiments, the slurry of the support material is first contacted with the activator for a period of time in the range of from about 0.5 hours to about 24 hours, from about 2 hours to about 16 hours, or from about 4 hours to about 8 hours. The solution of the metallocene compound is then contacted with the isolated support/activator. In some embodiments, the supported catalyst system is generated in situ. In at least one embodiment, the slurry of the support material is first contacted with the catalyst compound for a period of time in the range of from about 0.5 hours to about 24 hours, from about 2 hours to about 16 hours, or from about 4 hours to about 8 hours. The slurry of the supported metallocene compound is then contacted with the activator solution.

The mixture of the catalyst, activator and support is heated to about 0° C. to about 70° C., such as to about 23° C. to about 60° C., such as at room temperature. Contact times typically range from about 0.5 hours to about 24 hours, from about 2 hours to about 16 hours, or from about 4 hours to about 8 hours.

Suitable non-polar solvents are materials in which all of the reactants used herein, e.g., the activator, and the catalyst compound, are at least partially soluble and which are liquid at room temperature. Non-limiting example non-polar solvents are alkanes, such as isopentane, hexane, n-heptane, octane, nonane, and decane, cycloalkanes, such as cyclohexane, aromatics, such as benzene, toluene, and ethylbenzene.

Polymerization Processes

In embodiments herein, the present disclosure relates to polymerization processes where monomer (such as propylene or ethylene), and optionally comonomer, are contacted with a catalyst system comprising an activator and at least one metallocene compound, as described above. The catalyst compound and activator may be combined in any order, and are combined typically prior to contacting with the monomer.

In at least one embodiment, a polymerization process includes a) contacting one or more olefin monomers with a catalyst system comprising: i) an activator and ii) a catalyst compound of the present disclosure. The activator may be an alumoxane or a non-coordinating anion activator. The one or more olefin monomers may be propylene and or ethylene and the polymerization process further comprises heating the one or more olefin monomers and the catalyst system to 90° C. or more to form isotactic polypropylene. In at least one aspect, the isotactic polypropylene has a melting point (Tm) of about 149° C. to about 162° C. This range of Tm values of the polypropylene may be achieved when polymerization is performed from about 70° C. to about 110° C. The difference in Tm values of polypropylene formed at about 70° C. and at about 110° C. (known as ΔT) is less than 10° C., such as from about 0° C. to about 8° C., such as from about 1° C. to about 7° C., such as from about 2° C. to about 5° C. In addition, the isotactic polypropylenes of the present disclosure may have an $M_w$ value of about 60,000 to about 1,400,000 g/mol and an Mw/Mn value from about 1.5 to about 4.5, such as from about 1.5 to about 3.5.

In at least one aspect, the one or more alkene monomers comprises ethylene and propylene and the polymerization process further comprises heating the one or more alkene monomers and the catalyst system to 70° C. or less to form an ethylene-propylene copolymer. The copolymer may have an $M_w$ value of 300,000 to 1,400,000 g/mol and an Mw/Mn value from about 1.5 to about 4.5, such as from about 1.5 to about 3.5.

Monomers useful herein include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene and isomers thereof. In at least one embodiment, the monomer comprises propylene and an optional comonomer(s) comprising one or more ethylene or $C_4$ to $C_{40}$ olefins, such as $C_4$ to $C_{20}$ olefins, such as $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In at least one embodiment, the monomer comprises ethylene and an optional comonomers comprising one or more $C_3$ to $C_{40}$ olefins, such as $C_4$ to $C_{20}$ olefins, such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, such as norbornene, norbornadiene, and dicyclopentadiene.

In at least one embodiment, one or more dienes are present in the polymer produced herein at up to 10 wt %, such as at 0.00001 to 1.0 wt %, such as 0.002 to 0.5 wt %, such as 0.003 to 0.2 wt %, based upon the total weight of the composition. In some embodiments, 500 ppm or less of diene is added to the polymerization, such as 400 ppm or less, such as 300 ppm or less. In other embodiments, at least 50 ppm of diene is added to the polymerization, or 100 ppm or more, or 150 ppm or more.

Diolefin monomers include any hydrocarbon structure, such as $C_4$ to $C_{30}$, having at least two unsaturated bonds, wherein at least two of the unsaturated bonds are readily incorporated into a polymer by either a stereospecific or a non-stereospecific catalyst(s). The diolefin monomers can be selected from alpha, omega-diene monomers (i.e., di-vinyl monomers). The diolefin monomers are linear di-vinyl monomers, such as those containing from 4 to 30 carbon atoms. Examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Cyclic dienes include cyclopentadiene, vinylnorbornene, norbornadiene, ethylidene norbornene, divinylbenzene, dicyclopentadiene or higher ring containing diolefins with or without substituents at various ring positions.

Polymerization processes of the present disclosure can be carried out in any suitable manner. Any suitable suspension, homogeneous, bulk, solution, slurry, or gas phase polymerization process can be used. Such processes can be run in a batch, semi-batch, or continuous mode. Homogeneous polymerization processes and slurry processes can be performed. (A useful homogeneous polymerization process is one where at least 90 wt % of the product is soluble in the reaction media.) A bulk homogeneous process can be used. (A preferred bulk process is one where monomer concentration in all feeds to the reactor is 70 volume % or more.) Alternately, no solvent or diluent is present or added in the reaction medium, (except for the small amounts used as the carrier for the catalyst system or other additives, or amounts typically found with the monomer; e.g., propane in propylene). In at least one embodiment, the process is a slurry polymerization process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_4$-$C_{10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In at least one embodiment, the solvent is not aromatic, such that aromatics are present in the solvent at less than 1 wt %, such as less than 0.5 wt %, such as less than 0 wt % based upon the weight of the solvents.

In at least one embodiment, the feed concentration of the monomers and comonomers for the polymerization is 60 vol % solvent or less, such as 40 vol % or less, such as 20 vol % or less, based on the total volume of the feedstream. The polymerization can be performed in a bulk process.

Polymerizations can be performed at any temperature and/or pressure suitable to obtain the desired polymers, such as ethylene and or propylene polymers. Typical temperatures and/or pressures include a temperature in the range of from about 0° C. to about 300° C., such as about 20° C. to about 200° C., such as about 35° C. to about 150° C., such as about 40° C. to about 120° C., such as about 45° C. to about 80° C.; and at a pressure in the range of from about 0.35 MPa to about 10 MPa, such as about 0.45 MPa to about 6 MPa, such as about 0.5 MPa to about 4 MPa.

In a typical polymerization, the run time of the reaction is up to 300 minutes, such as in the range of from about 5 to 250 minutes, such as about 10 to 120 minutes.

In a some embodiments, hydrogen is present in the polymerization reactor at a partial pressure of 0.001 to 50 psig (0.007 to 345 kPa), such as from 0.01 to 25 psig (0.07 to 172 kPa), such as 0.1 to 10 psig (0.7 to 70 kPa).

In at least one embodiment, the activity of the catalyst is at least 50 g/mmol/hour, such as 500 or more g/mmol/hour, such as 5000 or more g/mmol/hr, such as 40,000 or more g/mmol/hr. In at least one embodiment, the conversion of olefin monomer is at least 10%, based upon polymer yield and the weight of the monomer entering the reaction zone, such as 20% or more, such as 30% or more, such as 50% or more, such as 80% or more. In at least one embodiment, a catalyst of the present disclosure has an activity of 150,000 to about 320,000 g/mmol/hour. In at least one embodiment, a catalyst of the present disclosure is capable of producing an isotactic polypropylene having a Tm of from about 149° C. to about 170° C., such as from about 155° C. to about 165° C., such as from about 158° C. to about 162° C., such as about 158.5° C., about 159.0° C., about 159.5° C., about 160.0° C., about 160.5° C., about 161.0° C., about 161.5° C., or about 162.0° C. As used herein, "isotactic polypropylene" is defined as a polypropylene where substantially all of the chiral carbon atoms of the polypropylene backbone have the same stereochemical configuration, i.e., substantially all of the methyl substituents of the polypropylene are located on the same side of the polypropylene backbone. In at least one embodiment, a catalyst of the present disclosure is capable of producing an isotactic polypropylene having an Mw from about 40,000 to about 1,000,000, such as from about 60,000 to about 500,000, such as from about 70,000 to about 300,000, such as from about 80,000 to about 150,000. In at least one embodiment, a catalyst of the present disclosure is capable of producing an ethylene-propylene copolymer having an Mw from about 300,000 to about 2,000,000, such as from about 350,000 to about 1,500,000, such as from about 400,000 to about 1,000,000, such as from about 400,000 to about 600,000.

In at least one embodiment, little or no alumoxane is used in the process to produce the polymers. Alumoxane can be present at zero mol %, alternately the alumoxane is present at a molar ratio of aluminum to transition metal less than 500:1, such as less than 300:1, such as less than 100:1, such as less than 1:1.

In at least one embodiment, little or no scavenger is used in the process to produce the ethylene polymer. Scavenger (such as tri alkyl aluminum) can be present at zero mol %, alternately the scavenger is present at a molar ratio of scavenger metal to transition metal of less than 100:1, such as less than 50:1, such as less than 15:1, such as less than 10:1.

In at least one embodiment, the polymerization: 1) is conducted at temperatures of 0 to 300° C. (such as 25 to 150° C., such as 40 to 120° C., such as 70 to 110° C.); 2) is conducted at a pressure of atmospheric pressure to 10 MPa (such as 0.35 to 10 MPa, such as from 0.45 to 6 MPa, such as from 0.5 to 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, where aromatics are present in the solvent at less than 1 wt %, such as less than 0.5 wt %, such as at 0 wt % based upon the weight of the solvents); and 4) the productivity of the catalyst compound is at least 80,000 g/mmol/hr (such as at least 150,000 g/mmol/hr, such as at least 200,000 g/mmol/hr, such as at least 250,000 g/mmol/hr, such as at least 300,000 g/mmol/hr). In at least one embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In at least one embodiment, the polymerization occurs in one reaction zone.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Useful chain transfer agents are typically alkylalumoxanes, a compound represented by the formula $AlR_3$, $ZnR_2$ (where each R is, independently, a $C_1$-$C_5$ aliphatic radical, such as methyl, ethyl, propyl, butyl, phenyl, hexyl octyl or an isomer thereof) or a combination thereof, such as diethyl zinc, methylalumoxane, trimethylaluminum, triisobutylaluminum, trioctylaluminum, or a combination thereof.

Polyolefin Products

The present disclosure also relates to compositions of matter produced by the methods described herein.

In at least one embodiment, the process described herein produces propylene homopolymers or propylene copolymers, such as propylene-ethylene and/or propylene-alphaolefin (such as $C_3$ to $C_{20}$) copolymers (such as propylene-hexene copolymers or propylene-octene copolymers) having an Mw/Mn of greater than 1 to 4 (such as greater than 1 to 3).

Likewise, the process of the present disclosure produces olefin polymers, such as polyethylene and polypropylene homopolymers and copolymers. In at least one embodiment, the polymers produced herein are homopolymers of ethylene or propylene, are copolymers of ethylene such as copolymer of ethylene having from 0 to 25 mol % (such as from 0.5 to 20 mol %, such as from 1 to 15 mol %, such as from 3 to 10 mol %) of one or more $C_3$ to $C_{20}$ olefin comonomer (such as $C_3$ to $C_{12}$ alpha-olefin, such as propylene, butene, hexene, octene, decene, dodecene, such as propylene, butene, hexene, octene), or are copolymers of propylene such as copolymers of propylene having from 0 to 25 mol % (such as from 0.5 to 20 mol %, such as from 1 to 15 mol %, such as from 3 to 10 mol %) of one or more of $C_2$ or $C_4$ to $C_{20}$ olefin comonomer (such as ethylene or $C_4$ to $C_{12}$ alpha-olefin, such as butene, hexene, octene, decene, dodecene, such as ethylene, butene, hexene, octene).

In at least one embodiment, the monomer is propylene and the comonomer is hexene, such as from 1 to 15 mol % hexene, such as 1 to 10 mol %.

Typically, the polymers produced herein have an Mw of 5,000 to 1,000,000 g/mol (such as 25,000 to 750,000 g/mol, such as 40,000 to 500,000 g/mol), and/or an Mw/Mn of greater than 1 to 40 (such as 1.2 to 20, such as 1.3 to 10, such as 1.4 to 5, such as 1.5 to 4, such as 1.5 to 3).

In at least one embodiment, the polymer produced herein has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

In at least one embodiment, the polymer produced herein has a composition distribution breadth index (CDBI) of 50% or more, such as 60% or more, such as 70% or more. CDBI is a measure of the composition distribution of monomer within the polymer chains and is measured by the procedure described in PCT publication WO 93/03093, published Feb. 18, 1993, specifically columns 7 and 8 as well as in Wild et al, J. Poly. Sci., Poly. Phys. Ed., Vol. 20, p. 441 (1982) and U.S. Pat. No. 5,008,204, including that fractions having a weight average molecular weight (Mw) below 15,000 are ignored when determining CDBI.

Blends

In at least one embodiment, the polymer (such as polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In at least one embodiment, the polymer (such as polyethylene or polypropylene) is present in the above blends, at from 10 to 99 wt %, based upon the weight of the polymers in the blend, such as 20 to 95 wt %, such as at least 30 to 90 wt %, such as at least 40 to 90 wt %, such as at least 50 to 90 wt %, such as at least 60 to 90 wt %, such as at least 70 to 90 wt %.

The blends described above may be produced by mixing the polymers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Films

Specifically, any of the foregoing polymers, such as the foregoing polypropylenes or blends thereof, may be used in a variety of end-use applications. Such applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, such as between 5 and 7, and in the Transverse Direction (TD) at a ratio of up to 15, such as 7 to 9. However, in at least one embodiment the film is oriented to the same extent in both the MD and TD directions.

The films may vary in thickness depending on the intended application; however, films of a thickness from 1 to 50 m are usually suitable. Films intended for packaging are usually from 10 to 50 µm thick. The thickness of the sealing layer is typically 0.2 to 50 µm. There may be a sealing layer on both the inner and outer surfaces of the film or the sealing layer may be present on only the inner or the outer surface.

In at least one embodiment, one or more layers may be modified by corona treatment, electron beam irradiation, gamma irradiation, flame treatment, or microwave. In at least one embodiment, one or both of the surface layers is modified by corona treatment.

Experimental $^1$H NMR for Metallocene Characterization:

Chemical structures and rac/meso-isomers of catalysts of the present disclosure are determined by $^1$H NMR. $^1$H NMR data are collected at 23° C. in a 5 mm probe using a 400 MHz Bruker spectrometer with deuterated methylene chloride or deuterated benzene. Data is recorded using a maximum pulse width of 45°, 8 seconds between pulses and signal averaging 16 transients. The spectrum is normalized to protonated benzene in the deuterated benzene, which is expected to show a peak at 7.16 ppm.

EXAMPLES

Experimental Catalyst A (Comparative Example) is dimethylsilyl (4-phenyl-2-methyl-1,5,6,7-tetrahydro-s-indacenyl) (2-isopropyl-4-(4'-tert-butyl-phenyl)-indenyl) zirconium dimethyl.

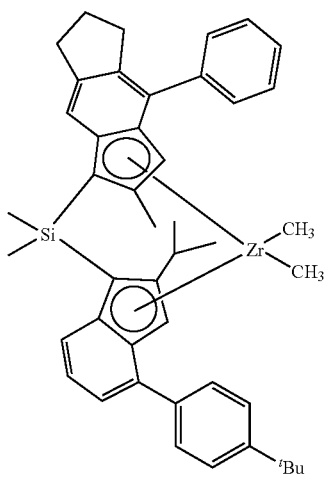

A (Comparative)

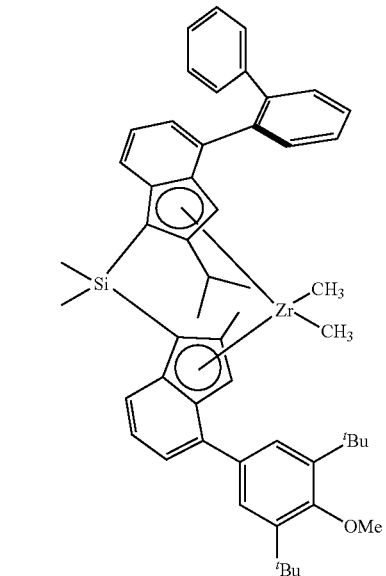

C

Catalyst B (Comparative Example) is dimethylsilyl (4-o-biphenyl-2-methylindenyl) (2-isopropyl-4-(3',5'-di-tert-butyl-phenyl)-indenyl) zirconium dichloride.

Catalyst D is dimethylsilyl (4-o-biphenyl-2-isopopyl indenyl) (4-(3,5-di-tert-butyl-4-methoxyphenyl)-2-methyl-1,5,6,7-tetrahydro-s-indacenyl) zirconium dimethyl.

B (Comparative)

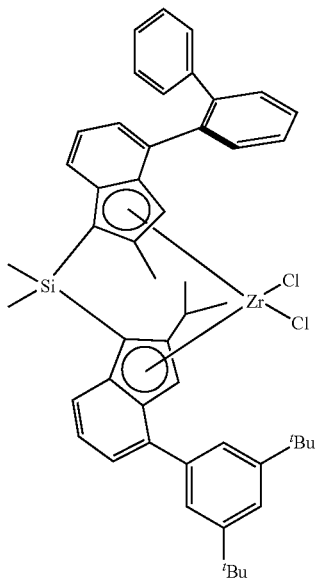

D

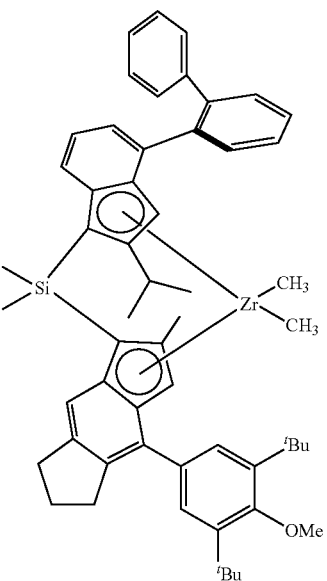

Catalyst D-Cl$_2$ (zirconium dichloride derivatives of Catalyst D) is dimethylsilyl (4-o-biphenyl-2-isopropyl indenyl) (4-(3,5-di-tert-butyl-4-methoxyphenyl)-2-methyl-1,5,6,7-tetrahydro-s-indacenyl) zirconium dichloride.

Catalyst C is dimethylsilyl (4-o-biphenyl-2-isopropyl indenyl) (4-(3',5'-di-tert-butyl-4'-methoxyphenyl)-2-methyl indenyl) zirconium dimethyl.

Catalyst E is dimethylsilyl (4-o-biphenyl-2-cyclopropyl indenyl) (4-(3',5'-di-tert-butyl-4'-methoxyphenyl)-2-methyl indenyl) zirconium dichloride.

E (Comparative)

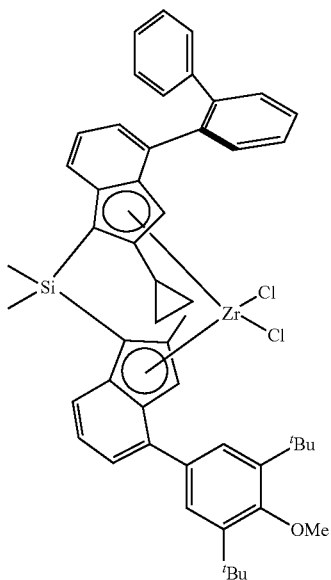

MAO is methyl alumoxane (30 wt % in toluene) obtained from Albemarle Corporation, Baton Rouge, La.

Synthesis of Catalysts C and D

Catalyst C Synthesis

C

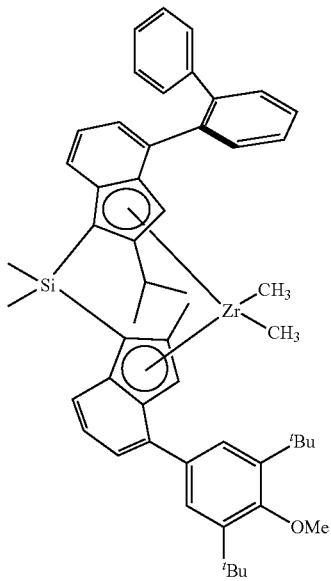

4-o-Biphenyl-2-isopropyl-indene

A 250 mL flask was charged with 4-bromo-2-isopropyl-1H-indene (11.92 g, 50.5 mmol), biphenyl-2-ylboronic acid (10.0 g, 50.5 mmol), potassium carbonate (13.9 g, 101.0 mmol), tetrabutylammonium bromide (3.32 g, 10.1 mmol), bis(triphenylphosphine)palladium(II) dichloride (1.77 g, 2.50 mmol), water (100 mL) and ethanol (10 mL). The reaction was refluxed for 5 hours under $N_2$ atmosphere. The reaction was cooled down and extracted with hexane (3×50 mL). The combined organic layers were dried over $Na_2SO_4$ and concentrated under reduced pressure. The resulting residue was purified by flash chromatography over silica gel (eluent: hexane) to get the product (14.10 g) as colorless oil.

Lithium [1-(4-o-biphenyl)-2-isopropyl-indenide]

A precooled solution of 4-o-biphenyl-2-isopropyl-indene (14.00 g, 45.16 mmol) in diethyl ether (50 mL) was treated with nBuLi (2.5 M in hexane, 19.0 mL, 47.42 mmol). The reaction was stirred at room temperature for 16 h. Then all volatiles were evaporated. The residue was washed with hexane (2×20 mL) and dried under vacuum to obtain an off-white solid as the product (13.31 g).

Chlorodimethyl (4-o-biphenyl-2-isopropyl-inden-1-yl) silane

A precooled solution of lithium [1-(4-o-biphenyl)-2-isopropyl-indenide] (13.22 g, 41.84 mmol) in diethyl ether (50 mL) was treated with $Me_2SiCl_2$ (27.00 g, 209.18 mmol), and the resulting white slurry was stirred at room temperature for 3 hours. Then all volatiles were evaporated under reduced pressure. The residue was extracted with solvents (mixed with 50 mL of hexane and 50 mL of toluene), the combined filtrate was concentrated to dryness under vacuum to obtain a white solid as the product (16.53 g).

Dimethylsilyl (4-o-biphenyl-2-hexyl-inden-1-yl) trifluoromethanesulfonate

A solution of chlorodimethyl (4-o-biphenyl-2-isopropyl-inden-1-yl) silane (10.30 g, 25.6 mmol) in toluene (50 mL) was treated with silver trifluoromethanesulfonate (7.22 g, 28.2 mmol) while stirring. The white slurry was stirred at room temperature for 3 h. Toluene was evaporated under vacuum and the residue was extracted with hexane (50 mL×2). The filtrate was concentrated in vacuo to give colorless oil as the product (12.84 g).

Lithium {1-[4-(3',5'-di-tert-butyl-4'-methoxyphenyl)-2-methyl indenide]}

A precooled solution of 4-(3,5-di-tert-butyl-4-methoxyphenyl)-2-methyl-indene (6.00 g, 17.24 mmol) in diethyl ether (30 mL) was treated with nBuLi (2.5 M in hexane, 7.2 mL, 18.10 mmol). The reaction was stirred at room temperature for 3 h. Then all volatiles were evaporated. The residue was washed with cool hexane (10 mL) and dried under vacuum to yield an off-white solid (5.98 g).

(4-o-Biphenyl-2-isopropyl-indenyl)(4-(3',5'-di-tert-butyl-4'-methoxyphenyl)-2-methylindenyl) dimethylsilane A precooled solution of dimethylsilyl (4-o-biphenyl-2-hexyl-inden-1-yl) trifluoromethanesulfonate (8.60 g, 16.67 mmol) in diethyl ether (30 mL) was treated with lithium {1-[4-(3,5-di-tert-butyl-4-methoxyphenyl)-2-methyl indenide]} (5.90 g, 16.67 mmol). The solution was stirred for 18 hours at room temperature. Diethyl ether was evaporated. The residue was extracted with hexane (3×20 mL). The combined filtrate was concentrated and further dried under reduced pressure to get pale yellow oil as the product (11.38 g).

Dilithium dimethylsilyl (4-o-biphenyl-2-isopropyl indenide) (4-(3',5'-di-tert-butyl-4'-methoxyphenyl)-2-methyl indenide)

"BuLi (2.5 M in hexane, 13.0 mL, 32.5 mmol) was added to a precooled solution of (4-o-biphenyl-2-isopropyl-indenyl)(4-(3,5-di-tert-butyl-4-methoxyphenyl)-2-methyl indenyl) dimethylsilane (11.35 g, 15.9 mmol) in diethyl ether (30 mL). The solution was stirred at room temperature for 3 h. All volatiles were removed under vacuum. The residue was washed with hexane (20 mL×2) and dried in vacuo to obtain a white solid as the desired di-lithium salt (10.82 g).

Dimethylsilyl (4-o-biphenyl-2-isopropyl indenyl) (4-(3',5'-di-tert-butyl-4'-methoxyphenyl)-2-methyl indenyl) zirconium dichloride A precooled solution of dilithium dimethylsilyl (4-o-biphenyl-2-isopropyl indenide) (4-(3,5-di-tert-butyl-4-methoxyphenyl)-2-methyl indenide) (10.70 g, 14.72 mmol) in toluene (150 mL) was treated with a powder of $ZrCl_4$ (3.38 g, 14.72 mmol). After 16 hours stirring at room temperature, the mixture was filtered through Celite and washed with 15 mL of toluene. The filtrate was concentrated under reduced pressure, and the residue was crystallized from toluene (100 mL, refluxed to room temperature) to obtain an orange solid as the meso-isomer (1.620 g, ratio of rac/meso=1:100). The mother liquid was concentrated under reduced pressure and the residue was washed with hexane (50 mL) to get an orange solid as a mixture of two isomers (ratio of rac/meso<4.8:1). Then the mixture was recrystallized (50 mL of hexane and 30 mL of toluene, refluxed to room temperature) to get a solid as the rac-isomer favored metallocene (ratio of rac/meso=9:1). The solid was further recrystallized (30 mL of toluene and 30 mL of hexane, refluxed to room temperature) to get the rac-isomer metallocene (2.31 g, ratio of rac/meso=25:1). $^1$H NMR (400 MHz, $C_6D_6$, 23° C.), meso-form isomer: δ 8.10-8.07 (m, 1H), 7.90 (s, 2H), 7.42-7.35 (m, 2H), 7.33-7.29 (m, 2H), 7.17-7.07 (m, 4H), 7.04-6.98 (m, 2H), 6.88-6.80 (m, 3H), 6.76 (dd, 1H), 6.62 (s, 1H), 6.60 (dd, 1H), 3.38 (s, 3H), 2.90-2.80 (m, 1H), 2.03 (s, 3H), 1.54 (s, 18H), 1.34 (d, 3H), 0.90 (d, 2H), 0.81 (s, 3H), 0.71 (s, 3H); rac-form isomer: δ 8.20-8.16 (m, 1H), 7.90 (s, 2H), 7.41-7.30 (m, 4H), 7.23 (td, 1H), 7.19-7.10 (m, 5H), 6.92-6.84 (m, 4H), 6.83 (s, 1H), 6.73 (dd, 1H), 3.40 (s, 3H), 3.12-3.02 (m, 1H), 1.98 (s, 3H), 1.56 (s, 18H), 1.02 (d, 3H), 0.91 (d, 3H), 0.85 (s, 3H), 0.67 (s, 3H).

Dimethylsilyl (4-o-biphenyl-2-isopropyl indenyl) (4-(3',5'-di-tert-butyl-4'-methoxyphenyl)-2-methyl indenyl) zirconium dimethyl (Catalyst C)

MeMgBr (3 M in $Et_2O$, 1 mL) was added to a stirring slurry of dimethylsilyl (4-o-biphenyl-2-isopropyl indenyl) (4-(3',5'-di-tert-butyl-4'-methoxyphenyl)-2-methyl indenyl) zirconium dichloride (0.3 g) in $Et_2O$ (30 mL). After 46 h stirring at r.t., all volatiles were removed in vacuo. The residue was extracted into hexane (20 mL once, 10 mL twice) and hexane filtrates were concentrated to dryness. Desired product together with some unidentified impurities was obtained. So the residue was re-combined with hexane insolubles and then mixed with $Et_2O$ (30 mL). MeMgBr (3 M in $Et_2O$, 0.5 mL) was added and the mixture was stirred at r.t. for 43.5 h. All volatiles were removed in vacuo. The residue was extracted into hexane (20 mL once, 10 mL twice) and hexane filtrates were concentrated to dryness. Hexane (8 mL) was added and the mixture was allowed to stay at −35° C. for 4 d. The precipitates were separated and washed with cold hexane (5 mL) to give 0.097 g of product as a yellow solid.

$^1$H NMR (400 MHz, $C_6D_6$, 23° C.): δ 7.87 (s, 2H), 7.78-7.75 (m, 1H), 7.40 (m, 2H), 7.37-7.30 (m, 2H), 7.28-7.23 (m, 3H), 7.19-7.12 (m, 3H), 6.96-6.85 (m, 4H), 6.76 (m, 1H), 6.75 (s, 1H), 3.38 (s, 3H), 2.96 (m, 1H), 1.94 (s, 3H), 1.51 (s, 18H), 0.98 (d, 3H), 0.84 (d, 3H), 0.82 (s, 3H), 0.66 (s, 3H), −0.61 (s, 3H), −0.67 (s, 3H).

Catalyst D Synthesis

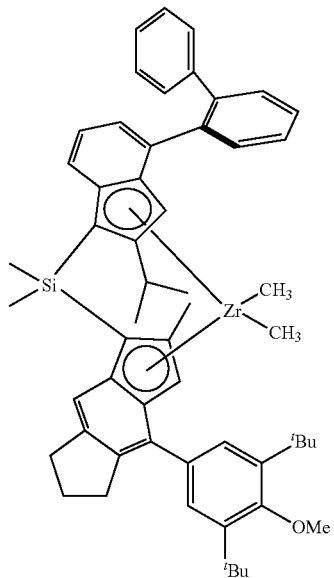

D

Lithium {4-(3,5-di-tert-butyl-4-methoxyphenyl)-2-methyl-1,5,6,7-tetrahydro-s-indacenide}

A precooled solution of 8-(3,5-di-tert-butyl-4-methoxyphenyl)-6-methyl-1,2,3,5-tetrahydro-s-indacene (3.80 g, 9.8 mmol) in diethyl ether (30 mL) was treated with nBuLi (2.5 M in hexane, 4.1 mL, 10.3 mmol). The reaction was stirred for 3 hours at room temperature. Then all volatiles were evaporated. The residue was washed with hexane (10 mL) and dried under vacuum to yield an off-white solid as the product (3.60 g).

(4-o-Biphenyl-2-isopropyl-indenyl) (4-(3,5-di-tert-butyl-4-methoxyphenyl)-2-methyl-1,5,6,7-tetrahydro-s-indacenyl) dimethylsilane A precooled solution of dimethylsilyl (4-o-biphenyl-2-hexyl-inden-1-yl) trifluoromethanesulfonate (4.45 g, 8.62 mmol) in diethyl ether (30 mL) was treated with lithium {4-(3,5-di-tert-butyl-4-methoxyphenyl)-2-methyl-1,5,6,7-tetrahydro-s-indacenide} (3.40 g, 8.62 mmol). The solution was stirred for 64 hours at room temperature. Diethyl ether was evaporated. The residue was extracted with hexane (2×30 mL). The combined filtrate was concentrated and further dried under reduced pressure to get an off-white solid as the product (6.03 g).

Dilithium dimethylsilyl (4-o-biphenyl-2-isopropyl indenide) (4-(3,5-di-tert-butyl-4-methoxyphenyl)-2-methyl-1,5,6,7-tetrahydro-s-indacenide)

"BuLi (2.5 M, 6.5 mL, 16.31 mmol) was added to a precooled solution of (4-o-biphenyl-2-isopropyl-indenyl) (4-(3,5-di-tert-butyl-4-methoxyphenyl)-2-methyl-1,5,6,7-tetrahydro-s-indacenyl) dimethylsilane (6.00 g, 7.96 mmol) in diethyl ether (30 mL). The mixture was stirred for 3 hours at room temperature. All volatiles were removed under reduced pressure. The residue was washed with cool hexane (2×10 mL) and dried under vacuum to yield a yellow-green solid (5.61 g).

Dimethylsilyl (4-o-biphenyl-2-isopropyl indenyl) (4-(3,5-di-tert-butyl-4-methoxyphenyl)-2-methyl-1,5,6,7-tetrahydro-s-indacenyl) zirconium dichloride (Catalyst D-Cl2)

A precooled solution of dilithium dimethylsilyl (4-o-biphenyl-2-isopropyl indenide) (4-(3,5-di-tert-butyl-4-methoxyphenyl)-2-methyl-1,5,6,7-tetrahydros-indacenide) (5.60 g, 7.31 mmol) in toluene (50 mL) was treated with a powder of $ZrCl_4$ (1.68 g, 7.31 mmol). After 51 hours stirring at room temperature, the mixture was filtered through Celite to get rid of LiCl. The filtrate was concentrated under reduced pressure, and the residue was washed with hexane (30 mL) to get a yellow solid as 2 isomers mixture (ratio of rac/meso=1:1). The mixture was recrystallized (30 mL of hexane and 10 mL of toluene refluxed to room temperature), the slurry was stirred for 80 hours, and the precipitation was isolated by filtration, and washed with hexane (2 mL) and dried in vacuo to obtain an orange solid as the meso-isomer (1.32 g, ratio of rac/meso=1:30). The mother liquid was concentrated under reduced pressure and the residue was recrystallized (20 mL of hexane and 5 mL of toluene, refluxed to room temperature) to get a solid as the rac-isomer favored metallocene (ratio of rac/meso=13:1). The solid was further recrystallized (3 mL of toluene and 20 mL of hexane, refluxed to room temperature) to get the rac-isomer metallocene (1.11 g, ratio of rac/meso>100:1). $^1H$ NMR (400 MHz, $C_6D_6$, 23° C.), meso-form isomer: δ 8.11 (dd, 1H), 7.82 (bs, 2H), 7.52 (d, 1H), 7.37 (s, 1H), 7.33-7.18 (m, 1H), 7.21-7.08 (m, 4H), 7.01 (d, 1H), 6.90-6.78 (m, 4H), 6.65-6.60 (m, 2H), 3.44 (s, 3H), 3.09-3.00 (m, 1H), 2.95-2.73 (m, 3H), 2.70-2.62 (m, 1H), 2.02 (s, 3H), 1.88-1.66 (m, 2H), 1.55 (s, 18H), 1.34 (d, 3H), 1.30-1.18 (m, 2H), 0.95-0.85 (m, 6H), 0.73 (3H); rac-form isomer: δ 8.23 (dd, 1H), 7.88 (bs, 2H), 7.37-7.29 (m, 3H), 7.25 (td, 1H), 7.20-7.11 (m, 4H), 6.98 (s, 1H), 6.92-6.83 (m, 4H), 6.71 (dd, 1H), 3.45 (s, 3H), 3.41-3.20 (m, 1H), 3.12-3.02 (m, 1H), 2.98-2.89 (m, 1H), 2.86-2.75 (m, 1H), 2.75-2.65 (m, 1H), 1.97 (s, 3H), 1.86-1.70 (m, 2H), 1.58 (s, 18H), 1.30-1.18 (m, 2H), 1.08 (d, 3H), 0.98-0.85 (m, 6H), 0.68 (s, 3H).

Dimethylsilyl (4-o-biphenyl-2-isopropyl indenyl) (4-(3,5-di-tert-butyl-4-methoxyphenyl)-2-methyl-1,5,6,7-tetrahydro-s-indacenyl) zirconium dimethyl (Catalyst D)

A precooled solution of dimethylsilyl (4-o-biphenyl-2-isopropyl indenyl) (4-(3,5-di-tert-butyl-4-methoxyphenyl)-2-methyl-1,5,6,7-tetrahydro-s-indacenyl) zirconium dichloride (466 mg, 0.51 mmol) in 20 mL of diethyl ether was treated with methyl lithium (1.6 M in hexane, 0.63 mL, 1.02 mmol), and the reaction was stirred for 68 hours at room temperature. Then the solvents were evaporated and the residue was extracted with mixed solvents (16 mL of hexane and 20 mL of toluene). The collected filtrate was concentrated and the solid was washed with cool hexane (10 mL) to obtain a green-yellow solid as the product (290 mg, ratio of rac/meso>50:1). $^1H$ NMR (400 MHz, $C_6D_6$, 23° C.): δ 7.81-7.77 (m, 3H), 7.42-7.38 (m, 1H), 7.34-7.25 (m, 4H), 7.16-7.12 (m, 3H), 7.06 (s, 1H), 6.96-6.85 (m, 3H), 6.75 (s, 1H), 6.73 (dd, 1H), 3.43 (s, 3H), 3.16-2.63 (m, 5H), 1.94 (s, 3H), 1.86-1.66 (m, 2H), 1.51 (s, 18H), 1.01 (d, 3H), 0.91-0.86 (m, 6H), 0.67 (s, 3H), −0.68 (s, 6H).

Formation of Supported Catalysts

Silica-supported catalysts A, B and D-Cl$_2$ (dichloride derivative of catalyst D) were prepared according to a procedure similar to that described in WO 2016/196331 (Table 4, Catalyst F).

General Procedure for Small Scale Polymerization

Unless stated otherwise propylene homopolymerization and ethylene-propylene copolymerizations are carried out in a parallel pressure reactor, as generally described in U.S. Pat. Nos. 6,306,658, 6,455,316, WO 00/09255, and Murphy et al., J. Am. Chem. Soc., 2003, 125, pp. 4306-4317, each of which is incorporated by reference herein in its entirety. Although specific quantities, temperatures, solvents, reactants, reactants ratios, pressures, and other variables may need to be adjusted from one reaction to the next, the following describes a typical polymerization performed in a parallel, pressure reactor.

For propylene polymerization and ethylene propylene copolymerization with unsupported metallocene catalysts, the following procedure was used:

A pre-weighed glass vial insert and disposable stirring paddle were fitted to each reaction vessel of the reactor, which contains 48 individual reaction vessels. The reactor was then closed and propylene gas was introduced to each vessel to purge the nitrogen out of the system. If any modules receive hydrogen, it was added in during the purge process. The solvent (typically isohexane) was added next according to the set total reaction volume, including the following additions, to 5 mL usually. At this time scavenger and/or co-catalyst and/or a chain transfer agent, such as tri-n-octylaluminum in toluene (100-1000 nmol) was added. The contents of the vessels were stirred at 800 rpm. The propylene was added as gas to a set pressure. The reactor vessels were heated to their set run temperature (usually between 50° C. and 110° C.). If any modules receive ethylene, it was added as a gas to a pre-determined pressure (typically 40-220 psi) above the pressure of the propylene while the reactor vessels were heated to a set run temperature.

A toluene solution of catalyst (typically at a concentration of 0.2 mmol/L in toluene which usually provides about 15 nmol of catalyst) was injected into the reactors. The reaction was then allowed to proceed until a pre-determined amount of pressure had been taken up by the reaction. Alternatively, the reaction may be allowed to proceed for a set amount of time. The reaction was quenched by pressurizing the vessel with compressed air. After the polymerization reaction, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight and by DSC (see below) to determine melting point.

For ethylene propylene copolymerization with supported metallocene catalysts, the following procedure was used: A pre-weighed glass vial insert and disposable stirring paddle were fitted to each reaction vessel of the reactor, which contained 48 individual reaction vessels. The reactor was then closed and propylene gas was introduced to each vessel to purge the nitrogen out of the system. If any modules receive hydrogen, it was added during the purge process. The solvent (typically isohexane) was added next according to the set total reaction volume, including the following additions, to 5 mL usually. At this time scavenger and/or co-catalyst and/or a chain transfer agent, such as tri-n-octylaluminum in toluene (100-1000 nmol) was added. The contents of the vessels were stirred at 800 rpm. The propylene was added as gas to a set pressure. The reactor vessels were heated to their set run temperature (usually between 50° C. and 110° C.). The ethylene was added as a gas to a pre-determined pressure (typically 40-220 psi) above the pressure of the propylene while the reactor vessels were heated to a set run temperature. The catalyst slurry was vortexed to suspend the catalyst particles into a solution. The buffer toluene (typically 100 microliters), the toluene solution of catalyst (typically 3 mg/ml concentration), and another aliquot of toluene (500 microliters) was then injected into the reactors. The reaction was then allowed to proceed until a pre-determined amount of pressure had been taken up by the reaction. Alternatively, the reaction may be allowed to proceed for a set amount of time. At this point, the reaction was quenched by pressurizing the vessel with compressed air. After the polymerization reaction, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight and by DSC (see below) to determine melting point. Data are reported in Tables 1 to 4.

To determine various molecular weight related values by GPC, high temperature size exclusion chromatography was performed using an automated "Rapid GPC" system as generally described in U.S. Pat. Nos. 6,491,816; 6,491,823; 6,475,391; 6,461,515; 6,436,292; 6,406,632; 6,175,409; 6,454,947; 6,260,407; and 6,294,388; each of which is fully incorporated herein by reference for US purposes. This apparatus has a series of three 30 cm×7.5 mm linear columns, each containing PLgel 10 um, Mix B. The GPC system was calibrated using polystyrene standards ranging from 580-3,390,000 g/mol. The system was operated at an eluent flow rate of 2.0 mL/minutes and an oven temperature of 165° C. 1,2,4-trichlorobenzene was used as the eluent. The polymer samples were dissolved in 1,2,4-trichlorobenzene at a concentration of 0.1-0.9 mg/mL. 250 uL of a polymer solution was injected into the system. The concentration of the polymer in the eluent was monitored using a Polymer Char IR4 detector. The molecular weights presented are relative to linear polystyrene standards and are uncorrected. For purposes of this invention only, the Rapid-GPC Mw (weight average molecular weight) data can be divided by 1.9 to approximate GPC-3D Mw results for ethylene-propylene copolymers. Likewise, purposes of this invention only, the Rapid-GPC Mw data for propylene homopolymers can be divided by 1.5 to approximate GPC-3D Mw results.

Differential Scanning Calorimetry (DSC Procedure-1) measurements were performed on a TA-Q200 instrument to determine the melting point of the polymers. Samples were pre-annealed at 220° C. for 15 minutes and then allowed to cool to room temperature overnight. The samples were then heated to 220° C. at a rate of 100° C./minutes and then cooled at a rate of 50° C./min. Melting points were collected during the heating period.

The amount of ethylene incorporated in the polymers (weight %) was determined by rapid FT-IR spectroscopy on a Bruker Vertex 70 IR in reflection mode. Samples were prepared in a thin film format by evaporative deposition techniques. Weight percent ethylene was obtained from the ratio of peak heights at 729.8 and 1157.9 cm$^{-1}$. This method was calibrated using a set of ethylene/propylene copolymers with a range of known wt % ethylene content.

General Procedure for Propylene Polymerization with Supported Catalyst in 2 L Reactor Polymerization was performed in a 2 L batch ZipperClave stirred reactor equipped with a water jacket for temperature control. A catalyst slurry was prepared by mixing solid catalyst with degased mineral oil as a 5 wt % slurry.

Prepolymerization: 1.0 g of slurry catalyst was charged to a catalyst tube in the dry box, followed by 1 ml hexane (N$_2$ sparged and sieves purified). Then, 1.75 ml TIBAL was charged to a 3 mL syringe (7.6 mL neat tri-isobutylaluminum+hexane to 100 mL, 7.6 vol %). The catalyst tube and the 3 ml syringe containing TIBAL were removed from the dry box and attached to the reactor while the reactor was being purged with nitrogen. The TIBAL solution in the syringe was injected into the reactor via a scavenger port capped with a rubber septum. The scavenger port valve was then switched off.

Propylene (1000 ml) was then introduced to the reactor through a purified propylene line. The agitator was brought to 500 rpm. The mixture was allowed to mix for 5 minutes at RT. The catalyst slurry in the catalyst tube was then flushed into the reactor with 250 ml propylene. The polymerization reaction was allowed to run for 5 minutes at room temperature. The temperature was increased to 70° C. and held for 40 minutes. The reactor was quickly vented to stop the polymerization using the reactor vent block valve. The bottom of the reactor was dropped and a polymer sample was collected.

Melt Flow Rate (MFR) is determined in accordance with ASTM D-1238 under a load of 2.16 kg and at a temperature of 230° C. (i.e., Condition L).

Mw, Mn and Mw/Mn are determined by using a High Temperature Gel Permeation Chromatography (Polymer Laboratories), equipped with a differential refractive index detector (DRI). Three Polymer Laboratories PLgel 10 μm Mixed-B columns are used. The nominal flow rate is 1.0 mL/min, and the nominal injection volume is 300 μL. The various transfer lines, columns, and differential refractometer (the DRI detector) are contained in an oven maintained at 160° C. Solvent for the experiment is prepared by dissolving 6 grams of butylated hydroxytoluene as an antioxidant in 4 liters of Aldrich reagent grade 1, 2, 4 trichlorobenzene (TCB). The TCB mixture is then filtered through a 0.1 μm Teflon filter. The TCB is then degassed with an online degasser before entering the GPC instrument. Polymer solutions are prepared by placing dry polymer in glass vials, adding the desired amount of TCB, then heating the mixture at 160° C. with continuous shaking for about 2 hours. All quantities are measured gravimetrically. The injection concentration is from 0.5 to 2.0 mg/ml, with lower concentrations being used for higher molecular weight samples. Prior to running each sample, the DRI detector is purged. Flow rate in the apparatus is then increased to 1.0 ml/minute, and the DRI is allowed to stabilize for 8 hours before injecting the first sample. The molecular weight is determined by combining universal calibration relationship with the column calibration which is performed with a series of monodispersed polystyrene (PS) standards. The MW is calculated at each elution volume with following equation:

$$\log M_X = \frac{\log(K_X/K_{PS})}{a_X + 1} + \frac{a_{PS} + 1}{a_X + 1} \log M_{PS}$$

where the variables with subscript "X" stand for the test sample while those with subscript "PS" stand for polystyrene. In this method, $a_{PS}$=0.67 and $K_{PS}$=0.000175 while $a_X$ and $K_X$ for other materials are as calculated as published in literature (Sun, T. et al. Macromolecules 2001, 34, 6812, etc.), except that a and K=0.695 and 0.000579 for ethylene polymers and 0.705 and 0.0002288 for propylene polymers.

The concentration, c, at each point in the chromatogram is calculated from the baseline-subtracted DRI signal, $I_{DRI}$ using the following equation:

$$c = K_{DRI} I_{DRI}/(dn/dc)$$

where $K_{DRI}$ is a constant determined by calibrating the DRI, and (dn/dc) is the refractive index increment for the system. Specifically, dn/dc=0.109 for both propylene polymers and ethylene polymers.

The mass recovery is calculated from the ratio of the integrated area of the concentration chromatography over elution volume and the injection mass, which is equal to the pre-determined concentration multiplied by injection loop volume.

All molecular weights are reported in g/mol unless otherwise noted. In the event of conflict between the GPC-DRI procedure and the "Rapid GPC," the GPC-DRI procedure immediately above shall be used. Further details regarding methods of determining Mw, Mn, MWD are described in US 2006/0173123 pages 24-25, paragraphs [0334] to [0341].

Differential Scanning Calorimetry (DSC-Procedure-2). Melting Temperature, Tm, is measured by differential scanning calorimetry ("DSC") using a DSCQ200 unit. The sample is first equilibrated at 25° C. and subsequently heated to 220° C. using a heating rate of 10° C./min (first heat). The sample is held at 220° C. for 3 min. The sample is subsequently cooled down to −100° C. with a constant cooling rate of 10° C./min (first cool). The sample is equilibrated at −100° C. before being heated to 220° C. at a constant heating rate of 10° C./min (second heat). The exothermic peak of crystallization (first cool) is analyzed using the TA Universal Analysis software and the corresponding to 10° C./min cooling rate is determined. The endothermic peak of melting (second heat) is also analyzed using the TA Universal Analysis software and the peak melting temperature (Tm) corresponding to 10° C./min heating rate is determined. In the event of conflict between the DSC Procedure-1 and DSC procedure-2, DSC procedure-2 is used.

Polymerization data are reported in Table 1 below:

TABLE 1

| Ex. | $T_p$ (° C.) | Catalyst | C2 (psi) | time (s) | yield (g) | $T_m$ (° C.) | C2 wt % | Mw | Mn | Mw/Mn | $T_m$ (avg) (° C.) | $\Delta T_m$ (° C.) |
|---|---|---|---|---|---|---|---|---|---|---|---|---|
| 1 | 70 | A (comparative) | | 310 | 0.0523 | 158.4 | 0.0 | 241964 | 151069 | 1.6 | 158.2 | |
| 2 | 70 | A (comparative) | 40 | 75 | 0.1266 | | 10.3 | 308246 | 174887 | 1.8 | | |
| 3 | 70 | A (comparative) | 120 | 62 | 0.3082 | | 30.3 | 328109 | 122920 | 2.7 | | |
| 4 | 100 | A (comparative) | | 298 | 0.0442 | 147.5 | 0.0 | 40980 | 20796 | 2.0 | 147.9 | 10.2 |
| 5 | 110 | A (comparative) | | 373 | 0.0444 | 143.1 | 0.0 | 30389 | 20510 | 1.5 | 143.8 | 14.4 |
| 6 | 70 | A (comparative) | | 265 | 0.061 | 157.9 | 0.0 | 273522 | 162189 | 1.7 | | |
| 7 | 70 | A (comparative) | 40 | 87 | 0.1741 | | 13.7 | 301493 | 158197 | 1.9 | | |
| 8 | 70 | A (comparative) | 120 | 57 | 0.3011 | | 35.1 | 337592 | 137903 | 2.4 | | |
| 9 | 100 | A (comparative) | | 349 | 0.056 | 148.4 | 0.0 | 50384 | 29869 | 1.7 | | |
| 10 | 110 | A (comparative) | | 403 | 0.0474 | 144.5 | 0.0 | 29024 | 17840 | 1.6 | | |
| 11 | 70 | B (comparative) | | 204 | 0.095 | 156.9 | 0.0 | 206013 | 130158 | 1.6 | 157.3 | |
| 12 | 70 | B (comparative) | 40 | 100 | 0.1661 | | 9.9 | 225210 | 133663 | 1.7 | | |
| 13 | 70 | B (comparative) | 120 | 72 | 0.2728 | | 33.7 | 263940 | 131305 | 2.0 | | |
| 14 | 100 | B (comparative) | | 307 | 0.0436 | 147.6 | 0.0 | 44692 | 24370 | 1.8 | 147.6 | 9.7 |
| 15 | 110 | B (comparative) | | 487 | 0.0369 | 142.3 | 0.0 | 27938 | 17225 | 1.6 | 142.5 | 14.8 |
| 16 | 70 | B (comparative) | | 188 | 0.0779 | 157.6 | 0.0 | 208150 | 131709 | 1.6 | | |
| 17 | 70 | B (comparative) | 40 | 100 | 0.1639 | | 10.6 | 253492 | 138585 | 1.8 | | |
| 18 | 70 | B (comparative) | 120 | 71 | 0.2555 | | 31.8 | 267456 | 139035 | 1.9 | | |
| 19 | 100 | B (comparative) | | 365 | 0.0458 | 147.6 | 0.0 | 46273 | 29171 | 1.6 | | |
| 20 | 110 | B (comparative) | | 592 | 0.0414 | 142.6 | 0.0 | 27345 | 16498 | 1.7 | | |
| 21 | 70 | C | | 264 | 0.077 | 156.4 | 0.0 | 392990 | 258011 | 1.5 | 156.4 | |
| 22 | 70 | C | 40 | 109 | 0.134 | | 14.9 | 516726 | 327827 | 1.6 | | |
| 23 | 70 | C | 120 | 79 | 0.2569 | | 32.0 | 552717 | 260934 | 2.1 | | |
| 24 | 100 | C | | 416 | 0.0479 | 153.6 | 0.0 | 105529 | 65997 | 1.6 | 152.8 | 3.6 |
| 25 | 110 | C | | 574 | 0.0408 | 149.6 | 0.0 | 67882 | 40201 | 1.7 | 149.5 | 6.8 |
| 26 | 70 | C | | 237 | 0.0667 | 156.3 | 0.0 | 393434 | 238766 | 1.6 | | |
| 27 | 70 | C | 40 | 117 | 0.128 | | 15.3 | 486546 | 268658 | 1.8 | | |
| 28 | 70 | C | 120 | 94 | 0.2904 | | 33.2 | 521265 | 230303 | 2.3 | | |
| 29 | 100 | C | | 494 | 0.0376 | 151.9 | 0.0 | 95650 | 60844 | 1.6 | | |
| 30 | 110 | C | | 574 | 0.0378 | 149.4 | 0.0 | 66722 | 40416 | 1.7 | | |
| 31 | 70 | D | | 140 | 0.1522 | 158.0 | 0.0 | 543846 | 292185 | 1.9 | 158.0 | |
| 32 | 70 | D | 40 | 73 | 0.3083 | | 29.7 | 613351 | 138749 | 4.4 | | |
| 33 | 70 | D | 120 | 38 | 0.3688 | | 29.7 | 613351 | 138749 | 4.4 | | |
| 34 | 100 | D | | 250 | 0.0634 | 156.5 | 0.0 | 170344 | 93837 | 1.8 | 156.1 | 1.9 |
| 35 | 110 | D | | 345 | 0.0501 | 154.6 | 0.0 | 110669 | 70386 | 1.6 | 154.5 | 3.5 |
| 36 | 70 | D | 40 | 65 | 0.2404 | | 14.2 | 573865 | 295726 | 1.9 | | |
| 37 | 70 | D | 120 | 42 | 0.3411 | | 33.1 | 608815 | 160401 | 3.8 | | |
| 38 | 100 | D | | 282 | 0.043 | 155.6 | 0.0 | 185236 | 111401 | 1.7 | | |

TABLE 1-continued

| Ex. | $T_p$ (°C.) | Catalyst | C2 (psi) | time (s) | yield (g) | $T_m$ (°C.) | C2 wt % | Mw | Mn | Mw/Mn | $T_m$ (avg) (°C.) | $\Delta T_m$ (°C.) |
|---|---|---|---|---|---|---|---|---|---|---|---|---|
| 39 | 110 | D | | 528 | 0.0407 | 154.4 | 0.0 | 112511 | 72719 | 1.5 | | |
| 40 | 70 | E (comparative) | 40 | 67 | 0.1993 | | 14.1 | 375339 | 175951 | 2.1 | | |
| 41 | 70 | E (comparative) | 120 | 27 | 0.3586 | | 32.5 | 259567 | 100716 | 2.6 | | |
| 42 | 70 | E (comparative) | 40 | 80 | 0.2464 | | 15.3 | 375476 | 199110 | 1.9 | | |
| 43 | 70 | E (comparative) | 120 | 28 | 0.3367 | | 33.0 | 275379 | 127191 | 2.2 | | |

Table 1. Small Scale Propylene Polymerization and ethylene-propylene Copolymerization Using Conditions: 0.015 μmol of catalysts, isohexane solvent, total volume = 5 mL. Polymerization temperature = 70° C., 115 psi propylene; Polymerization temperature = 100° C., 160 psi propylene; Polymerization temperature = 110° C., 180 psi propylene.

Figure 2:
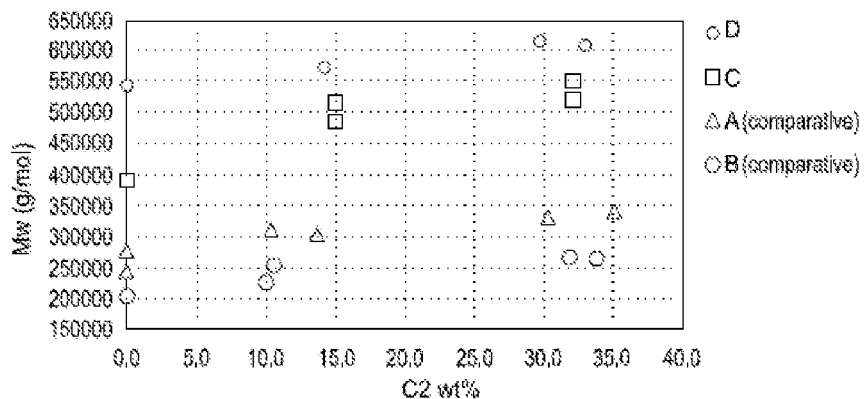
FIG. 2 is a graph illustrating molecular weight values of isotactic polypropylene and ethylene-propylene copolymers formed by catalysts of the present disclosure.

FIG. 2 is a graph illustrating molecular weight values of isotactic polypropylene and ethylethe-propylene copolymers formed by catalysts of the present disclosure. As shown in Table 1 and FIG. 2, under similar polymerization conditions, catalysts D and C yield higher Mw polymers for both isotactic polypropylene and ethylene-propylene copolymers as compared to catalysts A and B.

Figure 3:
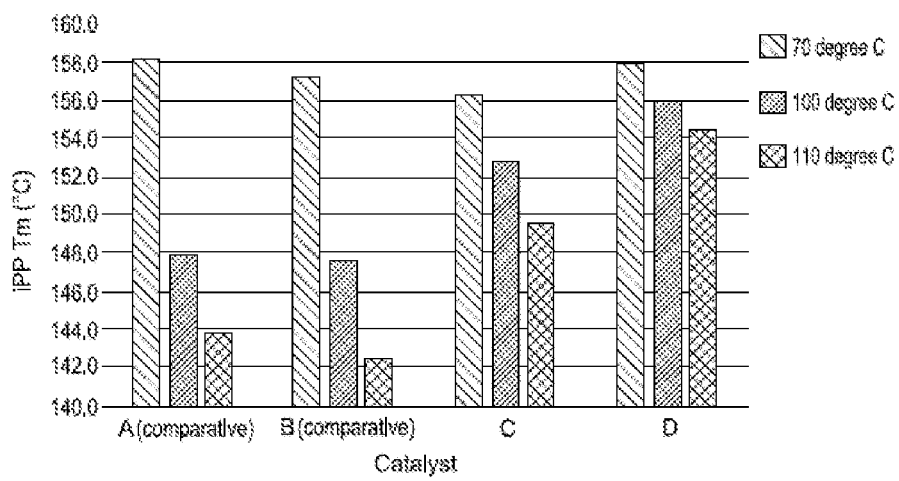
FIG. 3 is a graph illustrating melting temperature values of isotactic polypropylene formed by catalysts of the present disclosure.

FIG. 3 is a graph illustrating melting temperature values of isotactic polypropylene formed by catalysts of the present disclosure. As shown in FIG. 3, while Tm values are about the same for polypropylene formed by all four catalysts at 70° C. polymerization, at higher temperatures (100° C. and 110° C.), catalysts D and C provide polypropylene having higher Tm values than polypropylene formed by catalysts A and B under similar conditions.

Figure 4:
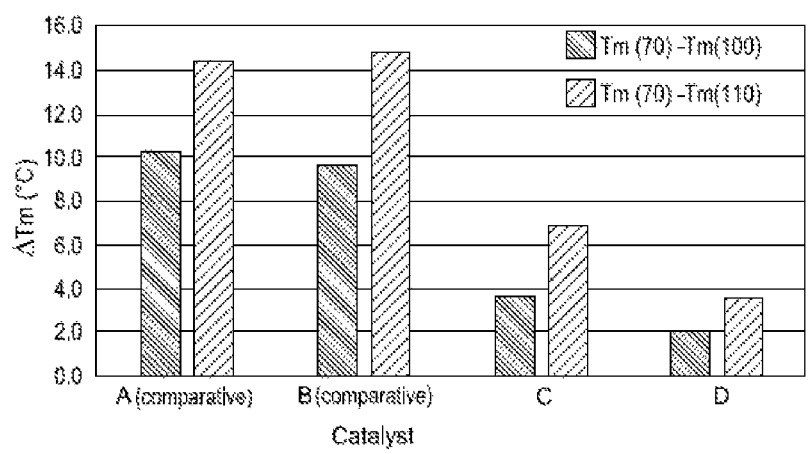
FIG. 4 is a graph illustrating the change in melting temperature (as a function of polymerization temperature) of isotactic polypropylene formed by catalysts of the present disclosure.

FIG. 4 is a graph illustrating the change in melting temperature (as a function of polymerization temperature) of isotactic polypropylene formed by catalysts of the present disclosure. As shown in FIG. 4, when comparing polymerization at 100° C. with polymerization at 70° C., the decrease in iPP Tm values from comparative catalysts A and B is about 10° C. while the decrease from catalysts D and C is about 1.9° C. and 3.6° C., respectively. As an example, catalyst B has reduced iPP $T_m$ capabilities, e.g., $T_m$ of 147.6° C. from 100° C. polymerization and $T_m$ of 142.5° C. from 110° C. polymerization versus $T_m$ of 157.3° C. from 70° C. polymerization. Comparing 110° C. to 70° C. polymerizations, the decrease in polypropylene Tm values from catalysts A and B is 14.4° C. and 14.8° C., respectively, while the decrease in iPP Tm values from D and C is only 3.5° C. and 6.8° C., respectively.

Furthermore, as seen from Table 2, catalyst A provides high Mw polypropylene (low MFR) and has low activity (Run 2). Catalyst B has high activity but provides low Mw polypropylene (Run 3). Under the same support and polymerization conditions, catalyst D-Cl₂ has high activity and provides high Mw polypropylene (i.e., low melt flow rate).

Figure 5:
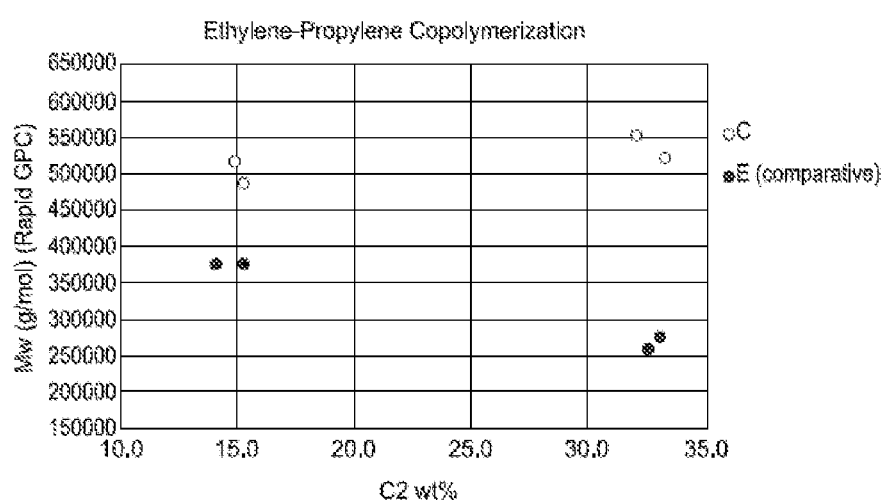
FIG. 5 is a graph illustrating molecular weight values of ethylene-propylene copolymers formed by catalysts of the present disclosure.

In addition, FIG. 5 is a graph illustrating molecular weight values of ethylene-propylene copolymers formed by catalysts of the present disclosure. As shown in FIG. 5, if the isopropyl moiety of catalyst C, is replaced by a cyclopropyl moiety, the catalyst does not produce high molecular weight ethylene-propylene copolymers.

Overall, catalysts of the present disclosure are multifunctional, providing ethylene-propylene copolymers having Mw values above 250,000 g/mol, isotactic polypropylene having Mw values above 40,000 g/mol, Tm values greater than 145° C., and ΔTm values less than 10° C.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

TABLE 2

| Run | Catalyst | Conditions | Yield (g) | Activity (g polymer/ g cat hr) | MFR (dg/min) | Tm (°C.) | Mw (kg/mol) | Mw/Mn |
|---|---|---|---|---|---|---|---|---|
| 1 | Supported D-Cl₂ | No H₂ for 40 min | 81.07 | 2440 | 0.69 | 155.4 | 590 | 2.2 |
| 2* | Supported A (Comparative) | No H₂ for 40 min | 39.75 | 1200 | 0.41 | 154.4 | | |
| 3* | Supported B (Comparative) | No H₂ for 40 min | 92.44 | 2800 | 8.9 | 154.3 | 289 | 2.0 |

Table 2. Propylene Polymerization with Supported Catalysts from 2 L Reactor: No H₂ for 40 min.

What is claimed is:

1. A catalyst compound represented by Formula (I):

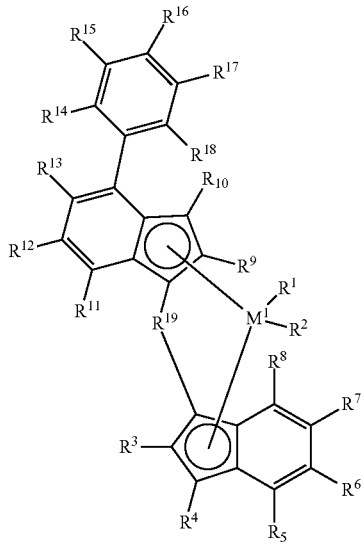

(I)

wherein $M^1$ is selected from the group consisting of titanium, zirconium, hafnium, vanadium, niobium, tantalum, chromium, molybdenum and tungsten;

$R^1$ and $R^2$ are independently hydrogen, halogen, hydroxyl, hydrocarbyl, or substituted hydrocarbyl;

$R^3$ is linear alkyl;

$R^9$ is $C_3$-$C_{10}$ branched alkyl;

each of $R^4$, $R^6$, $R^7$, $R^8$, $R^{10}$, $R^{11}$, $R^{12}$, and $R^{13}$ is independently hydrogen, halogen, $C_1$-$C_{40}$ hydrocarbyl or $C_1$-$C_{40}$ substituted hydrocarbyl, —NR'$_2$, —SR', —OR, —OSiR'$_3$, —PR'$_2$, where each R' is hydrogen, halogen, $C_1$-$C_{10}$ alkyl, or $C_6$-$C_{10}$ aryl and wherein $R^6$ and $R^7$ or $R^7$ and $R^8$ combine to form a cyclobutyl ring, a cyclopentyl ring or cyclohexyl ring;

$R^5$ is hydrogen, halogen, $C_1$-$C_{40}$ hydrocarbyl or $C_1$-$C_{40}$ substituted hydrocarbyl, —NR'$_2$, —R', —OR, —OSiR'$_3$, —PR'$_2$, where each R' is hydrogen, halogen, $C_1$-$C_{10}$ alkyl, or $C_6$-$C_{10}$ aryl, or two or more adjacent radicals $R^5$ to $R^8$ together form one or more saturated or unsaturated rings;

$R^{19}$ is —B($R^{20}$)—, —Al($R^{20}$)—, —Ge—, —Sn—, —O—, —S—, —SO—, —SO$_2$—, —N($R^{20}$)—, —CO—, P($R^{20}$), or —P(O)($R^{20}$)—, an amidoborane radical or one of the following:

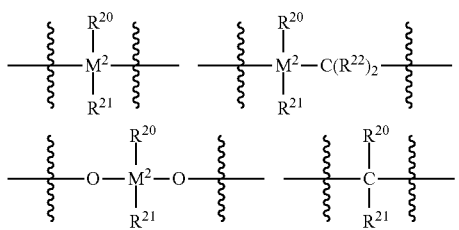

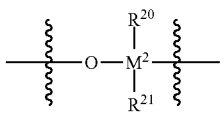

wherein each of $R^{20}$, $R^{21}$, $R^{22}$ is independently hydrogen, halogen, $C_1$-$C_{20}$ alkyl, $C_1$-$C_{20}$ fluoroalkyl or silaalkyl, $C_6$-$C_{30}$ aryl, $C_6$-$C_{30}$ fluoroaryl, $C_1$-$C_{20}$ alkoxy, $C_2$-$C_{20}$ alkenyl, $C_7$-$C_{40}$ arylalkyl, $C_8$-$C_{40}$ arylalkenyl, $C_7$-$C_{40}$ alkylaryl, or one $R^{20}$ and one $R^{21}$, together with the atoms in $R^{19}$ connecting them, form one or more rings;

$M^2$ is one or more of carbon, silicon, germanium or tin;

$R^{14}$ is substituted or unsubstituted $C_6$-$C_{10}$ aryl;

$R^{18}$ is hydrogen, halogen, substituted or unsubstituted $C_3$-$C_{20}$ alkyl, substituted or unsubstituted $C_6$-$C_{40}$ aryl, $C_2$-$C_{10}$ alkenyl, —NR'$_2$, —SW, —OR, —OSiR'$_3$ or —PR'$_2$, wherein each R' is hydrogen, halogen, $C_1$-$C_{10}$ alkyl, or $C_6$-$C_{10}$ aryl;

$R^{15}$ and $R^{17}$ are independently hydrogen, $C_2$-$C_{20}$ alkyl which is optionally substituted, $C_6$-$C_{40}$ aryl which is optionally substituted, or $C_2$-$C_{10}$ alkenyl; and $R^{16}$ is selected from hydrogen, halogen, $C_1$-$C_{10}$ alkyl which is optionally substituted, $C_6$-$C_{20}$ aryl which is optionally substituted, $C_2$-$C_{10}$ alkenyl which is optionally substituted, or two or more adjacent radicals $R^{15}$ to $R^{18}$ together form one or more rings, and —XR'n, wherein X is a Group 14-17 heteroatom having an atomic weight of 13 to 79 and R' is one of hydrogen, halogen, $C_1$-$C_{10}$ alkyl, or $C_6$-$C_{10}$ aryl and n is 0, 1, 2, or 3.

2. The catalyst compound of claim 1, wherein $R^9$ is isopropyl.

3. The catalyst compound of claim 1, wherein $R^{14}$ is phenyl.

4. The catalyst compound of claim 1, wherein $R^5$ is

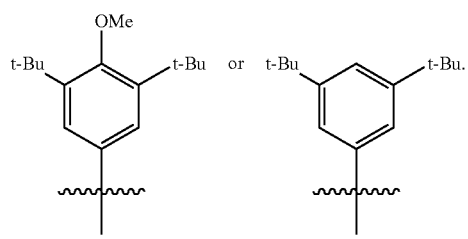 [SMILES: *c1cc(C(C)(C)C)c(OC)c(C(C)(C)C)c1 ; *c1cc(C(C)(C)C)cc(C(C)(C)C)c1]

5. The catalyst compound of claim 1, wherein $R^3$ is methyl.

6. The catalyst compound of claim 1, wherein $R^{15}$ and $R^{17}$ are hydrogen.

7. The catalyst compound of claim 1, wherein $R^{16}$ is NR'$_2$, —SR', —OR', —OSiR'$_3$, —SiR'$_3$, or —PR'$_2$, wherein R' is one of a hydrogen atom, halogen, $C_1$-$C_{10}$ alkyl, or $C_6$-$C_{10}$ aryl.

8. The catalyst compound of claim 1, wherein $R^{15}$ is n-butyl-, iso-butyl-, or tert-butyl and $R^{16}$ is —OR' wherein R' is $C_1$-$C_{10}$ alkyl.

9. The catalyst compound of claim 1, represented by the Formula (II):

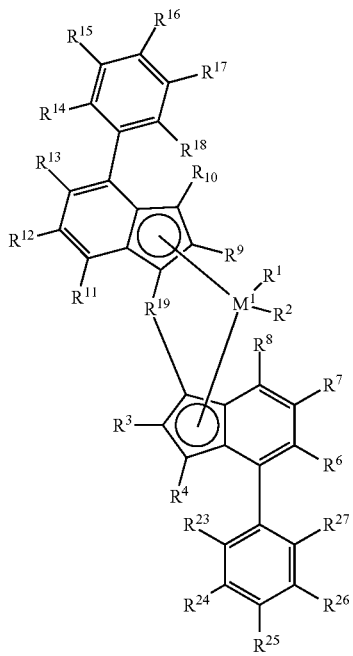

(II)

wherein $M^1$, $R^1$, $R^2$, $R^3$, $R^4$, $R^6$, $R^7$, $R^8$, $R^9$, $R^{10}$, $R^{11}$, $R^{12}$, $R^{13}$, $R^{14}$, $R^{15}$, $R^{17}$, and $R^{19}$ are as defined in claim 1,
wherein each of $R^{18}$, $R^{23}$, and $R^{27}$ is independently hydrogen, halogen, substituted or unsubstituted $C_3$-$C_{20}$ alkyl, substituted or unsubstituted $C_6$-$C_{40}$ aryl, $C_2$-$C_{10}$ alkenyl, —NR'$_2$, —SW, —OR, —OSiR'$_3$ or —PR'$_2$, wherein each R' is hydrogen, halogen, $C_1$-$C_{10}$ alkyl, or $C_6$-$C_{10}$ aryl;
$R^{24}$ and $R^{26}$ are independently substituted or unsubstituted $C_2$-$C_{20}$ alkyl, substituted or unsubstituted $C_6$-$C_{40}$ aryl, $C_2$-$C_{10}$ alkenyl; and
$R^{16}$ and $R^{25}$ are independently —(XR'n), wherein X is a Group 14-17 heteroatom having an atomic weight of 13 to 79 and R' is one of hydrogen, halogen, $C_1$-$C_{10}$ alkyl, or $C_6$-$C_{10}$ aryl and n is 0, 1 2, or 3.

10. The catalyst compound of claim 9, wherein $R^{16}$ and $R^{25}$ are independently —NR'$_2$, —SR', —OR', —OSiR'$_3$, —SiR'$_3$, or —PR'$_2$, wherein R' is one of hydrogen, halogen, $C_1$-$C_{10}$ alkyl, or $C_6$-$C_{10}$ aryl.

11. The catalyst compound of claim 9, wherein $R^{15}$, $R^{16}$ and $R^{17}$ is hydrogen, $R^{24}$ and $R^{26}$ are selected from the group consisting of n-butyl-, iso-butyl-, and tert-butyl groups and $R^{25}$ is —OR', wherein R' is a $C_1$-$C_{10}$ alkyl group.

12. The catalyst compound of claim 9, wherein:
$R^1$ and $R^2$ are methyl;
each of $R^4$, $R^6$, and $R^{11}$ is independently hydrogen or $C_1$-$C_{10}$ alkyl;
each of $R^{15}$, $R^{16}$, $R^{17}$, $R^{18}$, $R^{23}$, and $R^{27}$ is hydrogen;
$R^{19}$ is —SiR"$_2$—, wherein each R" is independently hydrogen or methyl;
$R^{24}$ and $R^{26}$ are tert-butyl; and
$R^{25}$ is hydrogen or methoxy.

13. The catalyst compound of claim 1, wherein $R^5$ is $C_6$-$C_{40}$ aryl which are optionally substituted.

14. The catalyst compound of claim 1, wherein $R^5$ is a substituted or unsubstituted $C_6$-$C_{10}$ aryl group.

15. The catalyst compound of claim 1, wherein $R^5$ is 3'-substituted phenyl, 5'-substituted phenyl, or 3' and 5'-substituted phenyl, where the 3' and 5' substituents are selected from $C_2$-$C_{20}$ alkyl group which are optionally halogenated, a $C_6$-$C_{10}$ aryl group which are optionally halogenated, a $C_2$-$C_{10}$ alkenyl group, a $C_7$-$C_{20}$ arylalkyl group, a $C_7$-$C_{20}$ alkylaryl group, and a $C_8$-$C_{20}$ arylalkenyl group.

16. The catalyst compound of claim 1, wherein $R^5$ is phenyl, the 3' and 5' positions are independently n-butyl, t-butyl, iso-butyl, aryl, isopropyl, or fluoroalkyl and the phenyl is also substituted at the 4' position with a —NR'$_2$, —SW, —OR', —OSiR'$_3$ or —PR'$_2$ radical, wherein R' is one of hydrogen, halogen, $C_1$-$C_{10}$ alkyl, or $C_6$-$C_{10}$ aryl, or alkyloxy.

17. The catalyst compound of claim 1, wherein $R^5$ is phenyl, the 3' and 5' positions are independently n-butyl, t-butyl, iso-butyl, aryl, isopropyl, or fluoroalkyl and the phenyl is also substituted at the 4' position with methoxy, ethoxy, n-propoxy, isopropoxy, n-butoxy, iso-butoxy, sec-butoxy, or t-butoxy.

18. A catalyst compound represented by Formula (I):

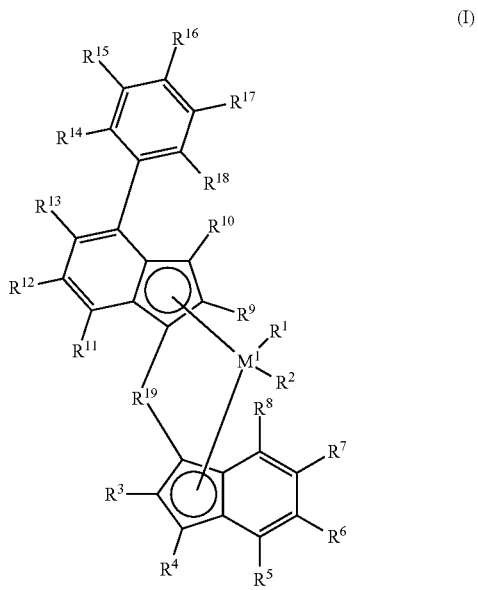

(I)

wherein $M^1$ is selected from the group consisting of titanium, zirconium, hafnium, vanadium, niobium, tantalum, chromium, molybdenum and tungsten;
$R^1$ and $R^2$ are independently hydrogen, halogen, hydroxyl, hydrocarbyl, or substituted hydrocarbyl;
$R^3$ is linear alkyl;
$R^9$ is $C_3$-$C_{10}$ branched alkyl;
each of $R^4$, $R^6$, $R^7$, $R^8$, $R^{10}$, $R^{11}$, $R^{12}$, and $R^{13}$ is independently hydrogen, halogen, $C_1$-$C_{40}$ hydrocarbyl or $C_1$-$C_{40}$ substituted hydrocarbyl, —NR'$_2$, —SR', —OR, —OSiR'$_3$, —PR'$_2$, where each R' is hydrogen, halogen, $C_1$-$C_{10}$ alkyl, or $C_6$-$C_{10}$ aryl and wherein $R^6$ and $R^7$ or $R^7$ and $R^8$ combine to form a cyclobutyl ring, a cyclopentyl ring or cyclohexyl ring;
$R^5$ is hydrogen, halogen, $C_1$-$C_{40}$ hydrocarbyl or $C_1$-$C_{40}$ substituted hydrocarbyl, —NR'$_2$, —R', —OR, —OSiR'$_3$, —PR'$_2$, where each R' is hydrogen, halogen, $C_1$-$C_{10}$ alkyl, or $C_6$-$C_{10}$ aryl, or two or more adjacent radicals $R^5$ to $R^8$ together form one or more saturated or unsaturated rings;

$R^{19}$ is —B($R^{20}$)—, —Al($R^{20}$)—, —Ge—, —Sn—, —O—, —S—, —SO—, —SO$_2$—, —N($R^{20}$)—, —CO—, —P($R^{20}$)—, or —P(O)($R^{20}$)—, an amidoborane radical or one of the following:

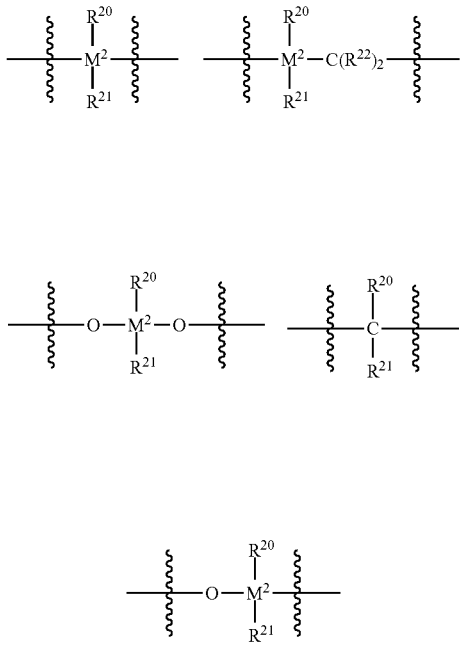

wherein each of $R^{20}$, $R^{21}$, $R^{22}$ is independently hydrogen, halogen, $C_1$-$C_{20}$ alkyl, $C_1$-$C_{20}$ fluoroalkyl or silaalkyl, $C_6$-$C_{30}$ aryl, $C_6$-$C_{30}$ fluoroaryl, $C_1$-$C_{20}$ alkoxy, $C_2$-$C_{20}$ alkenyl, $C_7$-$C_{40}$ arylalkyl, $C_8$-$C_{40}$ arylalkenyl, $C_7$-$C_{40}$ alkylaryl, or one $R^{20}$ and one $R^{21}$, together with the atoms in $R^{19}$ connecting them, form one or more rings; $M^2$ is one or more of carbon, silicon, germanium or tin;

$R^{14}$ is substituted or unsubstituted $C_6$-$C_{10}$ aryl;

$R^{18}$ is hydrogen, halogen, substituted or unsubstituted $C_3$-$C_{20}$ alkyl, substituted or unsubstituted $C_6$-$C_{40}$ aryl, $C_2$-$C_{10}$ alkenyl, —NR'$_2$, —SW, —OR, —OSiR'$_3$ or —PR'$_2$, wherein each R' is hydrogen, halogen, $C_1$-$C_{10}$ alkyl, or $C_6$-$C_{10}$ aryl;

$R^{15}$ and $R^{17}$ are independently hydrogen, $C_2$-$C_{20}$ alkyl which is optionally substituted, $C_6$-$C_{40}$ aryl which is optionally substituted, or $C_2$-$C_{10}$ alkenyl; and $R^{16}$ is selected from hydrogen, halogen, $C_1$-$C_{10}$ alkyl which is optionally substituted, $C_6$-$C_{20}$ aryl which is optionally substituted, $C_2$-$C_{10}$ alkenyl which is optionally substituted, or two or more adjacent radicals $R^{15}$ to $R^{18}$ together form one or more rings, and —XR'n, wherein X is a Group 14-17 heteroatom having an atomic weight of 13 to 79 and R' is one of hydrogen, halogen, $C_1$-$C_{10}$ alkyl, or $C_6$-$C_{10}$ aryl and n is 0, 1, 2, or 3.

19. The catalyst compound of claim 18, wherein $R^6$ and $R^7$ or $R^7$ and $R^8$ combine to form a cyclopentyl ring or cyclohexyl ring.

20. The catalyst compound of claim 18, wherein $R^6$ and $R^7$ combine to form a cyclopentyl ring.

21. A catalyst compound represented by Formula (I):

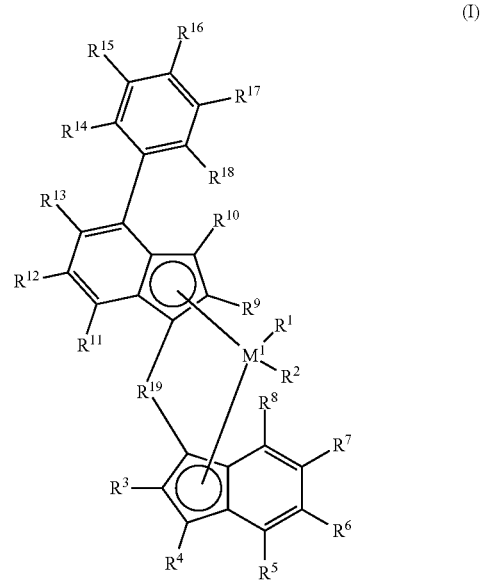

wherein $M^1$ is selected from the group consisting of titanium, zirconium, hafnium, vanadium, niobium, tantalum, chromium, molybdenum and tungsten;

$R^1$ and $R^2$ are independently hydrogen, halogen, hydroxyl, hydrocarbyl, or substituted hydrocarbyl;

$R^3$ is linear alkyl;

$R^9$ is $C_3$-$C_{10}$ branched alkyl;

each of $R^4$, $R^6$, $R^7$, $R^8$, $R^{10}$, $R^{11}$, $R^{12}$, and $R^{13}$ is independently hydrogen, halogen, $C_1$-$C_{40}$ hydrocarbyl or $C_1$-$C_{40}$ substituted hydrocarbyl, —NR'$_2$, —SR', —OR, —OSiR'$_3$, —PR'$_2$, where each R' is hydrogen, halogen, $C_1$-$C_{10}$ alkyl, or $C_6$-$C_{10}$ aryl;

$R^5$ is

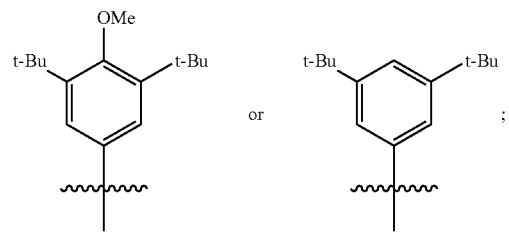 [SMILES: *c1cc(C(C)(C)C)c(OC)c(C(C)(C)C)c1 ; *c1cc(C(C)(C)C)cc(C(C)(C)C)c1]

$R^{19}$ is —B($R^{20}$)—, —Al($R^{20}$)—, —Ge—, —Sn—, —O—, —S—, —SO—, —SO$_2$—, —N($R^{20}$)—, —CO—, —P($R^{20}$)—, or —P(O)($R^{20}$)—, an amidoborane radical or one of the following:

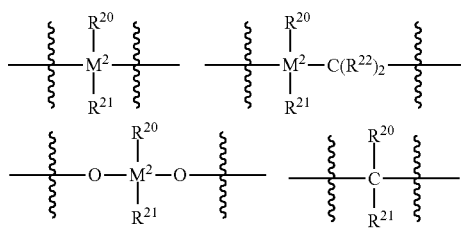

-continued

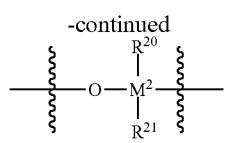

wherein each of $R^{20}$, $R^{21}$, $R^{22}$ is independently hydrogen, halogen, $C_1$-$C_{20}$ alkyl, $C_1$-$C_{20}$ fluoroalkyl or silaalkyl, $C_6$-$C_{30}$ aryl, $C_6$-$C_{30}$ fluoroaryl, $C_1$-$C_{20}$ alkoxy, $C_2$-$C_{20}$ alkenyl, $C_7$-$C_{40}$ arylalkyl, $C_8$-$C_{40}$ arylalkenyl, $C_7$-$C_{40}$ alkylaryl, or one $R^{20}$ and one $R^{21}$, together with the atoms in $R^{19}$ connecting them, form one or more rings;

$M^2$ is one or more of carbon, silicon, germanium or tin;

$R^{14}$ is substituted or unsubstituted $C_6$-$C_{10}$ aryl;

$R^{18}$ is hydrogen, halogen, substituted or unsubstituted $C_3$-$C_{20}$ alkyl, substituted or unsubstituted $C_6$-$C_{40}$ aryl, $C_2$-$C_{10}$ alkenyl, —$NR'_2$, —SW, —OR, —$OSiR'_3$ or —$PR'_2$, wherein each R' is hydrogen, halogen, $C_1$-$C_{10}$ alkyl, or $C_6$-$C_{10}$ aryl;

$R^{15}$ and $R^{17}$ are independently hydrogen, $C_2$-$C_{20}$ alkyl which is optionally substituted, $C_6$-$C_{40}$ aryl which is optionally substituted, or $C_2$-$C_{10}$ alkenyl; and $R^{16}$ is selected from hydrogen, halogen, $C_1$-$C_{10}$ alkyl which is optionally substituted, $C_6$-$C_{20}$ aryl which is optionally substituted, $C_2$-$C_{10}$ alkenyl which is optionally substituted, or two or more adjacent radicals $R^{15}$ to $R^{18}$ together form one or more rings, and —XR'n, wherein X is a Group 14-17 heteroatom having an atomic weight of 13 to 79 and R' is one of hydrogen, halogen, $C_1$-$C_{10}$ alkyl, or $C_6$-$C_{10}$ aryl and n is 0, 1, 2, or 3.

22. The compound of claim 21, wherein $R^6$ and $R^7$ or $R^7$ and $R^8$ combine to form a cyclobutyl ring, a cyclopentyl ring or cyclohexyl ring.

23. A catalyst compound represented by Formula:

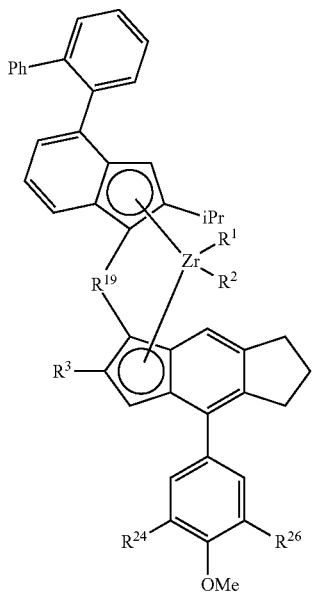

(III)

wherein:
$R^{19}$ is -(Me$_2$)Si—, -(Me$_2$N)B—, -(iPr$_2$N)B—, or -((Me$_3$Si)$_2$N)B—;
$R^3$ is Me, Et, Pr, Bu;

$R^{24}$ and $R^{26}$ are tBu, F$_3$Me, iPr, Ph; and
$R^1$ and $R^2$ are Me or Cl.

24. A catalyst system comprising an activator and the catalyst compound of claim 1.

25. The catalyst system of claim 24, wherein the catalyst system is supported.

26. A polymerization process comprising a) contacting one or more olefin monomers with a catalyst system comprising: i) an activator and ii) the catalyst compound of claim 1.

27. The process of claim 26, wherein the activator comprises an alumoxane, a non-coordinating anion, or a combination of alumoxane and non-coordinating anion.

28. The process of claim 26, wherein the one or more olefin monomers comprises propylene and the polymerization process further comprises heating the one or more olefin monomers and the catalyst system to 90° C. or more to form isotactic polypropylene.

29. The process of claim 28, wherein the isotactic polypropylene has a melting point of 149° C. to 162° C.

30. The process of claim 28, wherein the isotactic polypropylene has an $M_w$ value of 40,000 to 1,400,000 g/mol and an Mw/Mn value of 1.5 to 3.5.

31. The process of claim 26, wherein the one or more olefin monomers comprises ethylene and propylene and the polymerization process further comprises heating the one or more olefin monomers and the catalyst system to 70° C. or less to form an ethylene-propylene copolymer.

32. The process of claim 26, wherein the copolymer has an $M_w$ value of 250,000 to 1,400,000 g/mol and an Mw/Mn value of 1.5 to 4.5.

33. The process of claim 26, wherein $R^9$ is isopropyl.

34. The process of claim 26, wherein $R^{14}$ is phenyl.

35. The process of claim 26, wherein $R^5$ is

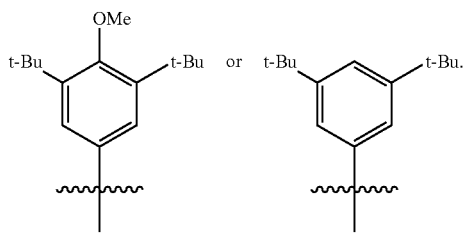 [SMILES: *c1cc(C(C)(C)C)c(OC)c(C(C)(C)C)c1 ; *c1cc(C(C)(C)C)cc(C(C)(C)C)c1]

36. The process of claim 26, wherein $R^3$ is methyl.

37. The process of claim 26, wherein $R^{15}$ and $R^{17}$ are hydrogen.

38. The process of claim 26, wherein $R^{16}$ is —$NR'_2$, —SR', —OR', —$OSiR'_3$, —$SiR'_3$, or —$PR'_2$, wherein R' is one of a hydrogen atom, halogen, $C_1$-$C_{10}$ alkyl, or $C_6$-$C_{10}$ aryl.

39. The process of claim 26, wherein $R^{15}$ is n-butyl-, iso-butyl-, or tert-butyl and $R^{16}$ is —OR' wherein R' is $C_1$-$C_{10}$ alkyl.

40. A polymerization process comprising a) contacting one or more olefin monomers with a catalyst system comprising: i) an activator and ii) the catalyst compound of claim 18.

41. The process of claim 40, wherein $R^6$ and $R^7$ or $R^7$ and $R^8$ combine to form a cyclopentyl ring or cyclohexyl ring.

42. The process of claim 40, wherein $R^6$ and $R^7$ combine to form a cyclopentyl ring.

* * * * *